United States Patent
Riviello

(10) Patent No.: US 8,404,094 B2
(45) Date of Patent: Mar. 26, 2013

(54) METHOD AND APPARATUS FOR ELECTRODEIONIZATION UTILIZING LAYERED CHAMBERS

(75) Inventor: John M. Riviello, Los Gatos, CA (US)

(73) Assignee: Trovion Singapore PTE. Ltd., Co., Singapore (SG)

( * ) Notice: Subject to any disclaimer, the term of this patent is extended or adjusted under 35 U.S.C. 154(b) by 612 days.

(21) Appl. No.: 12/450,783

(22) PCT Filed: Apr. 17, 2008

(86) PCT No.: PCT/US2008/004929
§ 371 (c)(1),
(2), (4) Date: Oct. 13, 2009

(87) PCT Pub. No.: WO2008/130579
PCT Pub. Date: Oct. 30, 2008

(65) Prior Publication Data
US 2010/0126867 A1    May 27, 2010

Related U.S. Application Data

(60) Provisional application No. 60/925,249, filed on Apr. 19, 2007.

(51) Int. Cl.
*B01D 61/48* (2006.01)
(52) U.S. Cl. .......................... 204/632
(58) Field of Classification Search .............. 204/632
See application file for complete search history.

(56) References Cited

U.S. PATENT DOCUMENTS

| | | |
|---|---|---|
| 4,632,745 A | 12/1986 | Giuffrida et al. |
| 6,197,174 B1 | 3/2001 | Barber et al. |
| 6,334,941 B1 | 1/2002 | Iwamoto |
| 6,824,662 B2 | 11/2004 | Liang et al. |
| 2003/0150732 A1 | 8/2003 | Yamanaka et al. |
| 2003/0213695 A1 | 11/2003 | Yamanaka et al. |
| 2004/0089551 A1 | 5/2004 | Liang et al. |
| 2006/0231403 A1 | 10/2006 | Riviello |
| 2007/0051684 A1* | 3/2007 | Grebenyuk et al. .......... 210/681 |
| 2008/0073215 A1* | 3/2008 | Barber et al. .................. 204/634 |

FOREIGN PATENT DOCUMENTS

WO   2004/024992   3/2004

OTHER PUBLICATIONS

"Supplemental European Search Report and Written Opinion in PCT/US2008004929", Mar. 23, 2012 , 12 pages.

* cited by examiner

*Primary Examiner* — Arun S Phasge
(74) *Attorney, Agent, or Firm* — Shirley L. Church, Esq.

(57) ABSTRACT

The present invention relates generally to the deionization of liquids through the use of electrodeionization methods and apparatuses. The apparatuses may be configured to produce purified liquids for use in analytical techniques such as ion chromatography, inductively coupled plasma mass spectrometry and atomic absorption spectroscopy, among others, and to provide continuous regeneration of the ion exchange materials. The apparatuses may be configured according to the desired levels of deionization for anions, cations, or both. Finally, methods are presented for various uses of the apparatus specifically claimed.

8 Claims, 9 Drawing Sheets

METHOD AND APPARATUS FOR ELECTRODEIONIZATION UTILIZING LAYERED CHAMBERS

FIELD OF THE INVENTION

This invention relates generally to the field of deionization of liquids, in particular to water purification through deionization. More specifically, the present invention pertains to electrodeionization (EDI) apparatuses and various methods of using the same, directing liquid through the apparatuses in different ways to achieve different deionization characteristics.

BACKGROUND OF THE INVENTION

Electrodeionization (EDI) is known in the art as a process which removes ionized species from liquids, such as water, using electrically active media and an electric potential to influence ion transport. Examples of electrically active media comprise ion exchange materials and ion exchange membranes. In general "ion exchange materials" denotes solid (perhaps highly porous) materials that, when brought into contact with a liquid, cause ions in the liquid to be interchanged with ions in the exchange material. "Ion exchange membrane" or "ion selective membrane" generally denotes a membrane porous to some ions, perhaps containing ion exchange sites, and useful for controlling the flow of ions across the membrane, typically permitting the passage of some types of ions while blocking others. In general, ion exchange membranes selectively permit the transport of some types of ions and not others, and also block the passage of the bulk liquid carrying the ions. A combination of ion selective membranes and ion exchange materials are sandwiched between two electrodes (anode (+) and cathode (−)) under a direct current (DC) electric field to remove ions from the liquid. The electric field may be applied in a continuous manner or may be applied in an intermittent manner. Cation exchange materials (or cation materials for short) can be used to remove positively charged ions, such as calcium, magnesium, sodium, among others, replacing them with hydronium ($H_3O^+$ or $H^+$) ions. Anion exchange materials (or anion materials for short) can be used to remove negatively charged ions, such as chloride, nitrate, silica, among others, replacing them with hydroxide ions. The hydronium and hydroxide ions may subsequently be united to form water molecules. Eventually, the ion exchange materials become saturated with contaminant ions and become less effective at treating the liquid. Once these materials are significantly contaminated, high-purity liquid flowing past them may acquire trace amounts of contaminant ions by "displacement effects." In conventional deionization, the saturated (or exhausted) ion exchange media must be chemically recharged or regenerated periodically with a strong acid (for cation materials) or a strong base (for anion materials). The process of regenerating the ion exchange media with concentrated solutions of strong acids or strong bases presents considerable cost, time, safety, and waste disposal issues.

Continuous electrodeionization (CEDI), a subset of EDI, uses a combination of ion exchange materials and ion exchange membranes, and direct current in a manner so as to continuously deionize liquids and also to eliminate the need to chemically regenerate the ion exchange media. The "continuous" label of CEDI applies to the condition wherein the electric field may be applied to the apparatus in a continuous manner while product liquid is being produced. CEDI includes processes such as continuous deionization, filled cell electrodialysis, or electrodiaresis. The ionic transport properties of electrically active media are an important separation parameter.

In the EDI apparatus illustrated FIG. 1, contaminant ions migrate through the ion depletion chambers 103, 107 and into the electrode chambers 101, 109. The ion exchange material in the composite bed depletion chamber 105, anion depletion chamber 103 and cation depletion chamber 107 are regenerated by water splitting in the composite bed depletion chamber 105. Hydronium produced from water splitting migrates towards the cathode passing though the cation exchange membrane 106 of the composite bed depletion chamber 105, into the cation depletion chamber 107 and ultimately into the cathode chamber 109. Similarly, hydroxide produced from water splitting migrates towards the anode passing though the anion exchange membrane 104 of the composite bed depletion chamber 105, into the anion depletion chamber 103 and ultimately into the anode chamber 101. Electrochemically produced hydronium, which results from oxidation of water at the anode, maintains electroneutrality as hydroxide and contaminant anions migrate into the anode chamber. Similarly, electrochemically produced hydroxide, which results from the reduction of water at the cathode, maintains electroneutrality as hydronium and contaminant cations migrate into the cathode chamber. In the apparatus illustrated in FIG. 1, the feed water hardness must be less than about 1-2 parts-per-million (ppm) (as $CaCO_3$), otherwise precipitation of calcium as calcium carbonate or magnesium as magnesium hydroxide may occur in the cathode chamber causing an increase in device resistance or an increase in the backpressure, decreased flow, and potential plugging in the apparatus. By flowing the electrode rinse first through the anode chamber and then through the cathode chamber, the hardness problem may be reduced since the anode electrode rinse is slightly acidic and thus will help minimize precipitation of calcium carbonate and magnesium hydroxide. Still, feed water with hardness above several ppm (as $CaCO_3$) can cause problems in the apparatus. Another potential problem with this apparatus can occur in the anode chamber. Common anions such as chloride and nitrate can be oxidized in the anode chamber to form electrochemically active species ($ClO_2$ and $NO_2$, respectively). These electrochemically active species can damage the ion exchange material in the anode chamber resulting in decreased lifetime of the EDI apparatus.

Thus, there is a need for an EDI apparatus which reduces or overcomes problems arising from electrode fouling by precipitation or damage to the ion exchange materials of the electrode compartment by electrochemically active compounds (such as oxidizers) while maintaining some or all of the advantages of homogeneous-material ion depletion chambers.

FIG. 1 illustrates an EDI apparatus that may be used for "general purpose" liquid deionization. The apparatus comprises three ion depletion chambers, 103, 105, 107, and two electrode chambers, 101, 109, separated by four ion exchange membranes, 102, 104, 106, and 108. This configuration offers improved deionization capability but may add additional complexity or cost for applications where the deionization requirement is selective. For some applications, the required water purity may require the exhaustive removal of anions or cations, but not both. This is the case in many forms of chemical analysis where a specific element or ion or a group of elements or ions are of interest. For example, in ion chromatography, either anions or cations are typically analyzed using different chemistries. For anion analysis by ion chromatography, the water used to prepare eluent or dilute samples or standards should be free of all anions as any anion in the water will likely manifest itself and either affect calibration (non-zero intercept) or compromise detection by increasing background conductivity. Other examples requiring feed water sources free from specific ions are silicate analyzers, sodium analyzers or phosphate analyzers as typically used to monitor high purity water. In these applications, the primary requirement is that the feed water has concentrations of the analyte(s) at or near the lowest possible levels, typically sub-ppb (part-per-billion) or ppt (part-per-trillion). Since many of these analyzers are used on-line (continuous analysis), it is desirable to have a continuous, highly purified feed water source for the analyzer. Currently, there are no commercially available water purifiers which can easily interface with analytical instruments and supply feed water with extremely low contaminant levels of the analyte ions. Therefore, there is a need for a simple, cost-effective EDI apparatus that may be devoted to a specific purpose.

SUMMARY OF THE INVENTION

Accordingly and advantageously the present invention discloses methods and apparatuses that may address one or more of the issues discussed above. In some embodiments of the present invention, a composite bed concentrate chamber is used to collect and remove the contaminant ions from the liquid. The contaminant ions are hindered from entering the electrode chamber, thus reducing the electrode fouling associated with conventional EDI apparatuses.

In other embodiments of the present invention, the ion exchange efficiency of chambers including homogeneous ion exchange materials may be combined with the benefits of chambers or layers including composite anion-cation ion exchange materials to produce liquids with very low concentrations of contaminant ions. In some embodiments of the present invention, the interface between adjacent layers may be transverse to the applied electric field. In some embodiments of the present invention, the interface between adjacent layers may be parallel to the applied electric field.

These and other advantages are achieved in accordance with the present invention as described in detail below.

BRIEF DESCRIPTION OF THE DRAWINGS

To facilitate understanding, identical reference numerals have been used, where possible, to designate identical elements that are common to the figures. The drawings are not to scale and the relative dimensions of various elements in the drawings are depicted schematically and not to scale.

In the configurations disclosed below, liquid streams flow through the electrode chambers and "concentrate" chambers. In the following configurations, the electrode chambers may act as concentrate chambers or as a source of hydronium and hydroxide ions for regeneration of the ion exchange materials. As concentrate chambers, contaminant ions may eventually migrate into the electrode chambers (under the force of the applied electric field) and may be removed from the electrode chamber by a liquid flow stream. The electrode chamber flow streams may typically be directed to waste. For simplicity of the drawings, the electrode chamber rinse streams and concentrate chamber rinse streams are not shown.

Figure 1:
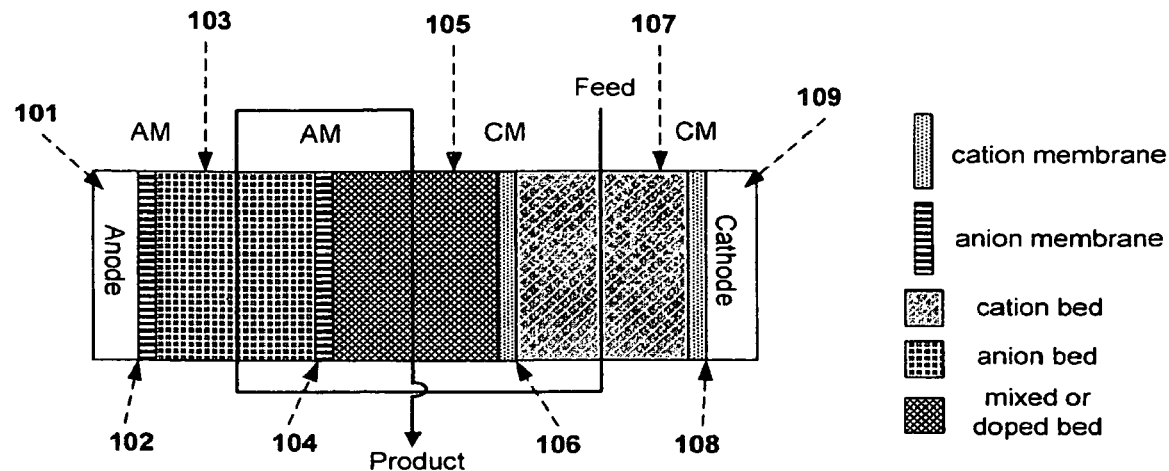

The techniques of the present invention may be readily understood by considering the following detailed description in conjunction with the accompanying drawings, in which:

FIG. 1 is a schematic representation of a EDI configuration.

Figure 2:
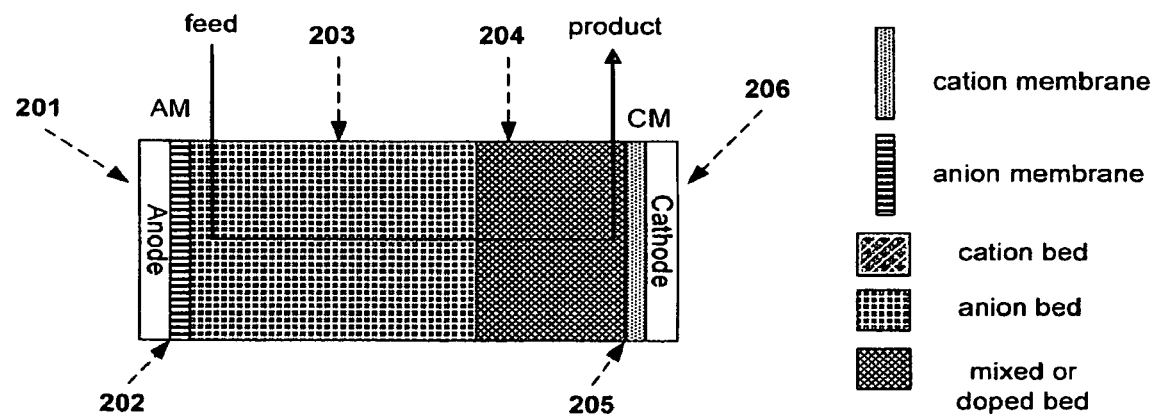

FIG. 2 is a schematic representation of an EDI configuration of one embodiment of the present invention.

Figure 3:
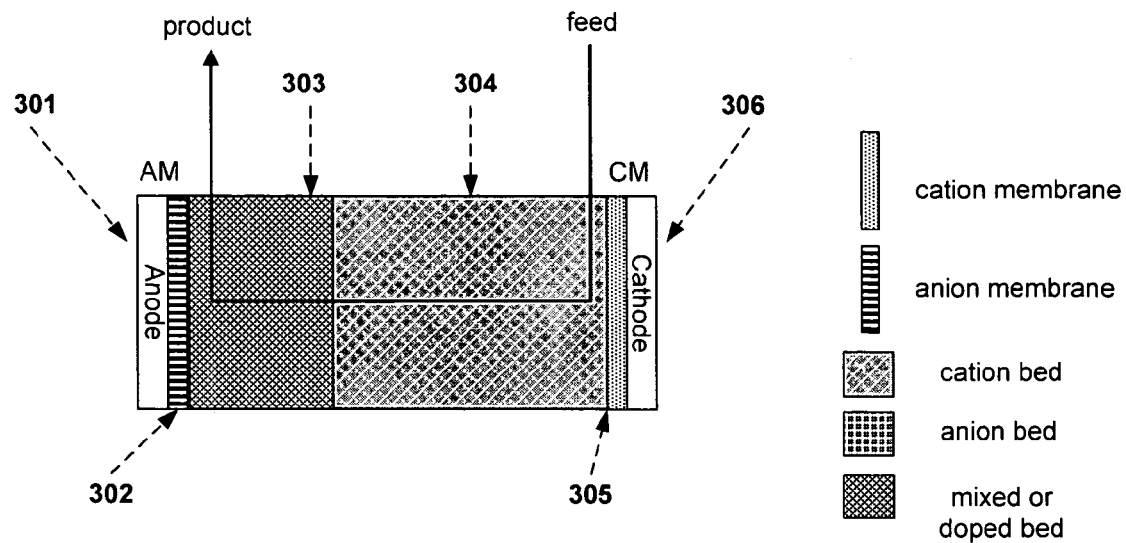

FIG. 3 is a schematic representation of an EDI configuration of one embodiment of the present invention.

Figure 4A:
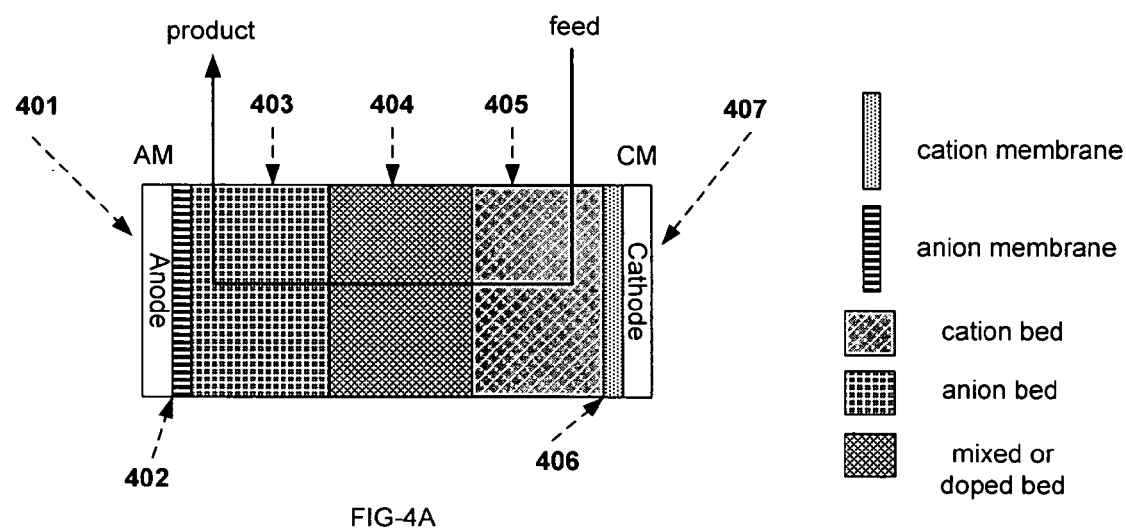
Figure 4B:
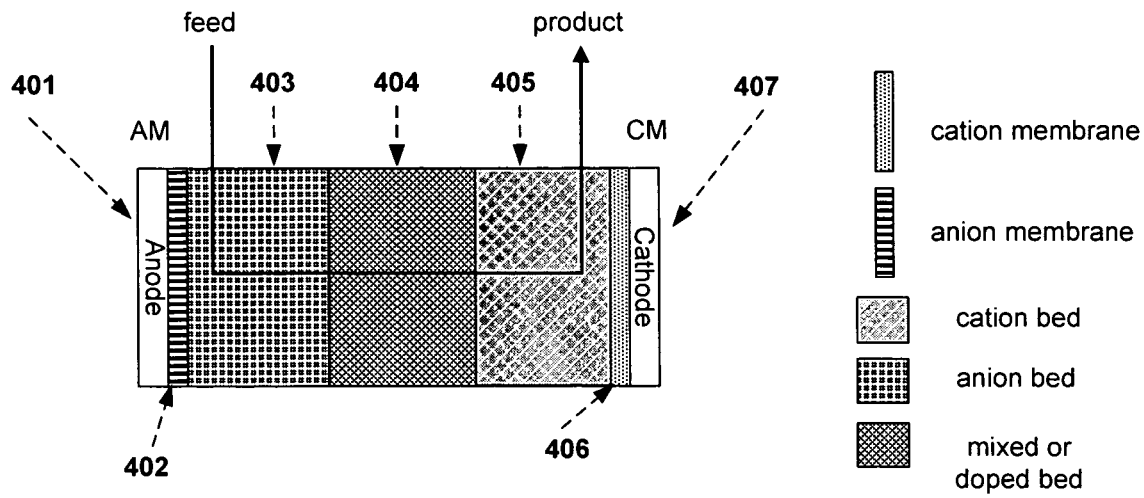

FIG. 4A and FIG. 4B are schematic representations of EDI configurations of embodiments of the present invention.

Figure 5A:
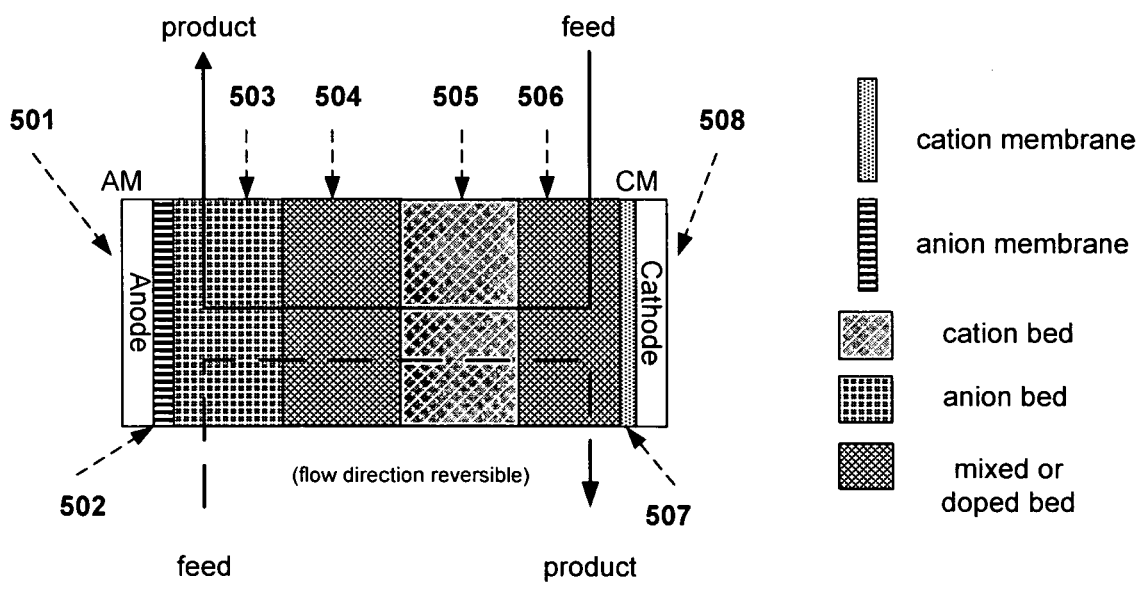
Figure 5B:
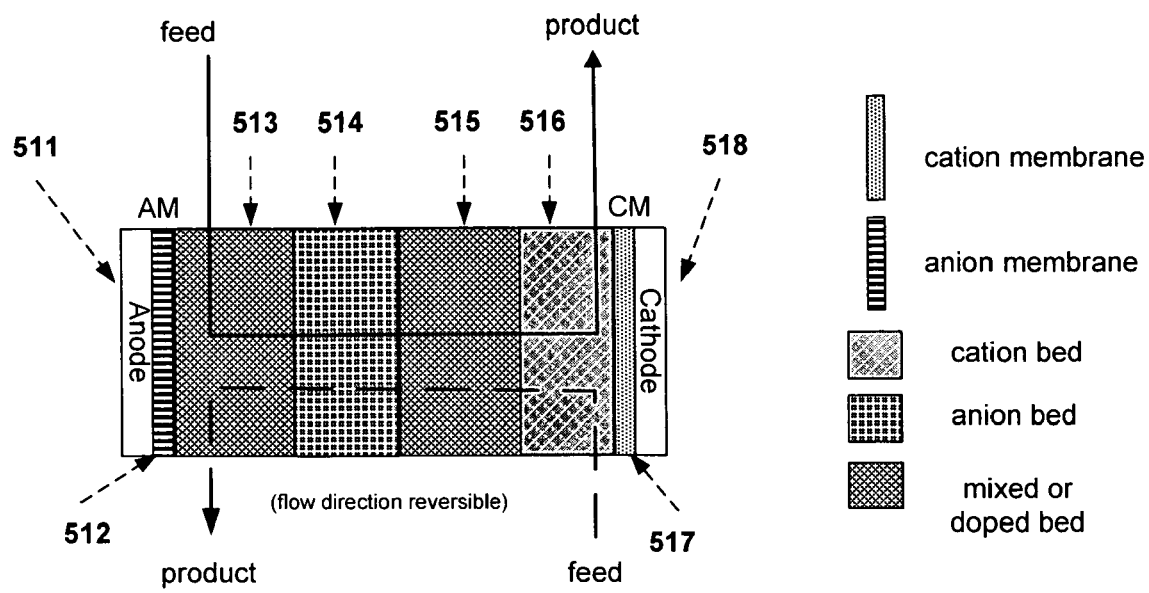

FIG. 5A and FIG. 5B are schematic representations of EDI configurations of embodiments of the present invention.

Figure 6:
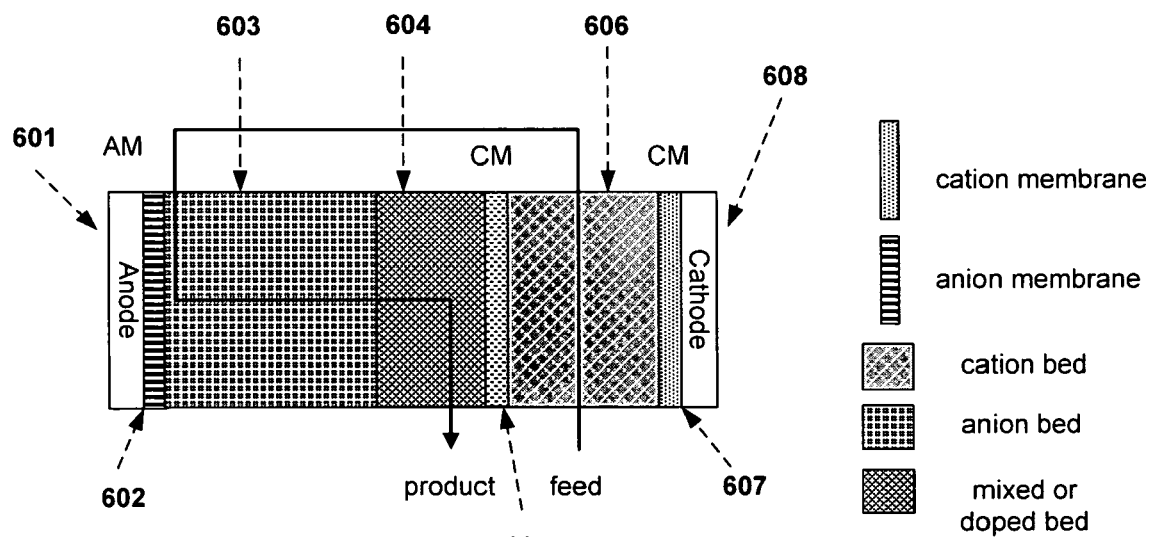

FIG. 6 is a schematic representation of an EDI configuration of one embodiment of the present invention.

Figure 7:
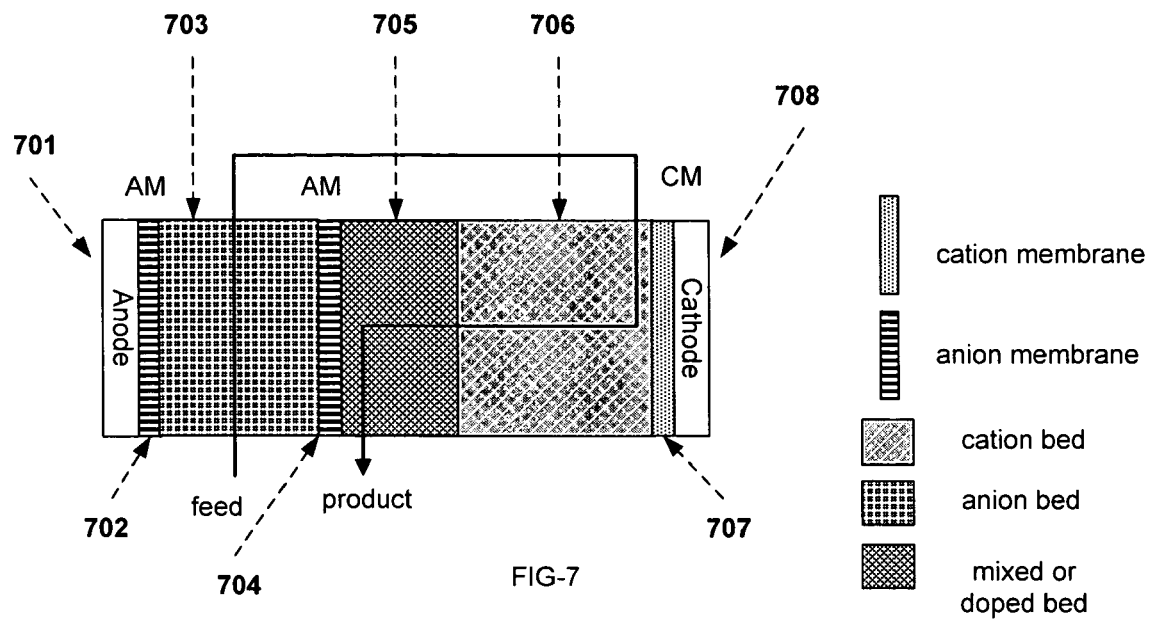

FIG. 7 is a schematic representation of an EDI configuration of one embodiment of the present invention.

Figure 8:
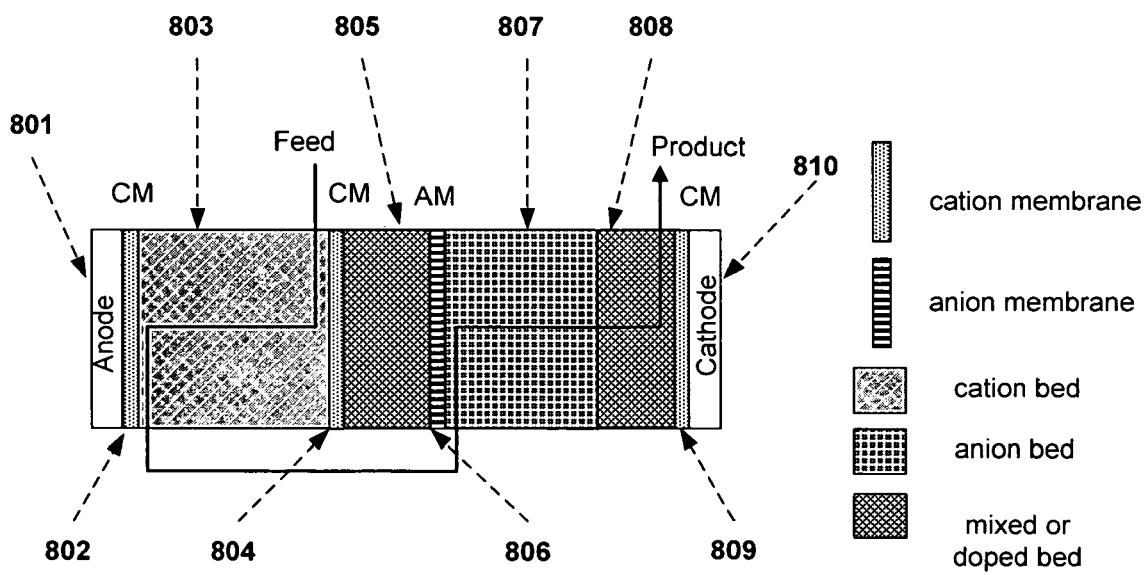

FIG. 8 is a schematic representation of an EDI configuration of one embodiment of the present invention.

Figure 9:
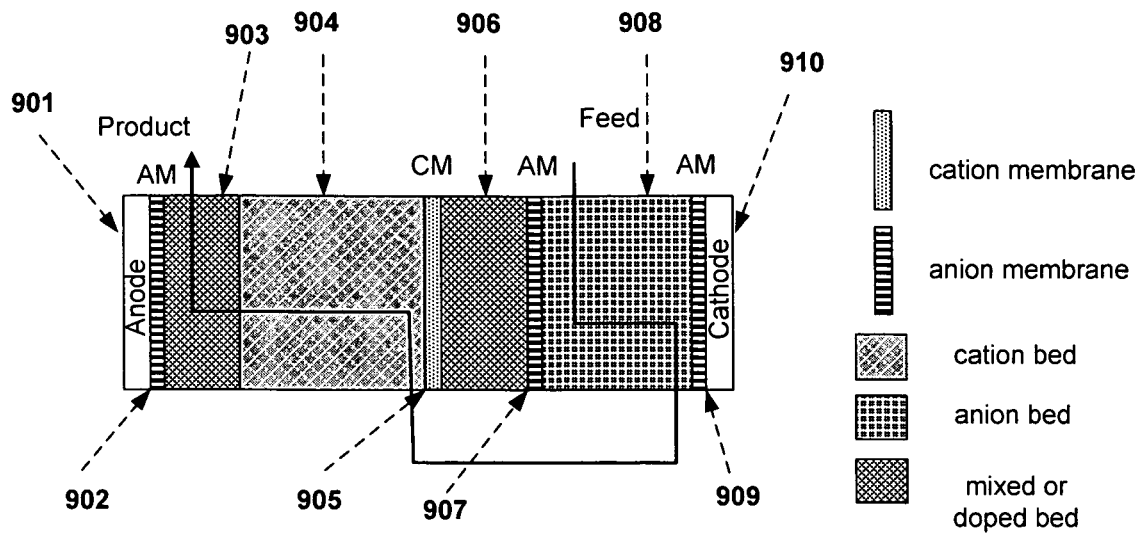

FIG. 9 is a schematic representation of an EDI configuration of one embodiment of the present invention.

Figure 10:
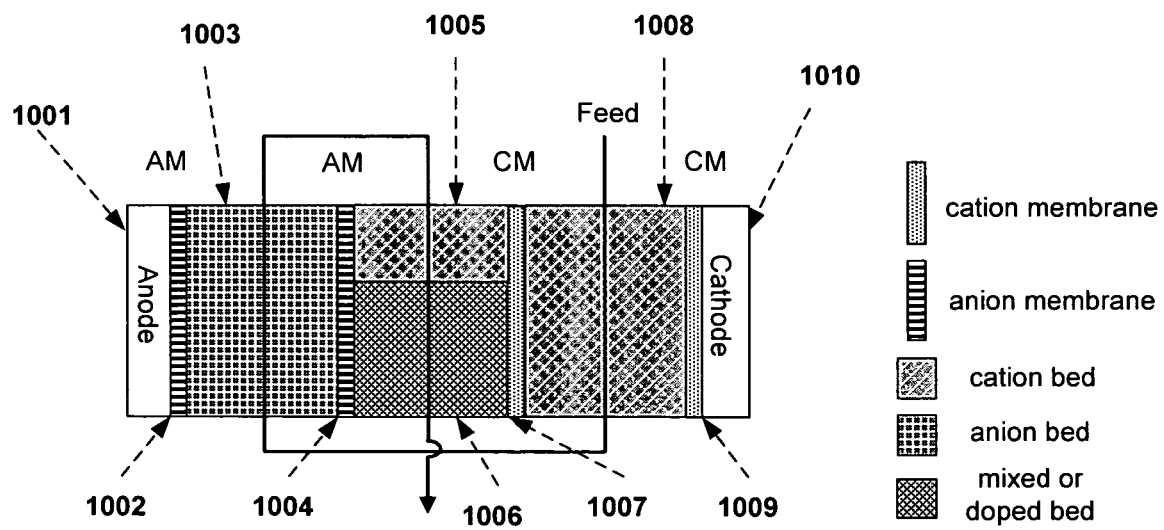

FIG. 10 is a schematic representation of an EDI configuration of one embodiment of the present invention.

Figure 11:
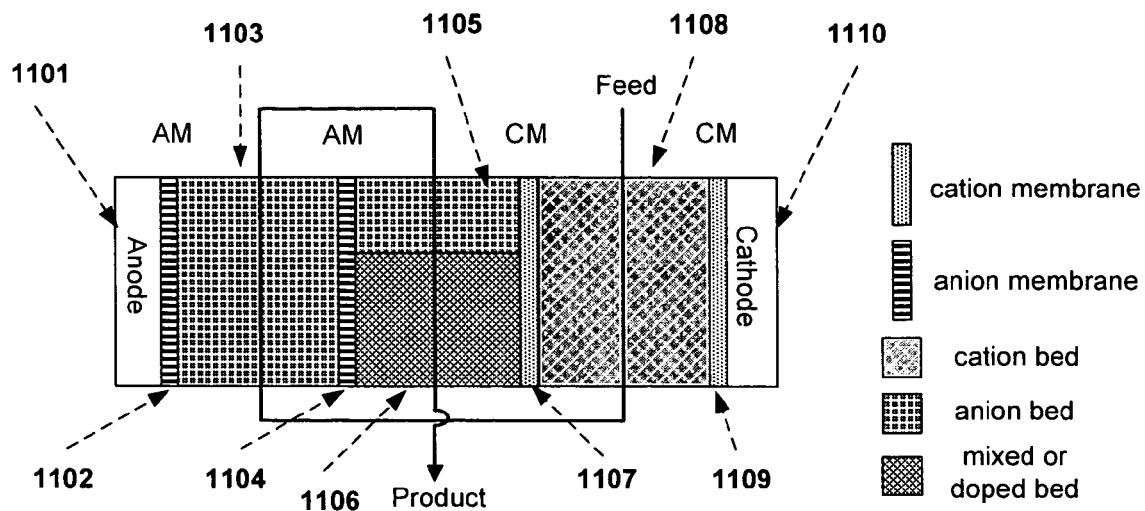

FIG. 11 is a schematic representation of an EDI configuration of one embodiment of the present invention.

Figure 12:
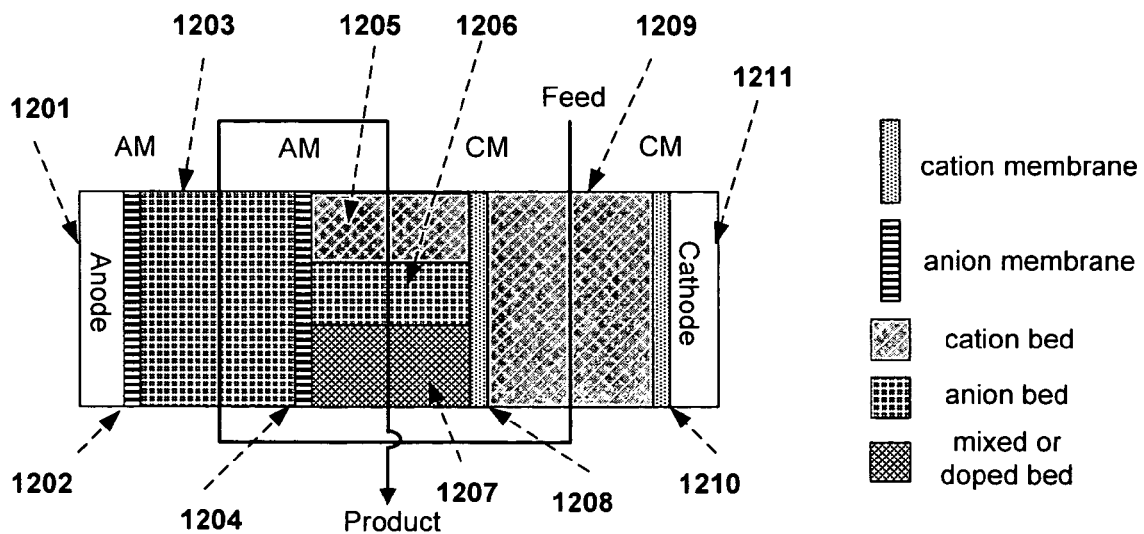

FIG. 12 is a schematic representation of an EDI configuration of one embodiment of the present invention.

Figure 13:
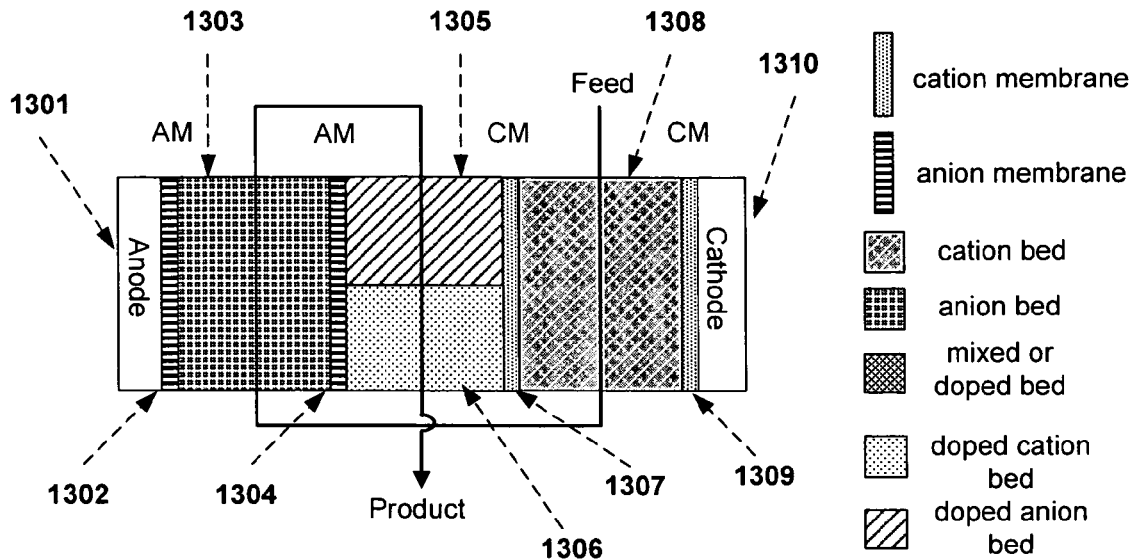

FIG. 13 is a schematic representation of an EDI configuration of one embodiment of the present invention.

Figure 14:
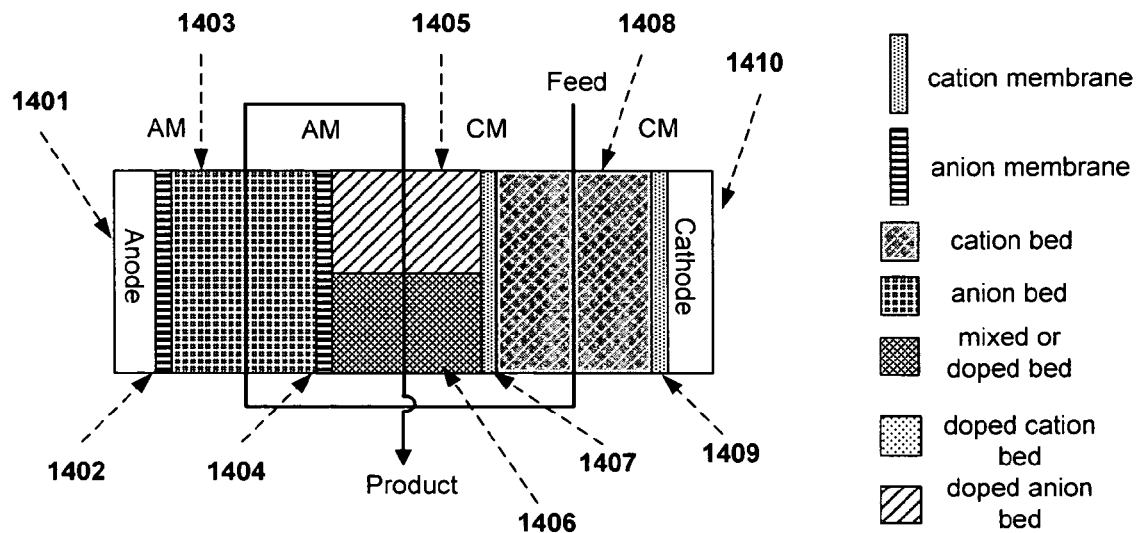

FIG. 14 is a schematic representation of an EDI configuration of one embodiment of the present invention.

Figure 15:
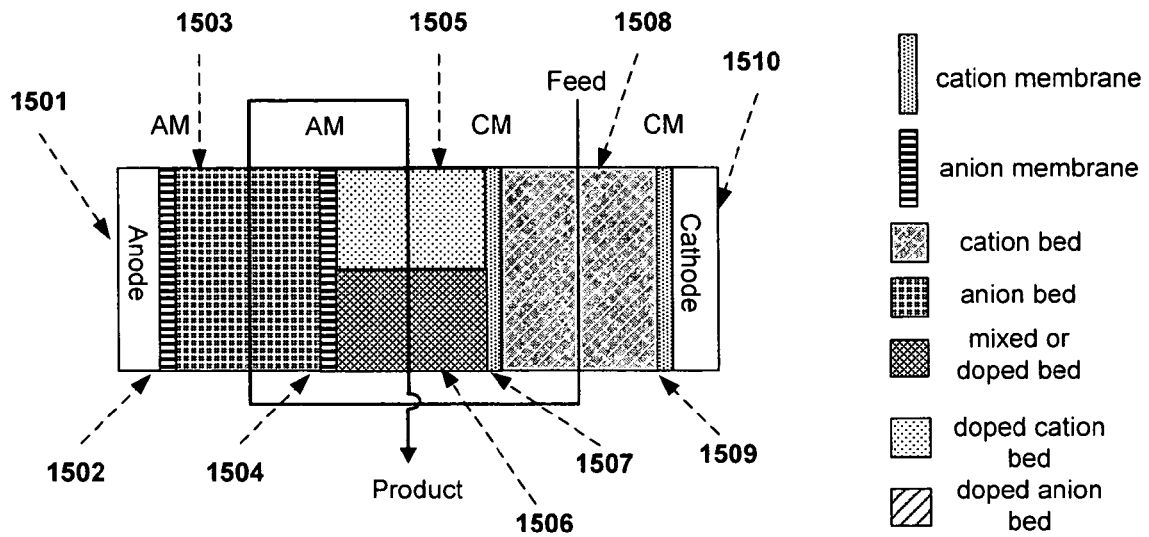

FIG. 15 is a schematic representation of an EDI configuration of one embodiment of the present invention.

Figure 16:
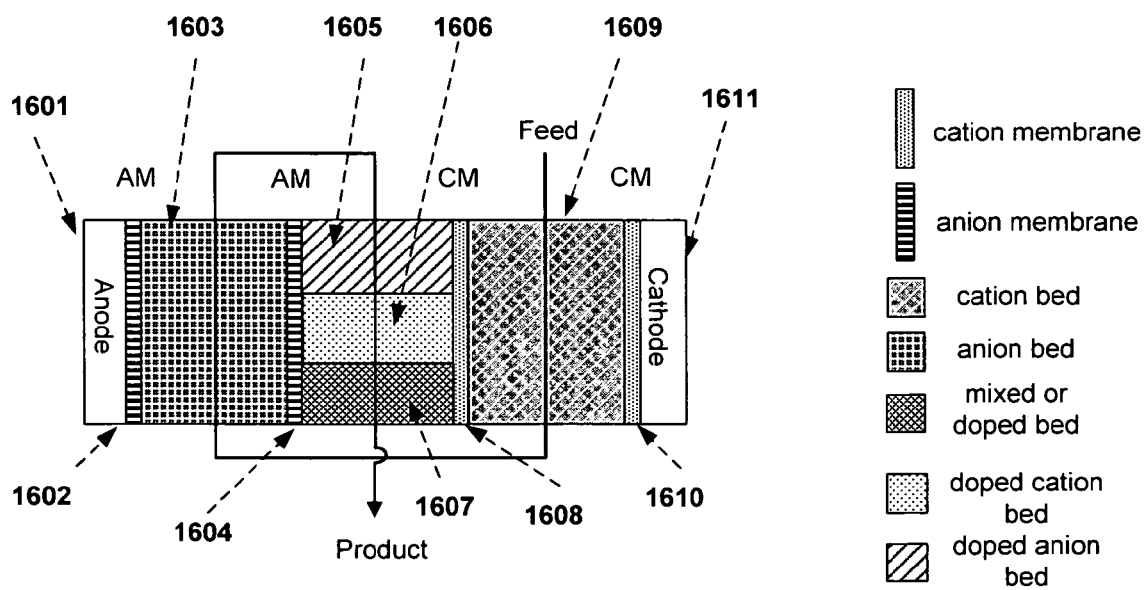

FIG. 16 is a schematic representation of an EDI configuration of one embodiment of the present invention.

DETAILED DESCRIPTION OF THE INVENTION

Abbreviations and Definitions

The following abbreviations and definitions are used herein:

The abbreviation "EDI"=electrodeionization;

The abbreviation "CEDI"=continuous electrodeionization;

The abbreviation "IC"=ion chromatography;

The abbreviation "AM"=anion exchange membrane;

The abbreviation "CM"=cation exchange membrane;

The term "applied electric field" is understood to be the electric field arising from a voltage applied between the anode and the cathode within the EDI apparatus.

In FIGS. 1-16, the anode chamber has been labeled as "anode" for brevity.

In FIGS. 1-16, the cathode chamber has been labeled as "cathode" for brevity.

The term "depletion chamber" is defined as a chamber through which the product liquid stream flows during one of the steps of the process. A depletion chamber may be filled with one of a homogeneous volume of anion exchange material, or a homogeneous volume of cation exchange material, or a mixed ion exchange material, or a doped anion exchange material, or a doped cation exchange material, or may be comprised of "layers" of various ion exchange materials.

The abbreviation "LDC"=layered depletion chamber is a specific type of "depletion chamber" and is defined as a chamber that comprises "layers" of various ion exchange materials wherein the liquid to be processed flows through the layers in a sequential manner.

The term "concentrate chamber" is defined as a chamber wherein the product liquid stream does not flow. Typical examples of a concentrate chamber include an electrode chamber (either anode or cathode), an anodic concentrate chamber (a chamber located adjacent to the anode chamber and separated therefrom by an ion exchange membrane), or a cathodic concentrate chamber (a chamber located adjacent to the cathode chamber and separated therefrom by an ion exchange membrane), or a concentrate chamber (wherein the concentrate chamber is not adjacent to an electrode chamber), among others. Typically, in some embodiments of the present invention, the electrode chambers (either anode or cathode), are not filled with ion exchange material. A concentrate chamber may be filled with a mixture of anion and cation exchange material, or a doped anion exchange material, or a doped cation exchange material.

The term "mixed ion exchange material" is defined as a mixture of anion and cation exchange materials wherein the anion exchange material is responsible for about 50% of the total ion exchange capacity and the cation exchange material is responsible for about 50% of the total ion exchange capacity. The term "mixed ion exchange material" also refers to a chamber that contains a mixture of anion and cation exchange materials wherein the anion exchange material is responsible for a range of about 40% to about 60% of the total ion exchange capacity and the cation exchange material is responsible for the balance of the total ion exchange capacity. This definition is meant to be consistent with the conventional understanding of a "mixed bed" as containing a 50/50 mixture of anion/cation ion exchange materials as well as a small range, typically from ~40% to ~60% on either side of the 50/50 mixture.

The abbreviation "ACC"=anodic concentrate chamber which is defined as a concentrate chamber adjacent to the anode and separated from the anode by an ion exchange membrane. The ACC may contain a homogeneous volume of anion exchange material, or a homogeneous volume of cation exchange material, or a mixed ion exchange material, or a doped anion exchange material, or a doped cation exchange material. This is a chamber wherein the product liquid stream does not flow.

The abbreviation "CCC"=cathodic concentrate chamber which is defined as a concentrate chamber adjacent to the cathode and separated from the cathode by an ion exchange membrane. The CCC may contain a homogeneous volume of anion exchange material, or a homogeneous volume of cation exchange material, or a mixed ion exchange material, or a doped anion exchange material, or a doped cation exchange material. This is a chamber wherein the product liquid stream does not flow.

The abbreviation "ADC"=anion depletion chamber is defined as a chamber that typically includes therein a homogeneous volume of anion exchange material. These chambers have been labeled as "anion bed" in the legend of FIGS. 1-16 for brevity.

The abbreviation "CDC"=cation depletion chamber is defined as a chamber that typically includes therein a homogeneous volume of cation exchange material. These chambers have been labeled as "cation bed" in the legend of FIGS. 1-16 for brevity.

The abbreviation "CBCC"=composite bed concentrate chamber. A composite bed concentrate chamber may be filled with a mixed ion exchange material, or a doped anion exchange material, or a doped cation exchange material.

The abbreviation "ACBCC"=anodic composite bed concentrate chamber is defined as the composite bed concentrate chamber adjacent to the anode and separated from the anode by an ion exchange membrane. The ion exchange membrane may be an AM or a CM. The ACBCC chamber may be filled with a mixed ion exchange material, or a doped anion exchange material, or a doped cation exchange material.

The abbreviation "CCBCC"=cathodic composite bed concentrate chamber is defined as the composite bed concentrate chamber adjacent to the cathode and separated from the cathode by an ion exchange membrane. The ion exchange membrane may be an AM or a CM. The CCBCC chamber may be filled with a mixed ion exchange material, a doped anion exchange material, or a doped cation exchange material.

The abbreviation "ACBDC"=anodic composite bed depletion chamber is defined as the composite bed depletion chamber adjacent to the anode and separated from the anode by an ion exchange membrane. The ion exchange membrane may be an AM or a CM. The ACBDC chamber may be filled with a mixed ion exchange material, or a doped anion exchange material, or a doped cation exchange material.

The abbreviation "CCBDC"=cathodic composite bed depletion chamber is defined as the composite bed depletion chamber adjacent to the cathode and separated from the cathode by an ion exchange membrane. The ion exchange membrane may be an AM or a CM. The CCBDC chamber may be filled with a mixed ion exchange material, a doped anion exchange material, or a doped cation exchange material.

The abbreviation "CBDC"=composite bed depletion chamber is defined as the composite bed depletion chamber that is not adjacent to either the cathode chamber or the anode chamber. The CBDC chamber may be filled with a mixed ion exchange material, or a doped anion exchange material, or a doped cation exchange material.

The terms "dopant" and "doping agent" refer to a material that is added to another material. In EDI, a dopant typically includes materials such as an inert material, an electrically active non-ion exchange material, ion exchange materials, or mixtures thereof. Typically, ion exchange material, such as anion exchange materials or cation exchange materials is added to a volume of the opposite ion exchange materials to adjust the electrical conductivity. In some instances, doping of ion exchange materials facilitate the transport of contaminant ions or may provide for water splitting which can produce regenerant ions (hydronium and hydroxide).

The term "doped cation exchange material" is defined as a composite of anion and cation exchange materials wherein the cation exchange material is responsible for at least about 60% of the total ion exchange capacity and the remainder of the total ion exchange capacity is contributed by anion exchange material. That is, the mixture is primarily a cation exchange material. This definition is meant to distinguish a "doped cation exchange material" from the conventional understanding of a "mixed ion exchange bed" (or material)". That is, "mixed ion exchange material (or bed)" is used herein to denote a bed having approximately equal cation and anion ion exchange capacities (typically equal to within about ±10%) while "doped cation exchange material" denotes an ion exchange material in which cation exchange clearly predominates and the anion exchange material is a "dopant" or minority contributor. The doped cation exchange material may be advantageous in that they can be used to alter the conductivity through the EDI apparatus and improve the performance of the EDI apparatus.

The term "doped anion exchange material" is defined in a complimentary manner to "doped cation exchange material" described above. That is, "doped anion exchange material" is a composite of anion and cation exchange materials wherein the anion exchange material is responsible for at least about 60% of the total ion exchange capacity and the remainder of the total ion exchange capacity is contributed by the cation exchange material. That is, the mixture is primarily an anion exchange material. This definition is meant to distinguish a "doped anion exchange material" from the conventional understanding of a "mixed ion exchange bed". The doped anion exchange materials may be advantageous in that they can be used to alter the conductivity through the EDI apparatus and improve the performance of the EDI apparatus.

The terms "hard" and "hardness" when used in reference to water, indicates water that contains concentrations (typically expressed in parts-per-million, (ppm)) of various minerals, such as calcium and magnesium carbonates, bicarbonates, sulfates, or chlorides. The presence of such dissolved minerals typically arises from prolonged contact with rocky substrates and soils. Such hardness in water tends to discolor, scale, and corrode materials.

The term "scale" refers to a solid deposit on a surface in contact with a liquid in which the deposit includes mineral compounds present in the liquid, e.g., calcium carbonate.

The term "water splitting" refers to the hydrolysis of water to hydronium and hydroxide ions, which occurs at the interface of anion exchange materials and cation exchange materials in the presence of an electric potential. This is not a true electrochemical process, and differs from the electrolysis of water at an electrode in that water splitting does not produce hydrogen or oxygen gas whereas conventional electrolysis of water produces both gases.

The terms "eluant" and "eluent" refer to a substance used to effect the separation of ions from a separation column in an elution process. Examples of eluents include, but are not limited to, an acid or a base.

The term "elution" refers to the process of using an eluent to extract ions from a separation column.

The term "eluate" refers to the product or substance that is separated from a column in an elution process.

After considering the following description, those skilled in the art will clearly realize that the teachings of the invention can be readily utilized in liquid purification, specifically deionization, through the use of various EDI apparatuses and methods in various ways.

Two earlier patent applications are assigned to the Assignee of the present invention and describe five chambered EDI apparatuses. One is entitled "Method of Ion Chromatography wherein a Specialized Electrodeionization Apparatus is Used" (application Ser. No. 11/403,737) and published as US 2006/0231404. The other is entitled "Chambered Electrodeionization Apparatus with Uniform Current Density, and Method of Use" (application Ser. No. 11/403,734 and published as US 2006/0231403). The entire contents of both applications are hereby incorporated herein by reference in their entirety.

A related patent application filed concurrently herewith and entitled "Methods and Apparatus for Electrodeionization" is assigned to the Assignee of the present invention. The entire contents of this application are hereby incorporated herein by reference in its entirety.

The types of ion exchange materials that are typically of the most interest for the deionizations described herein are strong acid cation exchange materials and strong base anion exchange materials. The strong acid cation exchange material advantageously has a sulfonate-type ion exchange site (or functional group) while the anion exchange material typically has a quaternary amine ion exchange site (or functional group). There are different types of cation and anion exchange materials which are not inherently excluded from use in connection with the deionizations described herein, but one type of cation exchange material and one type of anion exchange material as described are typically found to provide adequate performance in practice and are generally used.

If the anion material and cation material are mixed in the desired ratio of substantially equal cation and anion exchange capacities, this is referred to as a "mixed" bed. This comports with the conventional understanding of a "mixed bed ion exchange material" as an ion exchange material that has approximately equal anion and cation exchange capacity with one type of anion material and one type of cation material. This is typically achieved by mixing a cation exchange material (typically a cation exchange resin) with an anion exchange material (typically an anion exchange resin) in a ratio such that the cation and anion exchange capacities of the final mixture are roughly equal. In practice, it is usually not feasible to achieve precise equality but commonly the range, of anion capacity in the mixed bed can be about 40%-60% with the remaining capacity as cation capacity.

The "composite bed" concept as used herein relates to a composite as a mixture of a cation and an anion exchange material without reference to the proportions of each. That is, in a composite bed the ion exchange capacity ratio could range from about 1% to about 99% of either material and the balance comprising the opposite material type. Generally, three types of composite beds are considered:

1. A "mixed bed" where the ratio of anion to cation capacity is approximately 1:1 with a range of about 10% (that is, 40%-60% of either cation or anion capacity).
2. A "doped" anion bed where the anion capacity is at least about 60% and the remaining capacity is cation.
3. A "doped" cation bed where the cation capacity is at least about 60% and the remaining capacity is anion.

Simply put, as the proportion of cation exchange material $P_c$ in a "composite bed" is increased from about 1% to about 99% we encounter first the particular type of composite bed called a "doped anion bed" for $P_c$ less than about 40%. A "mixed bed" is produced for $P_c$ greater than about 40% and less than about 60%, and a "doped cation bed" for $P_c$ greater than about 60%.

The EDI apparatus shown in FIG. 1 is an example of an EDI apparatus, which comprises five discreet membrane bound chambers in electrical communication (although other embodiments can have more than five chambers). The apparatus illustrated in FIG. 1 comprises an anode chamber 101 separated from an ADC 103 by a first AM 102. The anode chamber 101 includes an anode therein that typically is in electrical contact with the first AM 102. The ADC 103 typically includes therein a homogeneous volume of anion exchange material. A composite bed depletion chamber (or simply CBDC) 105 may be placed on the cathode-side of the ADC 103. The ADC 103 and the CBDC 105 may be separated by a second AM 104. The CBDC 105 may include therein a mixed ion exchange material, or a doped anion exchange material, or a doped cation exchange material. The doped anion exchange material, or doped cation exchange material versions may be advantageous in that they can be used to improve the conductivity through the EDI apparatus and improve the performance of the EDI apparatus. A CDC 107 may be placed on the cathode-side of the CBDC 105. The CBDC 105 and the CDC 107 may be separated by a first CM 106. The CDC 107 typically includes therein a homogeneous volume of cation exchange material. The CDC 107 may be separated from the cathode chamber 109 by a second CM 108. The cathode chamber 109 includes a cathode therein that is advantageously in electrical contact with the second CM 108. When additional (more than five) membrane bound chambers are present, they may be typically present in pairs of additional homogeneous anion and cation depletion chambers, which may be added next to existing like chambers, which are present between an electrode and the CBDC 105. An electrical current runs through the EDI apparatus transverse to the membranes, conventionally from left to right for the apparatus depicted in FIG. 1 as the direction of flow of positive charges.

Each CDC may be bounded by two cation exchange membranes and may contain a volume of homogeneous cation exchange material. The cation exchange material may comprise cation exchange resins, cation exchange particles, cation exchange fibers, cation exchange screens, cation exchange monoliths, and combinations thereof. Typically, the cation exchange material may be a volume of homogeneous cation exchange resin.

The CBDC may be bounded by a cation exchange membrane from a CDC and an anion exchange membrane from an ADC, and the chamber may contain a mixed ion exchange material, or a doped anion exchange material, or a doped cation exchange material. The ion exchange material may comprise ion exchange resins, ion exchange particles, ion exchange fibers, ion exchange screens, ion exchange monoliths, and combinations thereof.

Each ADC may be bounded by two anion exchange membranes and may contain a volume of homogeneous anion exchange material. The anion exchange material may comprise anion exchange resins, anion exchange particles, anion exchange fibers, anion exchange screens, anion exchange monoliths, and combinations thereof. Typically, the anion exchange material may be a volume of homogeneous anion exchange resin.

The ion exchange membranes used in the CEDI apparatuses to practice some embodiments of the present invention work by passive transfer and not reactive chemistry. They may contain functional sites, which allow for the exchange of ions. The transfer of ions through the ion exchange membrane is based upon the charge of the ion. The ion exchange membranes may readily admit small ions but resist the passage of bulk liquid for example. Ion exchange membranes may be anion exchange membranes (AM) or cation exchange membranes (CM), wherein they are selective to anions or cations respectively. An AM may transport anions through the membrane, but the membrane prevents the bulk flow of liquid from one side of the membrane to the other. A CM may transport cations through the membrane, but the membrane prevents the bulk flow of liquid from one side of the membrane to the other. A property common to both types of membranes is that they must be conductive so that ions may migrate through the ion exchange membrane towards their respective electrodes.

An example of an anion exchange membrane is a microporous copolymer of styrene and divinylbenzene that has been chloromethylated and then the pendant —$CH_2Cl$ groups that were introduced to the aromatic rings were then quaternized with a tertiary amine $R_1R_2R_3N$ where $R_1$, $R_2$, and $R_3$ represent organic groups and may represent different organic groups or may represent the same organic group. This results in a membrane which may be a strong base anion exchanger. In some cases, the anion exchange membrane may also contain a binder polymer or an inert fabric. An example of an anion exchange membrane that may be used in connection with some embodiments of the present invention is the AMI-7000S membrane (Membranes International, Glen Rock, N.J.). Other anion exchange membranes which provide a strong base anion exchanger may also be used.

An example of a cation exchange membrane is a microporous copolymer of styrene and divinylbenzene that has undergone sulfonation, resulting in the monosubstitution of —$SO_3H$ groups on the aromatic rings of the copolymer. This results in a membrane which may be a strong acid cation exchanger. In some cases, the cation exchange membrane may also contain a binder polymer or an inert fabric. An example of a cation exchange membrane that may be used in connection with some embodiments of the present invention is the CMI-7000S membrane (Membranes International, Glen Rock, N.J.). Other cation exchange membranes which provide a strong acid cation exchanger may also be used.

The ion exchange materials used in the EDI apparatuses of the kind used to practice some embodiments of the present invention may contain functional sites, which allow for the exchange of ions. The interaction between ions and the ion exchange materials is based upon the charge of the ion. The ion exchange materials may readily admit small ions and molecules but resist the intrusion of species of even a few hundred atomic mass units. Ion exchange materials may be anion exchange materials or cation exchange materials, wherein they are selective to anions or cations respectively.

An example of an anion exchange resin is a microporous copolymer of styrene and divinylbenzene that has been chloromethylated and then the pendant —$CH_2Cl$ groups that were introduced to the aromatic rings were then quaternized with a tertiary amine $R_1R_2R_3N$ where $R_1$, $R_2$, and $R_3$ represent organic groups and may represent different organic groups or may represent the same organic group. This results in a resin which may be a strong base anion exchanger. There are several commercially available resins of this type. One example of an anion exchange resin that may be used is the Dowex 1x4 resin (Dow Chemical Company, Midland, Mich.), which contains 4% divinylbenzene and is in the ionic form $Cl^-$. Other anion exchange resins which provide a strong base anion exchanger may also be used.

An example of a cation exchange resin is a microporous copolymer of styrene and divinylbenzene that has undergone sulfonation, resulting in the monosubstitution of —$SO_3H$ groups on the aromatic rings of the copolymer. This results in a resin which may be a strong acid cation exchanger. There are several commercially available resins of this type. One example of a cation exchange resin that may be used is the Dowex 50Wx4 resin (Dow Chemical Company, Midland, Mich.), which contains 4% divinylbenzene and is in the ionic form $H^+$. Other cation exchange resins which provide a strong acid cation exchanger may also be used.

The CBDC may serve two functions, among others. First, when an electric field is applied, water splitting occurs wherever anion and cation exchange materials are in direct contact with one another. Water splitting occurs where a cation and anion exchange material contact one another, or where a cation exchange material contacts an anion exchange membrane, or where an anion exchange material contacts a cation exchange membrane. Water splitting results in the production of hydroxide and hydronium, which serve to maintain the anion exchange material in the hydroxide form and the cation exchange material in the hydronium form, respectively. As well as keeping the materials of the CBDC fully regenerated, the hydroxide and hydronium formed at the ion exchange material/ion exchange membrane interfaces of the CBDC serve to provide hydroxide for the at least one ADC(s) and hydronium for the at least one CDC(s).

A second function of the CBDC may be to remove from the feed water, the few remaining (if any) anions not removed by the ADC and the few remaining (if any) cations not removed by the CDC. Ion transport in a composite bed ion exchange material relies on both water splitting as well as electrophoretic migration of the ion through the material. Water splitting may displace contaminant ions from the ion exchange material. These contaminant ions may be driven through the composite ion exchange material bed of the CBDC towards their respective electrode chambers. Thus, contaminant cations may be driven through the CBDC, through a CM, through the CDC(s), and through a CM, to the cathode chamber. Likewise, contaminant anions may be driven through the CBDC, through an AM, through the ADC(s), and through an AM, to the anode chamber.

Water splitting generates hydronium and hydroxide ions which may be used to regenerate ion exchange materials. Under the force of an applied electric field, water splitting can occur at the junction of anion and cation exchange materials. These junctions occur in the CBDC, since this chamber contains both anion and cation exchange materials and membranes. Hydronium from the CBDC may travel through the CM to the CDC, thus regenerating the cation exchange materials found within. Likewise, hydroxide from the CBDC may travel through the AM to the ADC, thus regenerating the anion exchange materials found within.

The following discussion will describe the movement of ions through the CBDC. For this discussion, it will be assumed that the CBDC is filled with ion exchange particles. An example of such ion exchange particles includes ion exchange resins. For a contaminant ion to be removed from the CBDC, the contaminant ion must either come in contact with the respective membrane or be retained by an ion exchange material particle in contact with a like ion exchange membrane (cation material-cation membrane or anion material-anion membrane). An ion that is in a material particle and electrophoretically migrating through the material can only move to the next like particle (anion or cation exchange) if the two particles are in contact with one another, or if the contaminant ion leaves the ion exchange material particle as a result of water splitting. Since the CBDC contains a mixture of anion and cation exchange materials, it is statistically unlikely, for the typical densities of ion exchange materials used in practice, that there will be a continuous path of like ion exchange material particles of any significant distance, thus, electrophoretic migration in the chamber is advantageously accompanied by displacement and retention (caused by water splitting) for efficient ion removal. This is in contrast to the mechanism of ion removal in the ADC and CDC where no water splitting occurs (since these chambers contain only one type of ion exchange material). In the ADC and CDC, contaminant ions may be removed by electrophoretic migration through the ion exchange material bed to and through the ion exchange membrane and ultimately to the electrode chamber.

For example, chloride retained by the anion exchange material of the CBDC may be displaced by water splitting. The hydroxide ions formed from water splitting may displace the contaminant anions (for example $Cl^-$) from the anion exchange material and the chloride goes into solution where it is "paired" with hydronium ions from the water splitting reaction. The contaminant $Cl^-$ (as hydrochloric acid, HCl) may now move through the composite ion exchange material bed where it may be retained again by anion exchange, where the displacement-retention mechanisms continue to occur. Eventually, the contaminant $Cl^-$ may come in contact with an anion exchange material particle that is in contact with the anion exchange membrane, and the contaminant $Cl^-$ ion may be passed through the AM into the ADC.

The analogous situation occurs for a cation contaminant. For example, sodium retained by the cation exchange material of the CBDC may be displaced by water splitting. The hydronium ions formed from water splitting may displace the contaminant cations (for example $Na^+$) from the cation exchange material and the cation goes into solution where it is "paired" with hydroxide ions from the water splitting reaction. The contaminant $Na^+$ (as sodium hydroxide, NaOH) may now move through the composite ion exchange material bed where it may be retained again by cation exchange, where the displacement-retention mechanisms continue to occur. Eventually, the contaminant $Na^+$ may come in contact with a cation exchange material particle that is in contact with the cation exchange membrane, and thus the contaminant $Na^+$ ion may be passed through the cation membrane into the CDC.

A method for performing electrodeionization utilizing the apparatus as illustrated in FIG. 1 comprises first causing the liquid to be deionized to flow through the CDC 107. The CDC 107 may be capable of removing cations. The CDC 107 typically includes therein cation exchange materials and may be effective at removing the contaminant cations. The cations may be allowed to pass through a second CM 108 and into the cathode chamber 109. The contaminant cations may be removed from the system in the cathode chamber 109. The cations cannot travel toward the anode because of the influence of the applied electric field. Therefore, the cations may be effectively contained in the cathode chamber 109 until they are flushed from the system by the waste liquid stream that removes ions from the cathode chamber 109. The anions are attracted toward the anode under the influence of the applied electric field but will not be allowed to pass through a first CM 106 into the adjacent CBDC 105. Therefore, the anions will be retained in the liquid. The liquid exiting the CDC 107 has a reduced level of cations relative to the in-coming liquid stream.

Following passage through 107, the liquid is then flowed through the ADC 103. The ADC 103 may be capable of effectively removing contaminant anions from the liquid stream. The anions are attracted to the anode under the influence of the applied electric field and may be allowed to pass through a first AM 102 and into the anode chamber 101. The contaminant anions may be removed from the system in the anode chamber 101. The cations are not allowed to pass through a second AM 104 that defines the cathode-side of the ADC 103. The anions cannot travel toward the cathode because of the influence of the applied electric field. Therefore, the anions are effectively contained in the anode chamber 101 until they are flushed from the system by the waste liquid stream that removes ions from the anode chamber 101. Any remaining cations are largely unaffected while passing through the ADC 103. The liquid exiting the ADC 103 may be largely free of anionic contamination.

Following passage through 103, the liquid is then flowed through the CBDC 105. The CBDC 105 may be capable of effectively removing any remaining cations or anions from the liquid stream. The anions are attracted to the anode under the influence of the applied electric field and may be allowed to pass through a second AM 104 and into the ADC 103. The contaminant anions may be removed from the system in the anode chamber 101. One benefit of this configuration is that this prevents fouling and scaling of the anode chamber 101 since the anions cannot react with cations to form insoluble scaling materials (i.e., $CaCO_3$, $Mg(OH)_2$, etc.). The anions cannot travel toward the cathode because of the influence of the applied electric field. Therefore, the anions may be effectively removed in the ADC 103 or contained in the anode chamber 101 until they are flushed from the system by the waste liquid stream that removes ions from the anode chamber 101. The cations are attracted to the cathode under the influence of the applied electric field and may be allowed to pass through a first CM 106 and into the CDC 107. The contaminant cations may be removed from the system in the cathode chamber 109. The cations cannot travel toward the anode because of the influence of the applied electric field. Therefore, the cations may be effectively removed in the CDC 107 or contained in the cathode chamber 109 until they are flushed from the system by the waste liquid stream that removes ions from the cathode chamber 109.

Water splitting occurs in the CBDC 105 since it may include therein a composite of anion and cation exchange materials. The water splitting in the CBDC 105 serves to regenerate the second AM 104 that separates the CBDC 105 from the ADC 103 as well as the first CM 106 that separates the CBDC 105 from the adjacent CDC 107. Additionally, hydronium ions generated by the water splitting are attracted to the cathode and enter the adjacent CDC 107 where they may be effective in regenerating the cation exchange material contained therein. Additionally, hydroxide ions generated by the water splitting are attracted to the anode and enter the adjacent ADC 103 where they may be effective in regenerating the anion exchange material contained therein.

Example 1

An EDI device as shown in FIG. 1 was constructed using machined high density polyethylene hardware to retain the electrodes, membranes and ion exchange resin. In this example, the device was substantially cylindrical in shape with a substantially circular cross-section. Other shapes and cross-sections are feasible, but circular was convenient for this example. The internal flow dimensions of the ADC 103 were 1.27 cm in diameter and 3.81 cm in length. The internal flow dimensions of the CBDC 105 were 1.27 cm in diameter and 1.27 cm in length. The internal flow dimensions of the CDC 107 were 1.27 cm in diameter and 3.81 cm in length.

The anode chamber 101, for this example, contained platinum gauze electrodes (Unique Wire Weaving Inc, Hillside, N.J.). In contact with the anode and separating the anode chamber from the ADC was an anion exchange membrane 102 (AMI-7001S, a product of Membranes International, Glen Rock, N.J.). The ADC was filled with an anion exchange resin (DOWEX™ 1X4 (200 mesh), a product of The Dow Chemical Company, Midland, Mich.). An anion membrane 104 separated the ADC from the CBDC 105. The CBDC contained a doped anion resin bed. The doped anion resin bed consisted of a composite of an anion exchange resin (DOWEX™ 1x4 (200 mesh), a product of The Dow Chemical Company, Midland, Mich.) and a cation exchange resin (DOWEX™ 50Wx4 (200 mesh), a product of The Dow Chemical Company, Midland, Mich.) with an ion exchange capacity ratio of 3:1 anion to cation. The cation and anion exchange resins were in the hydronium and hydroxide forms, respectively. Separating the CDC 107 from the CBDC 105 was a cation exchange membrane 106 (CMI-7000, a product of Membranes International, Glen Rock, N.J.). The CDC was filled with a cation exchange resin (DOWEX™ 50Wx4 (200 mesh), a product of The Dow Chemical Company, Midland, Mich.). The CDC was separated from the cathode chamber 109 by a cation membrane 108 (CMI-7000, a product of Membranes International, Glen Rock, N.J.). The cathode compartment contained platinum gauze electrodes (Unique Wire Weaving Inc, Hillside, N.J.). The cathode was in direct contact with the cation membrane separating the CDC and cathode chamber. A pump (GP40, a product of Dionex, Sunnyvale, Calif.) was used to deliver reverse osmosis (RO) quality water (specific conductance 15.1 µS/cm, S=Siemens) at a flow rate of 2.0 mL/min to the EDI device shown in FIG. 1. A conductivity detector (CD20, a product of Dionex, Sunnyvale, Calif.) with a flow cell was used for the conductivity measurements. From the pump, the RO water flow was directed to the CDC 107, then to the ADC 103, then to the CBDC 105 and then to the flow-through conductivity cell. A peristaltic pump (MASTERFLEX LS, a product of the Cole-Parmer company, Vernon Hills, Ill.) was used to deliver deionized water at a flow rate of 2.0 mL/min to the anode chamber and then to the cathode chamber and then to waste.

Initially, the conductance of the water exiting the EDI device was 8.3 µS/cm. Using a laboratory power supply, (E3612A, a product of Agilent, Santa Clara, Calif.) a constant current of 40 mA was applied and the initial voltage was 42V. Gas evolution was observed immediately from the anode and cathode chambers. The initial background conductivity of the product water increased to 85 µS/cm and over a 1 hour period the conductivity decreased to 1.2 µS/cm. The EDI device was allowed to operate continuously for 7 days. The data in Table 1 shows results for the device of FIG. 1.

TABLE 1

Conductance Measurements vs. Time

| Hours | Voltage | Conductivity (µS/cm) |
|---|---|---|
| 0.0 | 0.0 | 8.3 |
| 1 | 37 | 1.2 |
| 2 | 33 | 0.91 |
| 10 | 40 | 0.10 |
| 24 | 32 | 0.088 |
| 48 | 26 | 0.065 |
| 72 | 24 | 0.061 |
| 96 | 25 | 0.059 |
| 120 | 25 | 0.058 |
| 144 | 27 | 0.057 |
| 168 | 29 | 0.060 |

Another method (not shown) for performing electrodeionization utilizing the apparatus as illustrated in FIG. 1 comprises first causing the liquid to be deionized to flow through the ADC 103. The ADC 103 may be capable of effectively removing contaminant anions from the liquid stream. The anions are attracted to the anode under the influence of the applied electric field and may be allowed to pass through a first AM 102 and into the anode chamber 101. The contaminant anions may be removed from the system in the anode chamber 101. The anions cannot travel toward the cathode because of the influence of the applied electric field. Therefore, the anions are effectively contained in the anode chamber 101 until they are flushed from the system by the waste liquid stream that removes ions from the anode chamber 101. Any cations are largely unaffected while passing through the ADC 103. The liquid exiting the ADC 103 may be largely free of anionic contamination.

Following passage through 103, the liquid is then flowed through the CDC 107. The CDC 107 may be capable of removing cations. The CDC 107 typically includes therein cation exchange materials and may be effective at removing the contaminant cations. The cations may be allowed to pass through a second CM 108 and into the cathode chamber 109. The contaminant cations may be removed from the system in the cathode chamber 109. The cations cannot travel toward the anode because of the influence of the applied electric field. Therefore, the cations may be effectively contained in the cathode chamber 109 until they are flushed from the system by the waste liquid stream that removes ions from the cathode chamber 109. The anions are attracted toward the anode under the influence of the applied electric field but will not be allowed to pass through a first CM 106 into the adjacent CBDC 105. Therefore, the anions will be retained in the liquid. The liquid exiting the CDC 107 has a reduced level of cations relative to the in-coming liquid stream.

Following passage through 107, the liquid is then flowed through the CBDC 105. The CBDC 105 may be capable of effectively removing any remaining cations or anions from the liquid stream. The anions are attracted to the anode under the influence of the applied electric field and may be allowed to pass through a second AM 104 and into the ADC 103. The contaminant anions may be removed from the system in the anode chamber 101. The anions cannot travel toward the cathode because of the influence of the applied electric field. Therefore, the anions may be effectively removed in the ADC 103 or contained in the anode chamber 101 until they are flushed from the system by the waste liquid stream that removes ions from the anode chamber 101. The cations are attracted to the cathode under the influence of the applied electric field and may be allowed to pass through a first CM 106 and into the CDC 107. The contaminant cations may be removed from the system in the cathode chamber 109. One benefit of this configuration is that this prevents fouling and scaling of the cathode chamber 109 since the cations cannot react with anions to form insoluble scaling materials (i.e., $CaCO_3$, $Mg(OH)_2$, etc.). The cations cannot travel toward the anode because of the influence of the applied electric field. Therefore, the cations may be effectively removed in the CDC 107 or contained in the cathode chamber 109 until they are flushed from the system by the waste liquid stream that removes ions from the cathode chamber 109.

Water splitting occurs in the CBDC 105 since it may include therein a composite of anion and cation exchange materials. The water splitting in the CBDC 105 serves to regenerate the second AM 104 that separates the CBDC 105 from the ADC 103 as well as the first CM 106 that separates the CBDC 105 from the adjacent CDC 107. Additionally, hydronium ions generated by the water splitting are attracted to the cathode and enter the adjacent CDC 107 where they may be effective in regenerating the cation exchange material contained therein. Additionally, hydroxide ions generated by the water splitting are attracted to the anode and enter the adjacent ADC 103 where they may be effective in regenerating the anion exchange material contained therein.

FIG. 2 illustrates one configuration of some embodiments of the present invention that may be used to produce liquid with very low anion contamination and reduced cation contamination. In the apparatus illustrated in FIG. 2, a single ion depletion chamber may be layered with an anion exchange material layer 203 and a composite anion-cation exchange material layer 204. In contrast to the structure of FIG. 1, in a layered structure such as that of FIGS. 2-16, no membranes or other structures are used to separate ion exchange material layers that fill some of the chambers lying between the anode chamber and the cathode chamber. The layers may be in contiguous contact without an ion exchange membrane separating them. This is an example of a layered depletion chamber (LDC). Since there are two depletion layers 203, 204 between the AM 202 and the CM 205 in FIG. 2 without a membrane or other structure between them, this is an example of an EDI apparatus having dual ion depletion layers or, in other words, having a dual-layer depletion chamber. The interface between the anion exchange material layer 203 and the composite anion-cation exchange material layer 204 may be transverse to the applied electric field. The anion exchange material layer 203 may be positioned on the anode-side of the chamber and may be separated from the anode chamber 201 by an AM 202. The anion exchange material layer 203 typically includes therein a homogeneous volume of anion exchange material. The composite anion-cation exchange material layer 204 may be positioned on the cathode-side of the chamber and may be separated from the cathode chamber 206 by a CM 205. The composite anion-cation exchange material layer 204 may include therein a mixed ion exchange material, or a doped anion exchange material, or a doped cation exchange material. The anion exchange material layer 203 may serve to remove the anionic contaminates and the composite anion-cation exchange material layer 204 may serve to remove cationic contaminants as well as anionic contaminants from the liquid. The apparatus as illustrated in FIG. 2 may be operated in continuous mode or in intermittent mode.

A method for performing electrodeionization utilizing the apparatus as illustrated in FIG. 2 comprises first causing the liquid to be deionized to flow through the anion exchange material layer 203. The liquid to be deionized is caused to flow through the anion exchange material layer 203 first by the placement of the input port on the apparatus. The anion exchange material layer 203 may be effective at removing anions from the liquid. The anions are attracted toward the anode by the applied electric field. The anions may be allowed to pass through the AM 202 and into the anode chamber 201 where they may be removed by the waste stream used to flush the anode chamber. Cations are prevented from flowing into the anode chamber 201 by both the AM 202 and the applied electric field. The cations are attracted toward the cathode and may enter the composite anion-cation exchange material layer 204 directly. The cations may be allowed to pass through the CM 205 and into the cathode chamber 206 where they may be removed by the waste stream used to flush the cathode chamber. Anions are prevented from flowing into the cathode chamber 206 by both the CM 205 and the applied electric field.

Following the passage through 203, the liquid is then flowed through the composite anion-cation exchange material layer 204 where most of the cations may be removed and any remaining anions may be removed. The liquid is caused to flow through the composite anion-cation exchange material layer 204 by the placement of the output port on the apparatus. The liquid exits the apparatus as product liquid having a reduced level of anions and cations. Since this apparatus may be particularly configured for anion removal, the volume of the anion exchange material will typically be in the range from about 50% to about 90% of the total ion exchange material volume within the chamber. The apparatus and method as illustrated in FIG. 2 may result in an apparatus that may provide a product liquid stream with reduced levels of anionic contamination.

The apparatus as illustrated in FIG. 2 may be suitable for deionization, especially anion removal, for low ionic strength liquids. Examples of low ionic strength liquids include water that has received reverse osmosis, distillation, or prior deionization treatment among others. The apparatus as illustrated in FIG. 2 may produce a liquid with very low concentrations of anions and may be used for purifying liquids for use in analytical techniques such as ion chromatography, inductively coupled plasma mass spectrometry, and atomic absorption spectroscopy, among others.

FIG. 3 illustrates one configuration of the present invention that may be used to produce liquid with very low cation contamination and reduced anion contamination. In the apparatus illustrated in FIG. 3, a single ion depletion chamber is layered with a cation exchange material layer 304 and a composite anion-cation exchange material layer 303. This is an example of a layered depletion chamber (LDC), in this example, a dual layer LDC. The layers may be in contiguous contact without an ion exchange membrane separating them. The interface between the composite anion-cation exchange material layer 303 and the cation exchange material layer 304 may be transverse to the applied electric field. The composite anion-cation exchange material layer 303 may be positioned on the anode-side of the chamber and may be separated from the anode chamber 301 by an AM 302. The composite anion-cation exchange material layer 303 may include therein a mixed ion exchange material, or a doped anion exchange material, or a doped cation exchange material. The cation exchange material layer 304 may be positioned on the cathode-side of the chamber and may be separated from the cathode chamber 306 by a CM 305. The cation exchange material layer 304 typically includes therein a homogeneous volume of cation exchange material. The cation exchange material layer 304 may serve to remove the cationic contaminates and the composite anion-cation exchange material layer 303 may serve to remove anionic contaminants as well as cationic contaminants from the liquid. The apparatus as illustrated in 3 may be operated in continuous mode or in intermittent mode.

A method for performing electrodeionization utilizing the apparatus as illustrated in FIG. 3 comprises first causing the liquid to be deionized to flow through the cation exchange material layer 304. The liquid is caused to flow through the cation exchange material layer 304 first by the placement of the input port on the apparatus. The cation exchange material layer 304 may be effective at removing cations from the liquid. The cations are attracted toward the cathode by the applied electric field. The cations may be allowed to pass through the CM 305 and into the cathode chamber 306 where they may be removed by the waste stream used to flush the cathode chamber 306. Anions are prevented from flowing into the cathode chamber 306 by both the CM 305 and the applied electric field. The anions are attracted toward the anode and may enter the anion-cation exchange material layer 303 directly. The anions may be allowed to pass through the AM 302 and into the anode chamber 301 where they may be removed by the waste stream used to flush the anode chamber 301. Cations are prevented from flowing into the anode chamber 301 by both the AM 302 and the applied electric field.

Following the passage through 304, the liquid is then caused to flow through the composite anion-cation exchange material layer 303 where most of the anions may be removed and any remaining cations may be removed. The liquid is next caused to flow through the composite anion-cation exchange material layer 303 by the placement of the output port on the apparatus. The liquid exits the apparatus as product liquid having a reduced level of anions and cations. Since this apparatus may be particularly configured for cation removal, the volume of the cation exchange material will typically be in the range from about 50% to about 90% of the total ion exchange material volume within the chamber. The apparatus and method as illustrated in FIG. 3 result in an apparatus that may provide a product liquid stream with much reduced levels of cationic contamination.

The apparatus as illustrated in FIG. 3 may be suitable for deionization, especially cation removal, for low ionic strength liquids. Examples of low ionic strength liquids may comprise water that has received reverse osmosis, distillation, or prior deionization treatment. The apparatus as illustrated in FIG. 3 may produce a liquid with very low concentrations of cations and may be used for purifying liquids for use in analytical techniques such as ion chromatography, inductively coupled plasma mass spectrometry, and atomic absorption spectroscopy, among others.

Example 2

The device of FIG. 3 was constructed using machined high density polyethylene hardware to retain the electrodes, membranes and resin. The LDC was 1.27 cm in diameter and 3.81 cm in length. The liquid flow inlet was directed to the top of the cation resin layer 304 close to the interface between the cation resin 304 and the CM 305. The cation resin layer 304 was approximately 3 cm in length. The liquid flow exited at the composite or doped anion-cation resin layer 303 at the interface of the anion-cation resin layer 303 and the AM 302. The composite or doped anion-cation resin layer 303 was approximately 0.8 cm in length.

The anode chamber 301, for this example, contained platinum gauze electrodes (Unique Wire Weaving Inc, Hillside, N.J.). In contact with the anode and separating the anode chamber 301 from the LDC was an AM 302 (AMI-7001, a product of Membranes International, Glen Rock, N.J.). The LDC in this example consisted of two layers 303 and 304 in FIG. 3. One layer is a composite resin layer 303 (the composite layer was doped, 2:1 cation to anion capacity) comprising a composite of an anion exchange resin 303 (Dowex 1x4 (200 mesh), a product of The Dow Chemical Company, Midland, Mich.) and a cation exchange resin (DOWEX™ 50Wx4 (200 mesh), a product of The Dow Chemical Company, Midland, Mich.). The second layer is a cation exchange resin layer 304 (DOWEX™ 50Wx4 (200 mesh), a product of The Dow Chemical Company, Midland, Mich.). The cation and anion exchange resins were in the hydronium and hydroxide forms, respectively. A cation exchange membrane 305 (CMI-7000, a product of Membranes International, Glen Rock, N.J.) separated the LDC from the cathode chamber 306. The cathode chamber 306 contained platinum gauze electrodes (Unique Wire Weaving Inc, Hillside, N.J.). The cathode was in direct contact with the CM 305 separating the LDC and cathode chamber 306. A pump (GP40, a product of Dionex, Sunnyvale, Calif.) was used to deliver reverse osmosis (RO) quality water (specific conductance 11.2 $\mu$S/cm) at a flow rate of 2.0 mL/min to the EDI device shown in FIG. 3. A conductivity detector (CD20, a product of Dionex, Sunnyvale, Calif.) with a flow cell was used for the conductivity measurements. From the pump, the RO water flow was directed to the cation resin layer 304 of the LDC and exited at the anion-cation resin layer 303 to the conductivity cell. From the conductivity cell, the flow was directed to the anode chamber 301 and then the cathode chamber 306 and finally to waste.

Initially, the conductance of the water exiting the EDI device was 2.6 $\mu$S/cm. Using a laboratory power supply, (E3612A, a product of Agilent, Santa Clara, Calif.) a constant current of 40 mA was applied and the initial voltage was 23V. Gas evolution was observed immediately from the anode and cathode chambers. The initial background conductivity of the product water increased to 53 $\mu$S/cm and over a 1 hour period the conductivity decreased to 1.1 $\mu$S/cm. The EDI device was allowed to operate continuously for 6 days. The data in Table 2 shows results for the device of FIG. 3.

TABLE 2

Conductance Measurements vs. Time

| Hours | Voltage | Conductivity ($\mu$S/cm) |
|---|---|---|
| 0.0 | 0.0 | 2.6 |
| 1 | 20 | 1.1 |
| 2 | 33 | 0.87 |
| 10 | 40 | 0.36 |
| 24 | 32 | 0.11 |
| 48 | 26 | 0.078 |
| 72 | 24 | 0.064 |
| 96 | 25 | 0.060 |
| 120 | 25 | 0.058 |
| 144 | 27 | 0.061 |

Another embodiment of the present invention is illustrated in FIG. 4A and FIG. 4B. This embodiment illustrates an apparatus which comprises a composite anion-cation material layer 404 that may be disposed between an anion exchange material layer 403 and a cation exchange material layer 405. This is another example of an LDC, in this example, a triple layer LDC. The anion exchange material layer 403 includes therein anion exchange material. The cation exchange material layer 405 includes therein cation exchange material. The composite anion-cation material layer 404 includes therein a mixed ion exchange material, or a doped anion exchange material, or a doped cation exchange material. In this apparatus, the liquid to be deionized may be caused to flow in either direction depending upon the liquid quality required. The anion exchange material layer 403 may be separated from the anode chamber 401 by an AM 402. The cation exchange material layer 405 may be separated from the cathode chamber 407 by a CM 406. The anion exchange material layer 403, composite anion-cation material layer 404, and cation exchange material layer 405 may be contiguous with one another without separation by ion exchange membranes. The interface between the composite anion-cation exchange material layer 404 and the cation exchange material layer 405 may be transverse to the applied electric field. The interface between the composite anion-cation exchange material layer 404 and the anion exchange material layer 403 may be transverse to the applied electric field. The apparatus as illustrated in FIG. 4A and FIG. 4B may be operated in continuous mode or in intermittent mode.

A method for performing electrodeionization utilizing the apparatus is illustrated in FIG. 4A. If the requirement is for a product liquid low in anionic contamination, the liquid may be initially directed through the cation exchange material layer 405. The cation exchange material layer 405 may remove most of the cations from the liquid. The cations will be attracted toward the cathode by the applied electric field. The cations may be allowed to pass through the CM 406 and into the cathode chamber 407 where they may be removed by the waste stream used to flush the cathode chamber 407. Anions will be attracted toward the anode by the applied electric field. The anions may continue to pass through the composite anion-cation exchange material layer 404, through the anion exchange layer 403, through the AM 402 and into the anode chamber 401 where they may be removed from the system.

Following its passage through layer 405, the liquid may then pass through the composite anion-cation exchange material layer 404 where both anions and cations may be removed from the liquid. The cations will be attracted toward the cathode by the applied electric field. The cations may pass through the cation exchange material layer 405, through the CM 406 and into the cathode chamber 407 where they may be removed from the system. The anions will be attracted toward the anode by the applied electric field. The anions may pass through the anion exchange material layer 403, through the AM 402 and into the anode chamber 401 where they may be removed from the system.

Following its passage through layer 404, the liquid may then pass through the anion exchange material layer 403. The anion exchange material layer 403 may remove most of the remaining anions from the liquid. The anions will be attracted toward the anode by the applied electric field. The anions may be allowed to pass through the AM 402 and into the anode chamber 401 where they may be removed by the waste stream used to flush the anode chamber 401. Remaining cations will be attracted toward the cathode by the applied electric field. Some of the remaining cations may continue to pass through the composite anion-cation exchange material layer 404, through the cation exchange layer 405, through the CM 406 and into the cathode chamber 407 where they may be removed from the system. The apparatus illustrated in FIG. 4A may produce liquid with a reduced concentration of anions, but may contain trace amines or ammonium from degradation of the anion exchange material.

The homogeneous anion exchange material layer 403 and homogeneous cation exchange material layer 405 illustrated in FIG. 4A may be regenerated by water splitting that occurs within the composite anion-cation exchange material layer 404. Hydronium ions will be attracted toward the cathode by the applied electric field and may regenerate the homogeneous cation exchange material layer 405 as they travel toward the cathode. Hydroxide ions will be attracted toward the anode by the applied electric field and may regenerate the homogeneous anion exchange material layer 403 as they travel toward the anode.

The apparatus as illustrated in FIG. 4A may be suitable for deionization, especially anion removal, for low ionic strength liquids. Examples of low ionic strength liquids include water that has received reverse osmosis, distillation, or prior deionization treatment, among others. The apparatus as illustrated in FIG. 4A may produce a liquid with very low concentrations of anions and may be used for purifying liquids for use in analytical techniques such as ion chromatography, inductively coupled plasma mass spectrometry, and atomic absorption spectroscopy, among others.

Another method for performing electrodeionization utilizing this apparatus is illustrated in FIG. 4B. If the requirement is for a product liquid low in cationic contamination, the liquid may be initially directed through the anion exchange material layer 403. The anion exchange material layer 403 may remove most of the anions from the liquid. The anions will be attracted toward the anode by the applied electric field. The anions may be allowed to pass through the AM 402 and into the anode chamber 401 where they may be removed by the waste stream used to flush the anode chamber 401. Cations will be attracted toward the cathode by the applied electric field. The cations may continue to pass through the composite anion-cation exchange material layer 404, through the cation exchange layer 405, through the CM 406 and into the cathode chamber 407 where they may be removed from the system.

Following passage through 403, the liquid may then pass through the composite anion-cation exchange material layer 404 where both anions and cations may be removed from the liquid. The cations will be attracted toward the cathode by the applied electric field. The cations may pass through the cation exchange material layer 405, through the CM 406 and into the cathode chamber 407 where they may be removed from the system. The anions will be attracted toward the anode by the applied electric field. The anions may pass through the anion exchange material layer 403, through the AM 402 and into the anode chamber 401 where they may be removed from the system.

Following passage through 404, the liquid may then pass through the cation exchange material layer 405. The cation exchange material layer 405 may remove most of the remaining cations from the liquid. The cations will be attracted toward the cathode by the applied electric field. The cations may be allowed to pass through the CM 406 and into the cathode chamber 407 where they may be removed by the waste stream used to flush the cathode chamber 407. Remaining anions will be attracted toward the anode by the applied electric field. Some of the remaining anions may continue to pass through the composite anion-cation exchange material layer 404, through the anion exchange layer 403, through the AM 402 and into the anode chamber 401 where they may be removed from the system. The apparatus illustrated in FIG. 4B may produce liquid with a reduced concentration of contaminant cations, but may contain trace amounts of sulfate from degradation of the cation resin bed.

The homogeneous anion exchange material layer 403 and homogeneous cation exchange material layer 405 illustrated in FIG. 4B may be regenerated by water splitting that occurs within the composite anion-cation exchange material layer 404. Hydronium ions will be attracted toward the cathode by the applied electric field and may regenerate the homogeneous cation exchange material layer 405 as they travel toward the cathode. Hydroxide ions will be attracted toward the anode by the applied electric field and may regenerate the homogeneous anion exchange material layer 403 as they travel toward the anode.

The apparatus as illustrated in FIG. 4B may be suitable for deionization, especially cation removal, for low ionic strength liquids. Examples of low ionic strength liquids include water that has received reverse osmosis, distillation, or prior deionization treatment, among others. The apparatus as illustrated in FIG. 4B may produce a liquid with very low concentrations of cations and may be used for purifying liquids for use in analytical techniques such as ion chromatography, inductively coupled plasma mass spectrometry, and atomic absorption spectroscopy, among others.

Another embodiment of the present invention is illustrated in FIG. 5A. Similar to the apparatus illustrated in FIG. 4A, this embodiment illustrates an apparatus which contains a first composite anion-cation material layer 504 that may be disposed between an anion exchange material layer 503 and a cation exchange material layer 505. The anion exchange material layer 503 typically includes therein a homogeneous volume of anion exchange material. The cation exchange material layer 505 typically includes therein a homogeneous volume of cation exchange material. The first composite anion-cation exchange material layer 504 may include therein a mixed ion exchange material, or a doped anion exchange material, or a doped cation exchange material. However, this embodiment comprises an additional, second, composite anion-cation material layer 506 between the cation exchange material layer 505 and the cathode chamber 508. This is another example of a LDC, in the example, a quad layer LDC. The second composite anion-cation exchange material layer 506 may include therein a mixed ion exchange material, or a doped anion exchange material, or a doped cation exchange material. The second composite anion-cation exchange material layer 506 may be separated from the cathode chamber 508 by a CM 507. The anion exchange material layer 503 may be separated from the anode chamber 501 by an AM 502. The anion exchange material layer 503, first composite anion-cation exchange material layer 504, cation exchange material layer 505, and second composite anion-cation material layer 506, are contiguous with one another without separation by ion exchange membranes. The interface between the anion exchange material layer 503 and the first composite anion-cation exchange material layer 504 may be transverse to the applied electric field. The interface between the first composite anion-cation exchange material layer 504 and the cation exchange material layer 505 may be transverse to the applied electric field. The interface between the cation exchange material layer 505 and the second composite anion-cation exchange material layer 506 may be transverse to the applied electric field. The apparatus as illustrated in FIG. 5A may be operated in continuous mode or in intermittent mode.

A method for performing electrodeionization utilizing the apparatus is illustrated by the dashed flow path in FIG. 5A. The liquid may be initially directed through the anion exchange material layer 503. The anion exchange material layer may remove most of the anions from the liquid. The anions will be attracted toward the anode by the applied electric field. The anions may be allowed to pass through the AM 502 and into the anode chamber 501 where they may be removed by the waste stream used to flush the anode chamber 501. Cations will be attracted toward the cathode by the applied electric field. The cations may continue to pass through the first composite anion-cation exchange material layer 504, through the cation exchange layer 505, through the second composite anion-cation exchange material layer 506, through the CM 507 and into the cathode chamber 508 where they may be removed from the system.

Following passage through 503, the liquid may then pass through the first composite anion-cation exchange material layer 504 where both anions and cations may be removed from the liquid. The cations will be attracted toward the cathode by the applied electric field. The cations may pass through the cation exchange material layer 505, through the second composite anion-cation exchange material layer 506, through the CM 507 and into the cathode chamber 508 where they may be removed from the system. The anions will be attracted toward the anode by the applied electric field. The anions may pass through the anion exchange material layer 503, through the AM 502 and into the anode chamber 501 where they may be removed from the system.

Following passage through 504, the liquid may then pass through the cation exchange material layer 505. The cation exchange material layer 505 may remove most of the remaining cations from the liquid. The cations will be attracted toward the cathode by the applied electric field. The cations may be allowed to pass through the second composite anion-cation exchange material layer 506, through the CM 507 and into the cathode chamber 508 where they may be removed by the waste stream used to flush the anode chamber. Anions will be attracted toward the anode by the applied electric field. The anions may continue to pass through the first composite anion-cation exchange material layer 504, through the anion exchange layer 503, through the AM 502 and into the anode chamber 501 where they may be removed from the system.

Following passage through 505, the liquid may then pass through the second composite anion-cation exchange material layer 506. The second composite anion-cation exchange material layer 506 may remove most of the remaining cations from the liquid. The cations will be attracted toward the cathode by the applied electric field. The cations may be allowed to pass through the CM 507 and into the cathode chamber 508 where they may be removed by the waste stream used to flush the cathode chamber 508. Any remaining anions may be retained in the product liquid.

Another method for performing electrodeionization utilizing the apparatus is illustrated by the solid flow path in FIG. 5A. In this case, the liquid may pass first through the second composite anion-cation exchange material layer 506. The second composite anion-cation exchange material layer 506 may remove anions and cations from the liquid. The cations will be attracted toward the cathode by the applied electric field. The cations may be allowed to pass through the CM 507 and into the cathode chamber 508 where they may be removed by the waste stream used to flush the cathode chamber 508. Anions may be attracted toward the anode by the applied electric field. The anions may continue to pass through the cation exchange material layer 505, through the first composite anion-cation exchange material layer 504, through the anion exchange layer 503, through the AM 502 and into the anode chamber 501 where they may be removed from the system.

Following passage through 506, the liquid may then pass through the cation exchange material layer 505. The cation exchange material layer 505 may remove most of the remaining cations from the liquid. The cations will be attracted toward the cathode by the applied electric field. The cations may be allowed to pass through the second composite anion-cation exchange material layer 506, through the CM 507 and into the cathode chamber 508 where they may be removed by the waste stream used to flush the cathode chamber 508. Anions will be attracted toward the anode by the applied electric field. The anions may continue to pass through the first composite anion-cation exchange material layer 504, through the anion exchange layer 503, through the AM 502 and into the anode chamber 501 where they may be removed from the system.

Following passage through 505, the liquid may then pass through the first composite anion-cation exchange material layer 504 where both anions and cations may be removed from the liquid. The anions will be attracted toward the anode by the applied electric field. The anions may pass through the anion exchange material layer 503, through the AM 502 and into the anode chamber 501 where they may be removed from the system. The cations will be attracted toward the cathode by the applied electric field. The cations may pass through the cation exchange material layer 505, through the second anion-cation exchange material layer 506, through the CM 507 and into the cathode chamber 508 where they may be removed from the system.

Following passage through 504, the liquid may be finally directed through the anion exchange material layer 503. The anion exchange material layer may remove most of the remaining anions from the liquid. The anions will be attracted toward the anode by the applied electric field. The anions may be allowed to pass through the AM 502 and into the anode chamber 501 where they may be removed by the waste stream used to flush the anode chamber 501. Any remaining cations may be retained in the product liquid.

The apparatus illustrated in FIG. 5A may produce liquid with a reduced concentration of all ions, but may contain trace sulfate ions from the degradation of the cation exchange material layer.

The anion exchange material layer 503, cation exchange material layer 505, AM 502, and CM 507 illustrated in FIG. 5A may be regenerated by water splitting that occurs within the first composite anion-cation exchange material layer 504 and second composite anion-cation exchange material layers 506. Hydronium ions will be attracted toward the cathode by the applied electric field and may regenerate the homogeneous cation exchange material layer 505 and CM 507 as they travel toward the cathode. Hydroxide ions will be attracted toward the anode by the applied electric field and may regenerate the homogeneous anion exchange material layer 503 and AM 502 as they travel toward the anode.

The apparatus as illustrated in FIG. 5A may be suitable for deionization, especially anion removal, for low ionic strength liquids. Examples of low ionic strength liquids include water that has received reverse osmosis, distillation, or prior deionization treatment, among others. The apparatus as illustrated in FIG. 5A may produce a liquid with very low concentrations of anions and may be used for purifying liquids for use in analytical techniques such as ion chromatography, inductively coupled plasma mass spectrometry, and atomic absorption spectroscopy, among others.

Another embodiment of the present invention is illustrated in FIG. 5B. Similar to the apparatus illustrated in FIG. 4B, this embodiment illustrates an apparatus which contains a second composite anion-cation material layer 515 that may be disposed between a cation exchange material layer 516 and an anion exchange material layer 514. However, this embodiment comprises an additional first composite anion-cation material layer 513 between the anion exchange material layer 514 and the anode chamber 511. This is another example of a LDC, in the example, a quad layer LDC. The anion exchange material layer 514 typically includes therein a homogeneous volume of anion exchange material. The cation exchange material layer 516 typically includes therein a homogeneous volume of cation exchange material. The first composite anion-cation exchange material layer 513 may include therein a mixed ion exchange material, or a doped anion exchange material, or a doped cation exchange material. The second composite anion-cation exchange material layer 515 may include therein a mixed ion exchange material, or a doped anion exchange material, or a doped cation exchange material. The first composite anion-cation exchange material layer 513 may be separated from the anode chamber 511 by an AM 512. The cation exchange material layer 516 may be separated from the cathode chamber 518 by a CM 517. The first composite anion-cation exchange material layer 513, anion exchange material layer 514, second composite anion-cation material layer 515, and cation exchange material layer 516, may be contiguous with one another without separation by ion exchange membranes. The interface between the first composite anion-cation exchange material layer 513 and the anion exchange material layer 514 may be transverse to the applied electric field. The interface between the anion exchange material layer 514 and the second composite anion-cation exchange material layer 515 may be transverse to the applied electric field. The interface between the second composite anion-cation exchange material layer 515 and the cation exchange material layer 516 may be transverse to the applied electric field. The apparatus as illustrated in FIG. 5B may be operated in continuous mode or in intermittent mode.

A method for performing electrodeionization utilizing the apparatus is illustrated by the dashed flow path in FIG. 5B. The liquid may be initially directed through the cation exchange material layer 516. The cation exchange material layer 516 may remove most of the cations from the liquid. The cations will be attracted toward the cathode by the applied electric field. The cations may be allowed to pass through the CM 517 and into the cathode chamber 518 where they may be removed by the waste stream used to flush the cathode chamber 518. Anions will be attracted toward the anode by the applied electric field. The anions may continue to pass through the second composite anion-cation exchange material layer 515, through the anion exchange layer 514, through the first composite anion-cation exchange material layer 513, through the AM 512 and into the anode chamber 511 where they may be removed from the system.

Following passage through 516, the liquid may then pass through the second composite anion-cation exchange material layer 515 where both anions and cations may be removed from the liquid. The anions will be attracted toward the anode by the applied electric field. The anions may pass through the anion exchange material layer 514, through the first composite anion-cation exchange material layer 513, through the AM 512 and into the anode chamber 511 where they may be removed from the system. The cations will be attracted toward the cathode by the applied electric field. The cations may pass through the cation exchange material layer 516, through the CM 517 and into the cathode chamber 518 where they may be removed from the system.

Following passage through 515, the liquid may then pass through the anion exchange material layer 514. The anion exchange material layer may remove most of the remaining anions from the liquid. The anions will be attracted toward the anode by the applied electric field. The anions may be allowed to pass through the first anion-cation exchange material layer 513, through the AM 512 and into the anode chamber 511 where they may be removed by the waste stream used to flush the anode chamber 511. Cations will be attracted toward the cathode by the applied electric field. The cations may continue to pass through the second composite anion-cation exchange material layer 515, through the cation exchange layer 516, through the CM 517 and into the cathode chamber 518 where they may be removed from the system.

Following passage through 514, the liquid may then pass through the first composite anion-cation exchange material layer 513 where both anions and cations may be removed from the liquid. The anions will be attracted toward the anode by the applied electric field. The anions may pass through the AM 512 and into the anode chamber 511 where they may be removed from the system. Any remaining cations may be retained in the product liquid.

Another method for performing electrodeionization utilizing the apparatus is illustrated by the solid flow path in FIG. 5B. In this case, the liquid may first pass through the first composite anion-cation exchange material layer 513 where both anions and cations may be removed from the liquid. The anions will be attracted toward the anode by the applied electric field. The anions may pass through the AM 512 and into the anode chamber 511 where they may be removed from the system. Cations will be attracted toward the cathode by the applied electric field. Cations may pass through the anion exchange material layer 514, through the second composite anion-cation exchange material layer 515, through the cation exchange material layer 516, through the CM 517 and into the cathode chamber 518 where they may be removed from the system.

Following passage through 513, the liquid may then pass through the anion exchange material layer 514. The anion exchange material layer 514 may remove most of the remaining anions from the liquid. The anions will be attracted toward the anode by the applied electric field. The anions may be allowed to pass through the first anion-cation exchange material layer 513, through the AM 512 and into the anode chamber 511 where they may be removed by the waste stream used to flush the anode chamber 511. Cations will be attracted toward the cathode by the applied electric field. The cations may continue to pass through the second composite anion-cation exchange material layer 515, through the cation exchange layer 516, through the CM 517 and into the cathode chamber 518 where they may be removed from the system.

Following passage through 514, the liquid may then pass through the second composite anion-cation exchange material layer 515 where both anions and cations may be removed from the liquid. The anions will be attracted toward the anode by the applied electric field. The anions may pass through the anion exchange material layer 514, through the first composite anion-cation exchange material layer 513, through the AM 512 and into the anode chamber 511 where they may be removed from the system. The cations will be attracted toward the cathode by the applied electric field. The cations may pass through the cation exchange material layer 516, through the CM 517 and into the cathode chamber 518 where they may be removed from the system.

Following passage through 515, the liquid may be finally directed through the cation exchange material layer 516. The cation exchange material layer 516 may remove most of the remaining cations from the liquid. The cations will be attracted toward the cathode by the applied electric field. The cations may be allowed to pass through the CM 517 and into the cathode chamber 518 where they may be removed by the waste stream used to flush the cathode chamber 518. Any remaining anions may be retained in the product liquid.

The apparatus illustrated in FIG. 5B may produce liquid with a reduced concentration of all ions, but may contain trace cations (in the flow direction 516 to 513 and trace anions in the flow direction 513 to 516).

The homogeneous anion exchange material layer 514, homogeneous cation exchange material layer 516, AM 512 and CM 517 illustrated in FIG. 5B may be regenerated by water splitting that occurs within the first composite anion-cation exchange material layer 513 and second composite anion-cation exchange material layer 515. Hydronium ions will be attracted toward the cathode by the applied electric field and may regenerate the homogeneous cation exchange material layer 516 and CM 517 as they travel toward the cathode. Hydroxide ions will be attracted toward the anode by the applied electric field and may regenerate the homogeneous anion exchange material layer 514 and AM 512 as they travel toward the anode.

The apparatus as illustrated in FIG. 5B is thus capable of being used in a manner that renders it suitable for deionization, especially cation removal, for low ionic strength liquids. Examples of low ionic strength liquids include water that has received reverse osmosis, distillation, or prior deionization treatment. The apparatus as illustrated in FIG. 5B is thus capable of producing a liquid with very low concentrations of cations and thus may be suitable for purifying liquids for use in analytical techniques such as ion chromatography, inductively coupled plasma mass spectrometry, and atomic absorption spectroscopy, among others.

Another embodiment of the present invention is illustrated in FIG. 6. The apparatus illustrated in FIG. 6 comprises an anode chamber 601 including an anode therein. A dual layer depletion chamber may be placed on the cathode side of the anode chamber. The layers 603, 604 may be in contiguous contact without an ion exchange membrane separating them. This is an example of a LDC, in this example, a dual layer LDC. The anode chamber 601 and the dual layer depletion chamber may be separated by an AM 602. The dual layer depletion chamber may be comprised of an anion exchange material layer 603 on the anode side of the chamber and a composite anion-cation exchange material layer 604 on the cathode side of the chamber. The anion exchange material layer 603 of the dual layer depletion chamber typically includes therein a homogeneous volume of anion exchange material. The anion exchange material layer 603 of the dual layer depletion chamber and the composite anion-cation exchange material layer 604 of the dual layer depletion chamber may be in contact. The interface between the composite anion-cation exchange material layer 604 of the dual layer depletion chamber and the anion exchange material layer 603 of the dual layer depletion chamber may be transverse to the applied electric field. The composite anion-cation exchange material layer 604 of the dual layer depletion chamber may include therein a mixed ion exchange material, or a doped anion exchange material, or a doped cation exchange material. A CDC 606 may be placed on the cathode-side of the dual-layer chamber. The CDC 606 and the dual-layer chamber may be separated by a first CM 605. The CDC 606 typically includes therein a homogeneous volume of cation exchange material. The CDC 606 may be separated from a cathode chamber 608 by a second CM 607. The cathode chamber 608 includes a cathode therein. The apparatus as illustrated in FIG. 6 may be operated in continuous mode or in intermittent mode.

A method for performing electrodeionization utilizing the apparatus is illustrated in FIG. 6. The liquid may be initially directed through the CDC 606. The CDC 606 may remove most of the cations from the liquid. The cations will be attracted toward the cathode by the applied electric field. The cations may be allowed to pass through the second CM 607 and into the cathode chamber 608 where they may be removed by the waste stream used to flush the cathode chamber 608. The anions will be attracted toward the anode by the applied electric field. The anions may be retained in the liquid since they will be prevented from passing through the first CM 605.

Following passage through 606, the liquid then flows through the dual layer depletion chamber. The liquid is caused to flow through the anion exchange material layer 603 first by the placement of the input port on the apparatus. The anion exchange material layer 603 may be effective at removing anions from the liquid. The anions are attracted toward the anode by the applied electric field. The anions may be allowed to pass through the AM 602 and into the anode chamber 601 where they may be removed by the waste stream used to flush the anode chamber 601. The cations are attracted toward the cathode and enter the composite anion-cation exchange material layer 604 directly. The cations may be allowed to pass through the composite anion-cation exchange material layer 604, through the first CM 605, through the CDC 606, through the second CM 607, and into the cathode chamber 608 where they may be removed by the waste stream used to flush the cathode chamber 608.

Following its passage through 603, the liquid is then flowed through the composite anion-cation exchange material layer 604 where any remaining cations may be removed and any remaining anions may be removed. Any remaining anions will be attracted toward the anode. The anions may pass through the anion exchange material layer 603, through the AM 602, and into the anode chamber 601 where they may be removed by the waste stream used to flush the anode chamber 601. Any remaining cations may be allowed to pass through the first CM 605, through the CDC 606, through the second CM 607, and into the cathode chamber 608 where they may be removed by the waste stream used to flush the cathode chamber 608. The liquid is caused to flow through the composite anion-cation exchange material layer 604 last by the placement of the output port on the apparatus. The liquid exits the apparatus as product liquid having a reduced level of anions and cations.

The apparatus as illustrated in FIG. 6 is thus capable of being used in a manner that renders it suitable for deionization, especially anion removal, for low ionic strength liquids. Examples of low ionic strength liquids include water that has received reverse osmosis, distillation, or prior deionization treatment. The apparatus as illustrated in FIG. 6 is thus capable of producing a liquid with very low concentrations of anions and thus may be suitable for purifying liquids for use in analytical techniques such as ion chromatography, inductively coupled plasma mass spectrometry, and atomic absorption spectroscopy, among others.

Example 3

An EDI device as shown in FIG. 6 was constructed using machined high density polyethylene hardware to retain the electrodes, membranes and resin. The internal flow dimensions of the CDC 606 were 1.27 cm in diameter and 1.27 cm in length. The internal flow dimensions of the LDC were 1.27 cm in diameter and 3.81 cm in length.

The anode chamber 601 contained platinum gauze electrodes (Unique Wire Weaving Inc, Hillside, N.J.). In contact with the anode and separating the anode chamber 601 from the LDC was an anion exchange membrane 602 (AMI-7001, a product of Membranes International, Glen Rock, N.J.). The LDC contained a 3 cm layer of an anion exchange resin 603 (DOWEX™ 1x4 (200 mesh), a product of The Dow Chemical Company, Midland, Mich.) in the hydroxide forms and a 0.8 cm layer of a doped cation exchange resin 604 comprising cation resin (DOWEX™ 50Wx4 (200 mesh), a product of The Dow Chemical Company, Midland, Mich.) doped with an anion exchange resin (DOWEX™ 1x4 (200 mesh) a product of The Dow Chemical Company, Midland, Mich.). The doped cation resin layer 604 had an equivalence ratio of 3:1, cation to anion resin. Separating the LDC from the CDC 606 was a CM 605 (CMI-7000, a product of Membranes International, Glen Rock, N.J.). The CDC 606 was filled with a cation exchange resin (DOWEX™ 50Wx4 (200 mesh), a product of The Dow Chemical Company, Midland, Mich.) in the hydronium form. Separating the CDC 606 from the cathode chamber 608 was a cation exchange membrane 607 (CMI-7000, a product of Membranes International, Glen Rock, N.J.). A pump (GP40, a product of Dionex, Sunnyvale, Calif.) was used to deliver RO quality water (specific conductance 12.0 μS/cm) at a flow rate of 2.0 mL/min to the EDI device shown in FIG. 6. A conductivity detector (CD20, a product of Dionex, Sunnyvale, Calif.) with a flow cell was used for the conductivity measurements. From the pump, the RO water flow was directed to the CDC 606, then to the inlet of the LDC. The inlet of the LDC directed the water flow first through the anion exchange resin layer 603 and then into the doped cation exchange resin layer 604 and finally to the flow through conductivity cell. From the conductivity cell, the flow was directed to the anode chamber 601 and then the cathode chamber 608 and finally to waste.

Initially, the conductance of the water exiting the EDI device of FIG. 6 was 5.9 μS/cm. Using a laboratory power supply, (E3612A, a product of Agilent, Santa Clara, Calif.) a constant current of 40 mA was applied and the initial voltage was 31V. Gas evolution was observed immediately from the anode and cathode chambers. The initial background conductivity of the product water increased to 44 μS/cm and over a 1 hour period the conductivity decreased to 0.86 μS/cm. The EDI device was allowed to operate continuously for 5 days. The data in Table 5 shows results for the device of FIG. 6.

TABLE 3

Conductance Measurements vs. Time

| Hours | voltage | Conductivity (μS/cm) |
|---|---|---|
| 0.0 | 0.0 | 5.9 |
| 1 | 28 | 0.86 |
| 2 | 25 | 0.63 |
| 10 | 22 | 0.23 |
| 24 | 19 | 0.098 |
| 48 | 19 | 0.073 |
| 72 | 22 | 0.071 |
| 96 | 23 | 0.066 |
| 120 | 24 | 0.057 |

The product water from the device of FIG. 6 was analyzed by ion chromatography. The product water was directed to the sample valve of an ion chromatograph (ICS-2000, a product of Dionex, Sunnyvale, Calif.) that was configured for anion analysis. A peristaltic pump (MASTERFLEX LS, a product of the Cole-Parmer company, Vernon Hills, Ill.) was used to deliver deionized water at a flow rate of 2.0 mL/min to the anode chamber and then to the cathode chamber and then to waste. The volume of product water sampled for anion analysis was 10.0 mL. The data in Table 4 shows the EDI device removed all the anions to a level of 5 ng/L (parts-per-trillion) or less.

TABLE 4

Anion Concentrations of product water

| Ion | Ion Concentration Recovered (µg/L) |
|---|---|
| Fluoride | <0.005 |
| Chloride | <0.002 |
| Nitrite | <0.005 |
| Bromide | <0.005 |
| Nitrate | <0.005 |
| Sulfate | <0.002 |
| Phosphate | <0.002 |

Another embodiment of the present invention is illustrated in FIG. 7. The apparatus illustrated in FIG. 7 comprises an anode chamber 701 including an anode therein. An ADC 703 may be placed on the cathode-side of the anode chamber 701. The ADC 703 and the anode chamber 701 may be separated by a first AM 702. The ADC 703 typically includes therein a homogeneous volume of anion exchange material. A dual layer depletion chamber may be placed on the cathode side of the ADC 703. The ADC 703 and the dual layer depletion chamber may be separated by a second AM 704. The dual layer depletion chamber may be comprised of a composite anion-cation exchange material layer 705 on the anode side of the chamber and a cation exchange material layer 706 on the cathode side of the chamber. This is an example of an LDC. The cation exchange material layer 706 of the dual layer depletion chamber and the composite anion-cation exchange material layer 705 of the dual layer depletion chamber may be in contiguous contact. The interface between the composite anion-cation exchange material layer 705 of the dual layer depletion chamber and the cation exchange material layer 706 of the dual layer depletion chamber may be transverse to the applied electric field. The composite anion-cation exchange material layer 705 of the dual layer depletion chamber may include therein a mixed ion exchange material, or a doped anion exchange material, or a doped cation exchange material. The cation exchange material layer 706 of the dual layer depletion chamber typically includes therein a homogeneous volume of cation exchange material. The dual layer depletion chamber may be separated from a cathode chamber 708 by a CM 707. The cathode chamber 708 includes a cathode therein. The apparatus as illustrated in FIG. 7 may be operated in continuous mode or in intermittent mode.

A method for performing electrodeionization utilizing the apparatus is illustrated by the flow path in FIG. 7. The liquid to be deionized may be initially directed through the ADC 703. The ADC 703 may remove most of the anions from the liquid. The anions will be attracted toward the anode by the applied electric field. The anions may be allowed to pass through the first AM 702 and into the anode chamber 701 where they may be removed by the waste stream used to flush the anode chamber 701. The cations will be attracted toward the cathode by the applied electric field. The cations may be retained in the liquid since they will be prevented from passing through the second AM 704 that forms the cathode-side of the ADC 703 chamber.

Following passage through 703, the liquid then flows through the dual layer depletion chamber. The liquid is caused to flow through the cation exchange material layer 706 first by the placement of the input port on the apparatus. The cation exchange material layer 706 may be effective at removing cations from the liquid. The cations are attracted toward the cathode by the applied electric field. The cations may be allowed to pass through the CM 707 and into the cathode chamber 708 where they may be removed by the waste stream used to flush the cathode chamber 708. The anions are attracted toward the anode and enter the composite anion-cation exchange material layer 705 directly. The anions may be allowed to pass through the composite anion-cation exchange material layer 705, through the second AM 704, through the ADC 703, through the first AM 702, and into the anode chamber 701 where they may be removed by the waste stream used to flush the anode chamber 701.

Following passage through 706, the liquid is then flowed through the composite anion-cation exchange material layer 705 where any remaining cations may be removed and any remaining anions may be removed. Any remaining cations will be attracted toward the cathode. The cations may pass through the cation exchange material layer 706, through the CM 707, and into the cathode chamber 708 where they may be removed by the waste stream used to flush the cathode chamber 708. Any remaining anions may be allowed to pass through the second AM 704, through the ADC 703, through the first AM 702, and into the anode chamber 701 where they may be removed by the waste stream used to flush the anode chamber 701. The liquid is caused to flow through the composite anion-cation exchange material layer 705 last by the placement of the output port on the apparatus. The liquid exits the apparatus as product liquid having a reduced level of anions and cations.

The apparatus as illustrated in FIG. 7 is thus capable of being used in a manner that renders it suitable for deionization, especially cation removal, for low ionic strength liquids. Examples of low ionic strength liquids include water that has received reverse osmosis, distillation, or prior deionization treatment. The apparatus as illustrated in FIG. 7 is thus capable of producing a liquid with very low concentrations of cations and thus may be suitable for purifying liquids for use in analytical techniques such as ion chromatography, inductively coupled plasma mass spectrometry, and atomic absorption spectroscopy, among others.

In the apparatuses described in connection with FIGS. 2-7, the contaminant ions may be drawn into the electrode chambers and then removed by the waste stream used to flush the electrode chambers. Two configurations in which the contaminant ions are drawn into a CBCC instead of the electrode chambers are illustrated in FIG. 8 and FIG. 9.

FIG. 8 illustrates an EDI apparatus comprising two ion depletion chambers, a CBCC 805, an anode chamber 801, and a cathode chamber 810. The two electrode chambers, 801, 810, and the CBCC 805, have flows of waste stream liquid passing through them (not depicted in FIG. 8) and used to flush the contaminant ions from the chambers. The apparatus illustrated in FIG. 8 comprises an anode chamber 801 including an anode therein. A CDC 803 may be placed on the cathode-side of the anode chamber 801. The CDC 803 and the anode chamber 801 may be separated by a first CM 802. The CDC 803 typically includes therein a homogeneous volume of cation exchange material. A CBCC 805 may be placed on the cathode side of the CDC 803. The CDC 803 and the CBCC 805 may be separated by a second CM 804. The CBCC 805 may include therein a mixed ion exchange material, or a doped anion exchange material, or a doped cation exchange material. A dual layer depletion chamber may be placed on the cathode side of the CBCC 805. The layers 807, 808, may be in contiguous contact without an ion exchange membrane separating them. This is an example of an LDC. The CBCC 805 and the dual layer depletion chamber may be separated by an AM 806. The dual layer depletion chamber may be comprised of an anion exchange material layer 807 on the anode side of the chamber and composite anion-cation exchange material layer 808 on the cathode side of the chamber. The anion exchange material layer 807 of the dual layer depletion chamber and the composite anion-cation exchange material layer 808 of the dual layer depletion chamber are in contiguous contact. The interface between the composite anion-cation exchange material layer 808 of the dual layer depletion chamber and the anion exchange material layer 807 of the dual layer depletion chamber may be transverse to the applied electric field. The anion exchange material layer 807 of the dual layer depletion chamber typically includes therein a homogeneous volume of anion exchange material. The composite anion-cation exchange material layer 808 of the dual layer depletion chamber may include therein a mixed ion exchange material, or a doped anion exchange material, or a doped cation exchange material. The dual layer depletion chamber may be separated from a cathode chamber 810 by a third CM 809. The cathode chamber 810 includes a cathode therein. The apparatus as illustrated in FIG. 8 may be operated in continuous mode or in intermittent mode.

A method for performing electrodeionization utilizing the apparatus is illustrated in FIG. 8. The liquid may be initially directed through the CDC 803. The CDC 803 may remove most of the cations from the liquid. The liquid may be caused to enter the CDC 803 close to the second CM 804 due to the placement of the input to the CDC 803. The cations will be attracted toward the cathode by the applied electric field. The cations may be allowed to pass through the second CM 804 and into the CBCC 805 where they may be removed by the waste stream used to flush the CBCC 805 chamber. Since the liquid stream enters the chamber close to the second CM 804, the removal efficiency of the cations may be enhanced. Additionally, the outlet of the CDC 803 may be configured to be close to the first CM 802. This configuration may serve to maximize the interaction length and interaction time of the liquid with the cation exchange material in the CDC 803. This may further increase the removal efficiency of the cations. The anions will be attracted toward the anode by the applied electric field. The anions may be retained in the liquid since they will be prevented from passing through the first CM 802 that forms the anode-side of the CDC 803 chamber.

Following passage through 803, the liquid then flows through the dual layer depletion chamber. The liquid is caused to flow through the anion exchange material layer 807 first by the placement of the input port on the apparatus to be close to the AM 806. The anion exchange material layer 807 may be effective at removing anions from the liquid. The anions are attracted toward the anode by the applied electric field. The anions may be allowed to pass through the AM 806 and into the CBCC 805 where they may be removed by the waste stream used to flush the CBCC 805. Remaining cations are attracted toward the cathode and enter the composite anion-cation exchange material layer 808 directly. The cations may be allowed to pass through the composite anion-cation exchange material layer 808, through the third CM 809, and into the cathode chamber 810 where they may be removed by the waste stream used to flush the cathode chamber 810.

Following passage through 807, the liquid is then flowed through the composite anion-cation exchange material layer 808 where any remaining cations may be removed and any remaining anions may be removed. Any remaining anions will be attracted toward the anode. The anions may pass through the anion exchange material layer 807, through the AM 806, and into the CBCC 805 where they may be removed by the waste stream used to flush the CBCC 805. Any remaining cations may be allowed to pass through the third CM 809 and into the cathode chamber 810 where they may be removed by the waste stream used to flush the cathode chamber 810. The liquid is caused to flow through the composite anion-cation exchange material layer 808 by the placement of the output port on the apparatus. The liquid exits the apparatus as product liquid having a reduced level of anions and cations.

The apparatus as illustrated in FIG. 8 is thus capable of being used in a manner that renders it suitable for deionization, especially anion removal, for low ionic strength liquids. Examples of low ionic strength liquids include water that has received reverse osmosis, distillation, or prior deionization treatment. The apparatus as illustrated in FIG. 8 is thus capable of producing a liquid with very low concentrations of anions and thus may be suitable for purifying liquids for use in analytical techniques such as, ion chromatography, inductively coupled plasma mass spectrometry, and atomic absorption spectroscopy, among others. The apparatus as illustrated in FIG. 8 has the added advantage in that the majority of the ions may be removed in a CBCC and therefore exhibits reduced electrode fouling as discussed previously.

Example 4

An EDI device as shown in FIG. 8 was constructed using machined high density polyethylene hardware to retain the electrodes, membranes and resin. The internal flow dimensions of the CDC 803 were 1.27 cm in diameter and 3.81 cm in length. The internal flow dimensions of the LDC were 1.27 cm in diameter and 3.81 cm in length. The internal flow dimensions of the CBCC were 1.27 cm in diameter and 1.27 cm in length.

The anode chamber 801 contained platinum gauze electrodes (Unique Wire Weaving Inc, Hillside, N.J.). In contact with the anode and separating the CDC 803 from the anode chamber 801 was a CM 802 (CMI-7000, a product of Membranes International, Glen Rock, N.J.). The CDC 803 contained a cation exchange resin (DOWEX™ 50Wx4 (200 mesh), a product of The Dow Chemical Company, Midland, Mich.) in the hydronium form. Separating the CDC 803 from the CBDC 805 was a CM 804 (CMI-7000, a product of Membranes International, Glen Rock, N.J.). Separating the CBCC 805 from the LDC was an AM 806 (AMI-7001, a product of Membranes International, Glen Rock, N.J.). The LDC contained a 3 cm layer 807 of an anion exchange resin (DOWEX™ 1x4 (200 mesh), a product of The Dow Chemical Company, Midland, Mich.) in the hydroxide form and a 0.8 cm doped cation layer 808 comprised of a cation exchange resin (DOWEX™ 50Wx4 (200 mesh), a product of The Dow Chemical Company, Midland, Mich.) doped with an anion exchange resin (DOWEX™ 1x4 (200 mesh), a product of The Dow Chemical Company, Midland, Mich.). The doped cation resin layer had an equivalence ratio of 3:1 cation to anion. A CM 809 (CMI-7000, a product of Membranes International, Glen Rock, N.J.), separated the LDC from the cathode chamber 810. The cathode chamber 810 contained platinum gauze electrodes (Unique Wire Weaving Inc, Hillside, N.J.). The cathode is in direct contact with the CM 809 separating the LDC from the cathode chamber 810. A pump (GP40, a product of Dionex, Sunnyvale, Calif.) was used to deliver RO quality water (specific conductance 14.7 µS/cm) at a flow rate of 2.0 mL/min to the EDI device shown in FIG. 8. A conductivity detector (CD20, a product of Dionex, Sunnyvale, Calif.) with a flow cell was used for the conductivity measurements. From the pump, the RO water flow was directed to the CDC 803, then to the LDC with the inlet at the anion ion exchange layer 807 and the outlet at the doped cation ion exchange layer 808 and then to the flow through conductivity cell. A peristaltic pump (MASTERFLEX LS, a product of the Cole-Parmer company, Vernon Hills, Ill.) was used to deliver deionized water at a flow rate of 2.0 mL/min to the anode chamber 801 and then to the cathode chamber 810 and then to waste.

Initially, the conductance of the water exiting the EDI device was 5.1 µS/cm. Using a laboratory power supply, (E3612A, a product of Agilent, Santa Clara, Calif.) a constant current of 30 mA was applied and the initial voltage was 35V. Gas evolution was observed immediately from the anode and cathode chambers. The initial background conductivity of the product water increased to 41 µS/cm and over a 1 hour period the conductivity decreased to 0.95 µS/cm. The EDI device was allowed to operate continuously for 5 days. The data in Table 5 shows results for the device of FIG. 8.

TABLE 5

Conductance Measurements vs. Time

| Hours | Voltage | Conductivity (µS/cm) |
|---|---|---|
| 0.0 | 0.0 | 5.1 |
| 1 | 31 | 0.95 |
| 2 | 29 | 0.32 |
| 10 | 26 | 0.093 |
| 24 | 22 | 0.072 |
| 48 | 20 | 0.057 |
| 72 | 21 | 0.058 |
| 96 | 22 | 0.056 |
| 120 | 25 | 0.055 |

The product water from the device of FIG. 8 was analyzed by ion chromatography. The product water was directed to the sample valve of an ion chromatograph (ICS-2000, a product of Dionex, Sunnyvale, Calif.) that was configured for anion analysis. A peristaltic pump (MASTERFLEX LS, a product of the Cole-Parmer company, Vernon Hills, Ill.) was used to deliver deionized water at a flow rate of 2.0 mL/min to the anode chamber and then to the cathode chamber and then to waste. The volume of product water sampled for anion analysis was 10.0 mL. The data in Table 6 shows the EDI device removed all the anions to a level of 5 ng/L (parts-per-trillion) or less.

TABLE 6

Anion Concentrations of product Water

| Ion | Ion Concentration Recovered (µg/L) |
|---|---|
| Fluoride | <0.004 |
| Chloride | <0.002 |
| Nitrite | <0.005 |
| Bromide | <0.005 |
| Nitrate | <0.005 |
| Sulfate | <0.002 |
| Phosphate | <0.002 |

FIG. 9 illustrates an EDI apparatus comprising two ion depletion chambers, a CBCC, an anode chamber, and a cathode chamber. The two electrode chambers and the CBCC have a flow of waste stream liquid (not depicted in FIG. 9) in order to flush the contaminant ions from these chambers. The apparatus illustrated in FIG. 9 comprises an anode chamber 901 including an anode therein. A dual layer depletion chamber may be placed on the cathode side of the anode chamber 901. The layers 903, 904 may be in contiguous contact without an ion exchange membrane separating them. This is an example of a LDC. The dual layer depletion chamber and the anode chamber may be separated by a first AM 902. The dual layer depletion chamber may be comprised of a composite anion-cation exchange material layer 903 on the anode side of the chamber and a cation exchange material layer 904 on the cathode side of the chamber. The cation exchange material layer 904 of the dual layer depletion chamber and the composite anion-cation exchange material layer 903 of the dual layer depletion chamber may be in contiguous contact. The interface between the composite anion-cation exchange material layer 903 of the dual layer depletion chamber and the cation exchange material layer 904 of the dual layer depletion chamber may be transverse to the applied electric field. The composite anion-cation exchange material layer 903 of the dual layer depletion chamber may include therein a mixed ion exchange material, or a doped anion exchange material, or a doped cation exchange material. The cation exchange material layer 904 of the dual layer depletion chamber typically includes therein a homogeneous volume of cation exchange material. A CBCC 906 may be placed on the cathode side of the dual layer depletion chamber. The dual layer depletion chamber and the CBCC 906 may be separated by a CM 905. The CBCC 906 may include therein a mixed ion exchange material, or a doped anion exchange material, or a doped cation exchange material. An ADC 908 may be placed on the cathode-side of the CBCC 906. The CBCC 906 and the ADC 908 may be separated by a second AM 907. The ADC 908 typically includes therein a homogeneous volume of anion exchange material. The ADC 908 may be separated from a cathode chamber 910 by a third AM 909. The cathode chamber 910 includes a cathode therein. The apparatus as illustrated in FIG. 9 may be operated in continuous mode or in intermittent mode.

A method for performing electrodeionization utilizing the apparatus is illustrated by the solid flow path in FIG. 9. The liquid may be initially directed through the ADC 908. The ADC 908 may remove most of the anions from the liquid. The liquid may be caused to enter the ADC 908 close to the second AM 907 due to the placement of the input to the ADC 908. The anions will be attracted toward the anode by the applied electric field. The anions may be allowed to pass through the second AM 907 and into the CBCC 906 where they may be removed by the waste stream used to flush the CBCC 906 chamber. Since the liquid stream enters the chamber close to the second AM 907, the removal efficiency of the anions may be enhanced. Additionally, the outlet of the ADC 907 may be configured to be close to the third AM 909. This configuration may serve to increase or maximize the interaction length and interaction time of the liquid with the anion exchange material in the ADC 908. This may further increase the removal efficiency of the anions. The cations will be attracted toward the cathode by the applied electric field. The cations may be retained in the liquid since they will be prevented from passing through the third AM 909 that forms the cathode-side of the ADC 908 chamber.

Following passage through 908, the liquid then flows through the dual layer depletion chamber. The liquid is caused to flow through the cation exchange material layer 904 first by the placement of the input port on the apparatus to be close to the CM 905. The cation exchange material layer 904 may be effective at removing cations from the liquid. The cations are attracted toward the cathode by the applied electric field. The cations may be allowed to pass through the CM 905 and into the CBCC 906 where they may be removed by the waste stream used to flush the CBCC 906. The anions are attracted toward the anode and may enter the composite anion-cation exchange material layer 903 directly. The anions may be allowed to pass through the composite anion-cation exchange material layer 903, through the first AM 902, and into the anode chamber 901 where they may be removed by the waste stream used to flush the anode chamber 901.

Following passage through 904, the liquid then flows through the composite anion-cation exchange material layer 903 where any remaining cations may be removed and any remaining anions may be removed. Any remaining cations will be attracted toward the cathode. The cations may pass through the cation exchange material layer 904, through the CM 905, and into the CBCC 906 where they may be removed by the waste stream used to flush the CBCC 906. Any remaining anions may be allowed to pass through the first AM 902 and into the anode chamber 901 where they may be removed by the waste stream used to flush the anode chamber 901. The liquid is finally caused to flow through the composite anion-cation exchange material layer 903 last by the placement of the output port on the apparatus. The liquid exits the apparatus as product liquid having a reduced level of anions and cations.

The apparatus as illustrated in FIG. 9 may be suitable for deionization, especially cation removal, for low ionic strength liquids. Examples of low ionic strength liquids include water that has received reverse osmosis, distillation, or prior deionization treatment, among others. The apparatus as illustrated in FIG. 9 may produce a liquid with very low concentrations of cations and may be used for purifying liquids for use in analytical techniques such as ion chromatography, inductively coupled plasma mass spectrometry, and atomic absorption spectroscopy, among others. The apparatus as illustrated in FIG. 9 has the added advantage in that the majority of the ions may be removed in a CBCC and therefore exhibits reduced electrode fouling as discussed previously.

Example 5

An EDI device as shown in FIG. 9 was constructed using machined high density polyethylene hardware to retain the electrodes, membranes and resin. The internal flow dimensions of the ADC 908 were 1.27 cm in diameter and 3.81 cm in length. The internal flow dimensions of the LDC were 1.27 cm in diameter and 3.81 cm in length. The internal flow dimensions of the CBCC were 1.27 cm in diameter and 1.27 cm in length.

The anode chamber 901 contained platinum gauze electrodes (Unique Wire Weaving Inc, Hillside, N.J.). In contact with the anode and separating the LDC from the anode chamber 901 was an AM 902 (AMI-7001, a product of Membranes International, Glen Rock, N.J.). The LDC contained a 0.8 cm doped anion exchange layer 903 comprising an anion exchange resin (DOWEX™ 1x4 (200 mesh) a product of The Dow Chemical Company, Midland, Mich.) doped with a cation exchange resin (DOWEX™ 50Wx4 (200 mesh), a product of The Dow Chemical Company, Midland, Mich.) and a 3 cm layer 904 of a cation exchange resin (DOWEX™ 50Wx4 (200 mesh), a product of The Dow Chemical Company, Midland, Mich.) in the hydronium form. The doped anion resin layer 903 had an equivalence ratio of 3:1 anion to cation capacity. Separating the LDC from the CBCC 906 was a CM 905 (CMI-7000, a product of Membranes International, Glen Rock, N.J.). Separating the CBCC 906 from the ADC 908 was an AM 907 (AMI-7001, a product of Membranes International, Glen Rock, N.J.). The ADC 907 contained an anion exchange resign (DOWEX™ 1x4 (200 mesh) a product of The Dow Chemical Company, Midland, Mich.) in the hydroxide form. An AM 909 (AMI-7001, a product of Membranes International, Glen Rock, N.J.) separated the ADC 908 from the cathode chamber 910. The cathode chamber 910 contained platinum gauze electrodes (Unique Wire Weaving Inc, Hillside, N.J.). The cathode is in direct contact with the AM 909 separating the ADC 908 from the cathode chamber 910. A pump (GP40, a product of Dionex, Sunnyvale, Calif.) was used to deliver RO quality water (specific conductance 12.7 µS/cm) at a flow rate of 2.0 mL/min to the EDI device shown in FIG. 9. A conductivity detector (CD20, a product of Dionex, Sunnyvale, Calif.) with a flow cell was used for the conductivity measurements. From the pump, the RO water flow was directed to the ADC 908, then to the LDC with the inlet at the cation layer 904 and the outlet at the doped anion layer 903 and then to the flow through conductivity cell. A peristaltic pump (MASTERFLEX LS, a product of the Cole-Parmer company, Vernon Hills, Ill.) was used to deliver deionized water at a flow rate of 2.0 mL/min to the anode chamber 901 and then to the cathode chamber 910 and then to waste.

Initially, the conductance of the water exiting the EDI device was 8.2 µS/cm. Using a laboratory power supply, (E3612A, a product of Agilent, Santa Clara, Calif.) a constant current of 30 mA was applied and the initial voltage was 38V. Gas evolution was observed immediately from the anode and cathode chambers. The initial background conductivity of the product water increased to 63 µS/cm and over a 1 hour period the conductivity decreased to 0.63 µS/cm. The EDI device was allowed to operate continuously for 5 days. The data in Table 7 shows results for the device of FIG. 9.

TABLE 7

Conductance Measurements vs. Time

| Hours | Voltage | Conductivity (µS/cm) |
|---|---|---|
| 0.0 | 0.0 | 8.2 |
| 1 | 32 | 0.63 |
| 2 | 28 | 0.10 |
| 10 | 26 | 0.081 |
| 24 | 23 | 0.074 |
| 48 | 19 | 0.055 |
| 72 | 20 | 0.056 |
| 96 | 20 | 0.055 |
| 120 | 22 | 0.056 |

The product water from the device of FIG. 9 was analyzed by ion chromatography. The product water was directed to the sample valve of an ion chromatograph (ICS-2000, a product of Dionex Sunnyvale, Calif.) that was configured for cation analysis. A peristaltic pump (MASTERFLEX LS, a product of the Cole-Parmer company, Vernon Hills, Ill.) was used to deliver deionized water at a flow rate of 2.0 mL/min to the anode chamber and then to the cathode chamber and then to waste. The volume of product water sampled for cation analysis was 10.0 mL. The data in Table 8 shows the EDI device removed cations to a level of 2 ng/L (parts-per-trillion) or less.

TABLE 8

| Cation Concentrations of product Water | |
|---|---|
| Ion | Ion Concentration Recovered (μg/L) |
| Lithium | <0.001 |
| Ammonium | <0.002 |
| Sodium | <0.001 |
| Potassium | <0.001 |
| Calcium | <0.002 |
| Magnesium | <0.002 |

The apparatuses in FIG. 8 and FIG. 9 may offer the advantages of homogenous ion exchange chambers or layers for enhanced ion removal, a composite ion exchange layer for final polishing, and reduced build up of contaminant ions in the electrode chambers which may cause blockages, reduced liquid flow through the electrode chambers, and high electrical resistance of the apparatus.

FIG. 10 illustrates an EDI apparatus comprising three ion depletion chambers, an anode chamber, and a cathode chamber. The two electrode chambers have a flow of waste stream liquid used to flush the contaminant ions from the chambers, not shown in FIG. 10. The apparatus illustrated in FIG. 10 comprises an anode chamber 1001 including an anode therein. An ADC 1003 may be placed on the cathode side of the anode chamber 1001. The ADC 1003 and the anode chamber 1001 may be separated by a first AM 1002. The ADC 1003 typically includes therein a homogeneous volume of anion exchange material. A dual layer depletion chamber may be placed on the cathode side of the ADC 1003. The dual layer depletion chamber and the ADC 1003 may be separated by a second AM 1004. The dual layer depletion chamber may be comprised of a cation exchange material layer 1005 on the inlet portion of the dual layer chamber and a composite anion-cation exchange material layer 1006 on the outlet portion of the dual layer chamber. This is an example of a LDC. The interface between the cation exchange material layer 1005 and the composite anion-cation exchange material layer 1006 may be parallel to the applied electric field. The cation exchange material layer 1005 typically includes therein a homogeneous volume of cation exchange material.

The composite anion-cation exchange material layer 1006 may include therein a mixed ion exchange material, or a doped anion exchange material, or a doped cation exchange material. A CDC 1008 may be placed on the cathode side of the dual layer depletion chamber. The dual layer depletion chamber and the CDC 1008 may be separated by a first CM 1007. The CDC 1008 typically includes therein a homogeneous volume of cation exchange material. The CDC 1008 may be separated from the cathode chamber 1010 by a second CM 1009. The cathode chamber 1010 includes a cathode therein. The apparatus as illustrated in FIG. 10 may be operated in continuous mode or in intermittent mode.

A method for performing electrodeionization utilizing the apparatus is illustrated in FIG. 10. The liquid may be initially directed through the CDC 1008. The CDC 1008 may remove most of the cations from the liquid. The cations are attracted to the cathode by the applied electric field. The cations may pass through the second CM 1009 and into the cathode chamber 1010 where they may be removed from the apparatus by the waste liquid stream that removes ions from the cathode chamber 1010. Anions will be attracted to the anode. The anions will be retained in the liquid because they will not pass through the first CM 1007 that forms the anode side of the CDC 1008.

Following passage through 1008, liquid may then flow through the ADC 1003. The ADC 1003 may remove most of the anions from the liquid. The anions are attracted to the anode by the applied electric field. The anions may pass through the first AM 1002 and into the anode chamber 1001 where they may be removed from the apparatus by the waste liquid stream that removes ions from the anode chamber 1001. Remaining cations will be attracted to the cathode. The cations will be retained in the liquid because they will not pass through the second AM 1004 that forms the cathode side of the ADC 1003.

Following passage through 1003, the liquid may then pass through the dual layer depletion chamber. The liquid is forced to pass through the cation exchange material layer 1005 of the dual layer depletion chamber by placing the inlet portion of the chamber above the cation exchange material layer 1005. The cation exchange material layer 1005 may remove remaining cations from the liquid. Cations are attracted to the cathode by the applied electric field. The cations may pass through the first CM 1007, through the CDC 1008, and through the second CM 1009 and into the cathode chamber 1010 where they may be removed from the apparatus by the waste liquid stream that removes ions from the cathode chamber 1010. The anions will be attracted to the anode by the applied electric field. Some of the anions may be allowed to pass through the second AM 1004, through the ADC 1003, through the first AM 1002 and into the anode chamber 1001 where they may be removed from the apparatus by the waste liquid stream that removes ions from the anode chamber 1001.

Following passage through 1005, the liquid is then passed through the composite anion-cation exchange material layer 1006 of the dual layer depletion chamber by placing the outlet portion of the chamber below the composite anion-cation exchange material layer 1006. The composite anion-cation exchange material layer 1006 may be effective at removing both remaining anions and cations. The remaining cations are attracted to the cathode by the applied electric field. The cations may pass through the first CM 1007, through the CDC 1008, and through the second CM 1009 and into the cathode chamber 1010 where they may be removed from the apparatus by the waste liquid stream that removes ions from the cathode chamber 1010. The remaining anions are attracted to the anode by the applied electric field. The anions may be allowed to pass through the second AM 1004, through the ADC 1003, through the first AM 1002 and into the anode chamber 1001 where they may be removed from the apparatus by the waste liquid stream that removes ions from the anode chamber 1001.

Another method for performing electrodeionization utilizing the apparatus of FIG. 10 uses a different path through the apparatus (and not depicted on FIG. 10). The liquid may be initially directed through the ADC 1003. The ADC 1003 may remove most of the anions from the liquid. The anions are attracted to the anode by the applied electric field. The anions may pass through the first AM 1002 and into the anode chamber 1001 where they may be removed from the apparatus by the waste liquid stream that removes ions from the anode chamber 1001. Remaining cations will be attracted to the cathode. The cations will be retained in the liquid because they will not pass through the second AM 1004 that forms the cathode side of the ADC 1003.

Following passage through 1003, liquid may then flow through the CDC 1008. The CDC 1008 may remove most of the cations from the liquid. The cations are attracted to the cathode by the applied electric field. The cations may pass through the second CM 1009 and into the cathode chamber 1010 where they may be removed from the apparatus by the waste liquid stream that removes ions from the cathode chamber 1010. Anions will be attracted to the anode. The anions will be retained in the liquid because they will not pass through the first CM 1007 that forms the anode side of the CDC 1008.

Following passage through 1008, liquid may then pass through the dual layer depletion chamber. The liquid is forced to pass through the cation exchange material layer 1005 of the dual layer depletion chamber by placing the inlet portion of the chamber above the cation exchange material layer 1005. The cation exchange material layer 1005 may remove remaining cations from the liquid. Cations are attracted to the cathode by the applied electric field. The cations may pass through the first CM 1006, through the CDC 1008, and through the second CM 1009 and into the cathode chamber 1010 where they may be removed from the apparatus by the waste liquid stream that removes ions from the cathode chamber 1010. The anions will be attracted to the anode by the applied electric field. Some of the anions may be allowed to pass through the second AM 1004, through the ADC 1003, through the first AM 1002 and into the anode chamber 1001 where they may be removed from the apparatus by the waste liquid stream that removes ions from the anode chamber 1001.

The liquid is then passed through the composite anion-cation exchange material layer 1006 of the dual layer depletion chamber by placing the outlet portion of the chamber below the composite anion-cation exchange material layer 1006. The composite anion-cation exchange material layer 1006 may be effective at removing both remaining anions and cations. The remaining cations are attracted to the cathode by the applied electric field. The cations may pass through the first CM 1007, through the CDC 1008, and through the second CM 1009 and into the cathode chamber 1010 where they may be removed from the apparatus by the waste liquid stream that removes ions from the cathode chamber 1010. The remaining anions are attracted to the anode by the applied electric field. The anions may be allowed to pass through the second AM 1004, through the ADC 1003, through the first AM 1002 and into the anode chamber 1001 where they may be removed from the apparatus by the waste liquid stream that removes ions from the anode chamber 1001.

Water splitting generates hydronium and hydroxide ions which may be used to regenerate ion exchange materials. Under the force of an applied electric field, water splitting can occur at the junction of anion and cation exchange materials. These junctions occur in the composite anion-cation exchange material layer 1006 of the dual layer depletion chamber, since this chamber contains both anion and cation exchange materials and AM and CM membranes, 1004, 1007. Hydronium from the composite anion-cation exchange material layer 1006 may travel through the first CM 1007 to the CDC 1008, thus regenerating the cation exchange materials found within. Likewise, hydroxide from the composite anion-cation exchange material layer 1006 may travel through the second AM 1004 to the ADC 1003, thus regenerating the anion exchange materials found within.

FIG. 11 illustrates an EDI apparatus comprising three ion depletion chambers, an anode chamber, and a cathode chamber. The two electrode chambers have a flow of waste stream liquid used to flush the contaminant ions from the chambers, not shown in FIG. 11. The apparatus illustrated in FIG. 11 comprises an anode chamber 1101 including an anode therein. An ADC 1103 may be placed on the cathode side of the anode chamber 1101. The ADC 1103 and the anode chamber 1101 may be separated by a first AM 1102. The ADC 1103 typically includes therein a homogeneous volume of anion exchange material. A dual layer depletion chamber may be placed on the cathode side of the ADC 1103. The layers may be in contiguous contact without an ion exchange membrane separating them. This is an example of a LDC. The dual layer depletion chamber and the ADC 1103 may be separated by a second AM 1104. The dual layer depletion chamber may contain an anion exchange material layer 1105 on the inlet portion of the dual layer chamber and a composite anion-cation exchange material layer 1106 on the outlet portion of the dual layer chamber. The interface between the anion exchange material layer 1105 and the composite anion-cation exchange material layer 1106 may be substantially parallel to the applied electric field. The anion exchange material layer 1105 typically includes therein a homogeneous volume of anion exchange material. The composite anion-cation exchange material layer 1106 may include therein a mixed ion exchange material, or a doped anion exchange material, or a doped cation exchange material. A CDC 1108 may be placed on the cathode side of the dual layer depletion chamber. The dual layer depletion chamber and the CDC 1108 may be separated by a first CM 1107. The CDC 1108 typically includes therein a homogeneous volume of cation exchange material. The CDC 1108 may be separated from the cathode chamber 1110 by a second CM 1109. The cathode chamber 1110 includes a cathode therein. The apparatus as illustrated in FIG. 11 may be operated in continuous mode or in intermittent mode.

A method for performing electrodeionization utilizing the apparatus is illustrated in FIG. 11. The liquid may be initially directed through the CDC 1108. The CDC 1108 may remove most of the cations from the liquid. The cations are attracted to the cathode by the applied electric field. The cations may pass through the second CM 1109 and into the cathode chamber 1110 where they may be removed from the apparatus by the waste liquid stream that removes ions from the cathode chamber 1110. Anions will be attracted to the anode. The anions will be retained in the liquid because they will not pass through the first CM 1107 that forms the anode side of the CDC 1108.

Following passage through 1108, the liquid may then flow through the ADC 1103. The ADC 1103 may remove most of the anions from the liquid. The anions are attracted to the anode by the applied electric field. The anions may pass through the first AM 1102 and into the anode chamber 1101 where they may be removed from the apparatus by the waste liquid stream that removes ions from the anode chamber 1101. Remaining cations will be attracted to the cathode. The cations will be retained in the liquid because they will not pass through the second AM 1104 that forms the cathode side of the ADC 1103.

Following passage through 1103, the liquid may then pass through the dual layer depletion chamber. The liquid is passed through the anion exchange material layer 1105 of the dual layer depletion chamber by placing the inlet portion of the chamber above the anion exchange material layer 1105. The anion exchange material layer 1105 may remove remaining anions from the liquid. Anions are attracted to the anode by the applied electric field. The anions may pass through the second AM 1104, through the ADC 1103, and through the first AM 1102 and into the anode chamber 1101 where they may be removed from the apparatus by the waste liquid stream that removes ions from the anode chamber 1101. The cations will be attracted to the cathode by the applied electric field. Some of the cations may be allowed to pass through the first CM 1107, through the CDC 1108, through the second CM 1109 and into the cathode chamber 1110 where they may be removed from the apparatus by the waste liquid stream that removes ions from the cathode chamber 1110.

Following passage through 1105, the liquid is then passed through the composite anion-cation exchange material layer 1106 of the dual layer depletion chamber by placing the outlet portion of the chamber below the composite anion-cation exchange material layer 1106. The composite anion-cation exchange material layer 1106 may be effective at removing both remaining anions and cations. The remaining cations are attracted to the cathode by the applied electric field. The cations may pass through the first CM 1107, through the CDC 1108, and through the second CM 1109 and into the cathode chamber 1110 where they may be removed from the apparatus by the waste liquid stream that removes ions from the cathode chamber 1110. The remaining anions are attracted to the anode by the applied electric field. The anions may be allowed to pass through the second AM 1104, through the ADC 1103, through the first AM 1102 and into the anode chamber 1101 where they may be removed from the apparatus by the waste liquid stream that removes ions from the anode chamber 1101.

Example 6

An EDI device as shown in FIG. 11 was constructed using machined high density polyethylene hardware to retain the electrodes, membranes and resin. The internal flow dimensions of the ADC 1103 were 1.27 cm in diameter and 3.81 cm in length. The internal flow dimensions of the LDC were 1.27 cm in diameter and 1.27 cm in length. The internal flow dimensions of the CDC 1108 were 1.27 cm in diameter and 3.81 cm in length.

The anode chamber 1101 contained platinum gauze electrodes (Unique Wire Weaving Inc, Hillside, N.J.). In contact with the anode and separating the anode chamber 1101 from the ADC 1103 was an AM 1102 (AMI-7001, a product of Membranes International, Glen Rock, N.J.). The ADC 1103 was filled with an anion exchange (DOWEX™ 1x4 (200 mesh), a product of The Dow Chemical Company, Midland, Mich.) in the hydroxide form. An AM 1104 (AMI-7001, a product of Membranes International, Glen Rock, N.J.) separated the ADC 1103 from the LDC. The LDC contained a 0.5 cm anion exchange resin layer 1105 (DOWEX™ 1x4 (200 mesh), a product of The Dow Chemical Company, Midland, Mich.) and a 0.8 cm composite bed layer 1106. The composite bed layer 1106 contained a composite of a cation exchange resin (DOWEX™ 50Wx4 (200 mesh), a product of The Dow Chemical Company, Midland, Mich.) and an anion exchange resin (DOWEX™ 1x4 (200 mesh), a product of The Dow Chemical Company, Midland, Mich.) with an equivalence ratio of 1:1 anion to cation resin. The cation and anion exchange resins were in the hydronium and hydroxide forms, respectively. Separating the CDC 1108 from the LDC was a CM 1107 (CMI-7000, a product of Membranes International, Glen Rock, N.J.). The CDC 1108 was filled with a cation exchange resin (DOWEX™ 50Wx4 (200 mesh), a product of The Dow Chemical Company, Midland, Mich.). The CDC 1108 was separated from the cathode chamber 1110 by a CM 1109 (CMI-7000, a product of Membranes International, Glen Rock, N.J.). The cathode chamber 1110 contained platinum gauze electrodes (Unique Wire Weaving Inc, Hillside, N.J.). The cathode was in direct contact with the CM 1109 separating the CDC 1108 and the cathode chamber 1110. A pump (GP40, a product of Dionex, Sunnyvale, Calif.) was used to deliver RO quality water (specific conductance 11.7 $\mu$S/cm) at a flow rate of 2.0 mL/min to the EDI device shown in FIG. 11. A conductivity detector (CD20, a product of Dionex, Sunnyvale, Calif.) with a flow cell was used for the conductivity measurements. From the pump, the RO water flow was directed to the CDC 1108, then the ADC 1103, to the anion layer 1105 inlet of the LDC through the composite bed layer 1106 outlet and then to the flow through conductivity cell. A peristaltic pump (MASTERFLEX LS, a product of the Cole-Parmer company, Vernon Hills, Ill.) was used to deliver deionized water at a flow rate of 2.0 mL/min to the anode chamber 1101 and then to the cathode chamber 1110 and then to waste.

Initially, the conductance of the water exiting the EDI device was 2.1 $\mu$S/cm. Using a laboratory power supply, (E3612A, a product of Agilent, Santa Clara, Calif.) a constant current of 40 mA was applied and the initial voltage was 56V. Gas evolution was observed immediately from the anode and cathode chambers. The initial background conductivity of the product water increased to 53 $\mu$S/cm and over a 1 hour period the conductivity decreased to 0.34 $\mu$S/cm. The EDI device was allowed to operate continuously for 7 days. The data in Table 9 shows results for the device of FIG. 11.

TABLE 9

Conductance Measurements vs. Time

| Hours | Voltage | Conductivity ($\mu$S/cm) |
| --- | --- | --- |
| 0.0 | 0.0 | 2.1 |
| 1 | 51 | 0.34 |
| 2 | 33 | 0.15 |
| 10 | 40 | 0.087 |
| 24 | 32 | 0.061 |
| 48 | 26 | 0.056 |
| 72 | 24 | 0.055 |
| 96 | 25 | 0.055 |
| 120 | 25 | 0.056 |
| 144 | 27 | 0.055 |
| 168 | 29 | 0.056 |

Another method (not shown in FIG. 11) for performing electrodeionization utilizing the apparatus as illustrated in FIG. 11 is essentially a mirror-image of the flow depicted by the solid flow path in FIG. 11. The liquid may be initially directed through the ADC 1103. The ADC 1103 may remove most of the anions from the liquid. The anions are attracted to the anode by the applied electric field. The anions may pass through the first AM 1102 and into the anode chamber 1101 where they may be removed from the apparatus by the waste liquid stream that removes ions from the anode chamber 1101. Remaining cations will be attracted to the cathode. The cations will be retained in the liquid because they will not pass through the second AM 1104 that forms the cathode side of the ADC 1103.

Following passage through 1103, the liquid may then flow through the CDC 1108. The CDC 1108 may remove most of the cations from the liquid. The cations are attracted to the cathode by the applied electric field. The cations may pass through the second CM 1109 and into the cathode chamber 1110 where they may be removed from the apparatus by the waste liquid stream that removes ions from the cathode chamber 1110. Anions will be attracted to the anode. The anions will be retained in the liquid because they will not pass through the first CM 1107 that forms the anode side of the CDC 1108.

Following passage through 1108, the liquid may then pass through the dual layer depletion chamber. The liquid is passed through the anion exchange material layer 1105 of the dual layer depletion chamber by placing the inlet portion of the chamber above the anion exchange material layer 1105. The anion exchange material layer 1105 may remove remaining anions from the liquid. Anions are attracted to the anode by the applied electric field. The anions may pass through the second AM 1104, through the ADC 1103, and through the first AM 1102 and into the anode chamber 1101 where they may be removed from the apparatus by the waste liquid stream that removes ions from the anode chamber 1101. The cations will be attracted to the cathode by the applied electric field. Some of the cations may be allowed to pass through the first CM 1107, through the CDC 1108, through the second CM 1109 and into the cathode chamber 1110 where they may be removed from the apparatus by the waste liquid stream that removes ions from the cathode chamber 1110.

Following passage through 1105, the liquid is then passed through the composite anion-cation exchange material layer 1106 of the dual layer depletion chamber by placing the outlet portion of the chamber below the composite anion-cation exchange material layer 1106. The composite anion-cation exchange material layer 1106 may be effective at removing both remaining anions and cations. The remaining cations are attracted to the cathode by the applied electric field. The cations may pass through the first CM 1107, through the CDC 1108, and through the second CM 1109 and into the cathode chamber 1110 where they may be removed from the apparatus by the waste liquid stream that removes ions from the cathode chamber 1110. The remaining anions are attracted to the anode by the applied electric field. The anions may be allowed to pass through the second AM 1104, through the ADC 1103, through the first AM 1102 and into the anode chamber 1101 where they may be removed from the apparatus by the waste liquid stream that removes ions from the anode chamber 1101.

FIG. 12 illustrates an EDI apparatus comprising three ion depletion chambers, an anode chamber, and a cathode chamber. The two electrode chambers have a flow of waste stream liquid used to flush the contaminant ions from the chambers, but not depicted in FIG. 12. The apparatus illustrated in FIG. 12 comprises an anode chamber 1201 including an anode therein. An ADC 1203 may be placed on the cathode side of the anode chamber 1201. The ADC 1203 and the anode chamber 1201 may be separated by a first AM 1202. The ADC 1203 typically includes therein a homogeneous volume of anion exchange material. A triple layer depletion chamber may be placed on the cathode side of the ADC 1203. The triple layer depletion chamber and the ADC 1203 may be separated by a second AM 1204. The triple layer depletion chamber may be comprised of a cation exchange material layer 1205 on the inlet portion of the triple layer chamber, an anion exchange material layer 1206 in the center portion, and a composite anion-cation exchange material layer 1207 on the outlet portion of the triple layer chamber. This is an example of a LDC. The interface between the cation exchange material layer 1205 and the anion exchange material layer 1206 may be parallel to the applied electric field. The interface between the anion exchange material layer 1206 and the composite anion-cation exchange material layer 1207 may be parallel to the applied electric field. The cation exchange material layer 1205 typically includes therein a homogeneous volume of cation exchange material. The anion exchange material layer 1206 typically includes therein a homogeneous volume of anion exchange material. The composite anion-cation exchange material layer 1207 may include therein a mixed ion exchange material, or a doped anion exchange material, or a doped cation exchange material. A CDC 1209 may be placed on the cathode side of the triple layer depletion chamber. The triple layer depletion chamber and the CDC 1209 may be separated by a first CM 1208. The CDC 1209 typically includes therein a homogeneous volume of cation exchange material. The CDC 1209 may be separated from the cathode chamber 1211 by a second CM 1210. The cathode chamber 1211 includes a cathode therein. The apparatus as illustrated in FIG. 12 may be operated in continuous mode or in intermittent mode.

A method for performing electrodeionization utilizing the apparatus is illustrated in FIG. 12. The liquid may be initially directed through the CDC 1209. The CDC 1209 may remove most of the cations from the liquid. The cations are attracted to the cathode by the applied electric field. The cations may pass through the second CM 1210 and into the cathode chamber 1211 where they may be removed from the apparatus by the waste liquid stream that removes ions from the cathode chamber 1211. Anions will be attracted to the anode. The anions will be retained in the liquid because they will not pass through the first CM 1208 that forms the anode side of the CDC 1209.

Following passage through 1209, the liquid may then flow through the ADC 1203. The ADC 1203 may remove most of the anions from the liquid. The anions are attracted to the anode by the applied electric field. The anions may pass through the first AM 1202 and into the anode chamber 1201 where they may be removed from the apparatus by the waste liquid stream that removes ions from the anode chamber 1201. Remaining cations will be attracted to the cathode. The cations will be retained in the liquid because they will not pass through the second AM 1204 that forms the cathode side of the ADC 1203.

Following passage through 1203, the liquid may then pass through the triple layer depletion chamber. The liquid is passed through the cation exchange material layer 1205 of the triple layer depletion chamber by placing the inlet portion of the chamber above the cation exchange material layer 1205. The cation exchange material layer 1205 may remove remaining cations from the liquid. Cations are attracted to the cathode by the applied electric field. The cations may pass through the first CM 1208, through the CDC 1209, and through the second CM 1210 and into the cathode chamber 1211 where they may be removed from the apparatus by the waste liquid stream that removes ions from the cathode chamber 1211. The anions will be attracted to the anode by the applied electric field. Some of the anions may be allowed to pass through the second AM 1204, through the ADC 1203, through the first AM 1202 and into the anode chamber 1201 where they may be removed from the apparatus by the waste liquid stream that removes ions from the anode chamber 1201.

Following passage through 1205, the liquid is then passed through the anion exchange material layer 1206 of the triple layer depletion chamber. The anion exchange material layer 1206 may remove remaining anions from the liquid. Anions are attracted to the anode by the applied electric field. The anions may pass through the second AM 1204, through the ADC 1203, and through the first AM 1202 and into the anode chamber 1201 where they may be removed from the apparatus by the waste liquid stream that removes ions from the anode chamber 1201. The cations will be attracted to the cathode by the applied electric field. Some of the cations may be allowed to pass through the first CM 1208, through the CDC 1209, through the second CM 1210 and into the cathode chamber 1211 where they may be removed from the apparatus by the waste liquid stream that removes ions from the cathode chamber 1211.

Following passage through 1206, the liquid is then passed through the composite anion-cation exchange material layer 1207 of the triple layer depletion chamber by placing the outlet portion of the chamber below the composite anion-cation exchange material layer 1207. The composite anion-cation exchange material layer 1207 may be effective at removing both remaining anions and cations. The remaining cations are attracted to the cathode by the applied electric field. The cations may pass through the first CM 1208, through the CDC 1209, and through the second CM 1210 and into the cathode chamber 1211 where they may be removed from the apparatus by the waste liquid stream that removes ions from the cathode chamber 1211. The remaining anions are attracted to the anode by the applied electric field. The anions may be allowed to pass through the second AM 1204, through the ADC 1203, through the first AM 1202 and into the anode chamber 1201 where they may be removed from the apparatus by the waste liquid stream that removes ions from the anode chamber 1201.

Another method (not shown in FIG. 12) for performing electrodeionization utilizing the apparatus as illustrated in FIG. 12 comprises using the apparatus with essentially a mirror-image flow pattern from that depicted in FIG. 12. The liquid may be initially directed through the ADC 1203. The ADC 1203 may remove most of the anions from the liquid. The anions are attracted to the anode by the applied electric field. The anions may pass through the first AM 1202 and into the anode chamber 1201 where they may be removed from the apparatus by the waste liquid stream that removes ions from the anode chamber 1201. Remaining cations will be attracted to the cathode. The cations will be retained in the liquid because they will not pass through the second AM 1204 that forms the cathode side of the ADC 1203.

Following passage through 1203, the liquid may then flow through the CDC 1209. The CDC 1209 may remove most of the cations from the liquid. The cations are attracted to the cathode by the applied electric field. The cations may pass through the second CM 1210 and into the cathode chamber 1211 where they may be removed from the apparatus by the waste liquid stream that removes ions from the cathode chamber 1211. Anions will be attracted to the anode. The anions will be retained in the liquid because they will not pass through the first CM 1208 that forms the anode side of the CDC 1209.

Following passage through 1209, the liquid may then pass through the triple layer depletion chamber. The liquid is passed through the cation exchange material layer 1205 of the triple layer depletion chamber by placing the inlet portion of the chamber above the cation exchange material layer 1205. The cation exchange material layer 1205 may remove remaining cations from the liquid. Cations are attracted to the cathode by the applied electric field. The cations may pass through the first CM 1208, through the CDC 1209, and through the second CM 1210 and into the cathode chamber 1211 where they may be removed from the apparatus by the waste liquid stream that removes ions from the cathode chamber. The anions will be attracted to the anode by the applied electric field. Some of the anions may be allowed to pass through the second AM 1204, through the ADC 1203, through the first AM 1202 and into the anode chamber 1201 where they may be removed from the apparatus by the waste liquid stream that removes ions from the anode chamber 1201.

Following passage through 1205, the liquid is then passed through the anion exchange material layer 1206 of the triple layer depletion chamber. The anion exchange material layer 1206 may remove remaining anions from the liquid. Anions are attracted to the anode by the applied electric field. The anions may pass through the second AM 1204, through the ADC 1203, and through the first AM 1202 and into the anode chamber 1201 where they may be removed from the apparatus by the waste liquid stream that removes ions from the anode chamber 1201. The cations will be attracted to the cathode by the applied electric field. Some of the cations may be allowed to pass through the first CM 1208, through the CDC 1209, through the second CM 1210 and into the cathode chamber 1211 where they may be removed from the apparatus by the waste liquid stream that removes ions from the cathode chamber 1211.

Following passage through 1206, the liquid is then passed through the composite anion-cation exchange material layer 1207 of the triple layer depletion chamber by placing the outlet portion of the chamber below the composite anion-cation exchange material layer 1207. The composite anion-cation exchange material layer 1207 may be effective at removing both remaining anions and cations. The remaining cations are attracted to the cathode by the applied electric field. The cations may pass through the first CM 1208, through the CDC 1209, and through the second CM 1210 and into the cathode chamber 1211 where they may be removed from the apparatus by the waste liquid stream that removes ions from the cathode chamber 1211. The remaining anions are attracted to the anode by the applied electric field. The anions may be allowed to pass through the second AM 1204, through the ADC 1203, through the first AM 1202 and into the anode chamber 1201 where they may be removed from the apparatus by the waste liquid stream that removes ions from the anode chamber 1201.

FIG. 13 illustrates an EDI apparatus comprising three ion depletion chambers, an anode chamber, and a cathode chamber. The two electrode chambers have a flow of waste stream liquid used to flush the contaminant ions from the chambers which is not depicted in FIG. 13. The apparatus illustrated in FIG. 13 comprises an anode chamber 1301 including an anode therein. An ADC 1303 may be placed on the cathode side of the anode chamber 1301. The ADC 1303 and the anode chamber 1301 may be separated by a first AM 1302. The ADC 1303 typically includes therein a homogeneous volume of anion exchange material. A dual layer depletion chamber may be placed on the cathode side of the ADC 1303. The dual layer depletion chamber and the ADC 1303 may be separated by a second AM 1304. The dual layer depletion chamber may be comprised of a doped anion exchange material layer 1305 on the inlet portion of the dual layer chamber and a doped cation exchange material layer 1306 on the outlet portion of the dual layer chamber. This is an example of a LDC. The interface between the doped anion exchange material layer 1305 and the doped cation exchange material layer 1306 may be parallel to the applied electric field. The doped anion exchange material layer 1305 may include therein a composite of anion and cation exchange materials wherein the anion exchange material is responsible for at least about 60% of the total ion exchange capacity and the remainder of the total ion exchange capacity is contributed by the cation exchange material. The doped cation exchange material layer 1306 may include therein a composite of anion and cation exchange materials wherein the cation exchange material is responsible for at least about 60% of the total ion exchange capacity and the remainder of the total ion exchange capacity is contributed by anion exchange material. A CDC 1308 may be placed on the cathode side of the dual layer depletion chamber. The dual layer depletion chamber and the CDC 1308 may be separated by a first CM 1307. The CDC 1308 typically includes therein a homogeneous volume of cation exchange material. The CDC 1308 may be separated from the cathode chamber 1310 by a second CM 1309. The cathode chamber 1310 includes a cathode therein. The apparatus as illustrated in FIG. 13 may be operated in continuous mode or in intermittent mode.

A method for performing electrodeionization utilizing the apparatus is illustrated in FIG. 13. The liquid may be initially directed through the CDC 1308. The CDC 1308 may remove most of the cations from the liquid. The cations are attracted to the cathode by the applied electric field. The cations may pass through the second CM 1309 and into the cathode chamber 1310 where they may be removed from the apparatus by the waste liquid stream that removes ions from the cathode chamber 1310. Anions will be attracted to the anode. The anions will be retained in the liquid because they will not pass through the first CM 1307 that forms the anode side of the CDC 1308.

Following passage through 1308, the liquid may then flow through the ADC 1303. The ADC 1303 may remove most of the anions from the liquid. The anions are attracted to the anode by the applied electric field. The anions may pass through the first AM 1302 and into the anode chamber 1301 where they may be removed from the apparatus by the waste liquid stream that removes ions from the anode chamber 1301. Remaining cations will be attracted to the cathode. The cations will be retained in the liquid because they will not pass through the second AM 1304 that forms the cathode side of the ADC 1303.

Following passage through 1303, the liquid may then pass through the dual layer depletion chamber. The liquid is passed through the doped anion exchange material layer 1305 of the dual layer depletion chamber by placing the inlet portion of the chamber above the doped anion exchange material layer 1305. The doped anion exchange material layer 1305 may remove remaining anions from the liquid. Anions are attracted to the anode by the applied electric field. The anions may pass through the second AM 1304, through the ADC 1303, and through the first AM 1302 and into the anode chamber 1301 where they may be removed from the apparatus by the waste liquid stream that removes ions from the anode chamber 1301. The cations will be attracted to the cathode by the applied electric field. Some of the cations may be retained by the cation ion exchange material used as a dopant and may be allowed to pass through the first CM 1307, through the CDC 1308, through the second CM 1309 and into the cathode chamber 1310 where they may be removed from the apparatus by the waste liquid stream that removes ions from the cathode chamber 1310.

Following passage through 1305, the liquid is then passed through the doped cation exchange material layer 1306 of the dual layer depletion chamber by placing the outlet portion of the chamber below the cation exchange material layer 1306. The doped cation exchange material layer 1306 may remove remaining cations from the liquid. Cations are attracted to the cathode by the applied electric field. The cations may pass through the first CM 1307, through the CDC 1308, and through the second CM 1309 and into the cathode chamber 1310 where they may be removed from the apparatus by the waste liquid stream that removes ions from the cathode chamber 1310. The anions will be attracted to the anode by the applied electric field. Some of the anions may be retained by the anion ion exchange material used as a dopant and may be allowed to pass through the second AM 1304, through the ADC 1303, through the first AM 1302 and into the anode chamber 1301 where they may be removed from the apparatus by the waste liquid stream that removes ions from the anode chamber 1301.

Another method (not shown) for performing electrodeionization utilizing the apparatus as illustrated in FIG. 13 makes use of an alternate flow pattern. The liquid may be initially directed through the ADC 1303. The ADC 1303 may remove most of the anions from the liquid. The anions are attracted to the anode by the applied electric field. The anions may pass through the first AM 1302 and into the anode chamber 1301 where they may be removed from the apparatus by the waste liquid stream that removes ions from the anode chamber 1301. Remaining cations will be attracted to the cathode. The cations will be retained in the liquid because they will not pass through the second AM 1304 that forms the cathode side of the ADC 1304.

Following passage through 1303, the liquid may then flow through the CDC 1308. The CDC 1308 may remove most of the cations from the liquid. The cations are attracted to the cathode by the applied electric field. The cations may pass through the second CM 1309 and into the cathode chamber 1310 where they may be removed from the apparatus by the waste liquid stream that removes ions from the cathode chamber 1310. Anions will be attracted to the anode. The anions will be retained in the liquid because they will not pass through the first CM 1307 that forms the anode side of the CDC 1308.

Following passage through 1308, the liquid may then pass through the dual layer depletion chamber. The liquid is passed through the doped anion exchange material layer 1305 of the dual layer depletion chamber by placing the inlet portion of the chamber above the doped anion exchange material layer 1305. The doped anion exchange material layer 1305 may remove remaining anions from the liquid. Anions are attracted to the anode by the applied electric field. The anions may pass through the second AM 1304, through the ADC 1303, and through the first AM 1302 and into the anode chamber 1301 where they may be removed from the apparatus by the waste liquid stream that removes ions from the anode chamber 1301. The cations will be attracted to the cathode by the applied electric field. Some of the cations may be retained by the cation ion exchange material used as a dopant and may be allowed to pass through the first CM 1307, through the CDC 1308, through the second CM 1309 and into the cathode chamber 1310 where they may be removed from the apparatus by the waste liquid stream that removes ions from the cathode chamber 1310.

Following passage through 1305, the liquid is then passed through the doped cation exchange material layer 1306 of the dual layer depletion chamber by placing the outlet portion of the chamber below the cation exchange material layer 1306. The doped cation exchange material layer 1306 may remove remaining cations from the liquid. Cations are attracted to the cathode by the applied electric field. The cations may pass through the first CM 1307, through the CDC 1308, and through the second CM 1309 and into the cathode chamber 1310 where they may be removed from the apparatus by the waste liquid stream that removes ions from the cathode chamber 1310. The anions will be attracted to the anode by the applied electric field. Some of the anions may be retained by the anion ion exchange material used as a dopant and may be allowed to pass through the second AM 1304, through the ADC 1303, through the first AM 1302 and into the anode chamber 1301 where they may be removed from the apparatus by the waste liquid stream that removes ions from the anode chamber 1301.

Two additional methods for performing electrodeionization (not shown) on the apparatus as illustrated in FIG. 13 may be realized by switching the inlet and outlet of the dual layer depletion chamber. In one additional method, the liquid may be initially directed through the CDC 1308. The CDC 1308 may remove most of the cations from the liquid. The cations are attracted to the cathode by the applied electric field. The cations may pass through the second CM 1309 and into the cathode chamber 1310 where they may be removed from the apparatus by the waste liquid stream that removes ions from the cathode chamber 1310. Anions will be attracted to the anode. The anions will be retained in the liquid because they will not pass through the first CM 1307 that forms the anode side of the CDC 1308.

Following passage through 1308, the liquid may then flow through the ADC 1303. The ADC 1303 may remove most of the anions from the liquid. The anions are attracted to the anode by the applied electric field. The anions may pass through the first AM 1302 and into the anode chamber 1301 where they may be removed from the apparatus by the waste liquid stream that removes ions from the anode chamber 1301. Remaining cations will be attracted to the cathode. The cations will be retained in the liquid because they will not pass through the second AM 1304 that forms the cathode side of the ADC 1303.

Following passage through 1303, the liquid may then pass through the dual layer depletion chamber. The liquid is then passed through the doped cation exchange material layer 1306 of the dual layer depletion. The doped cation exchange material layer 1306 may remove remaining cations from the liquid. Cations are attracted to the cathode by the applied electric field. The cations may pass through the first CM 1307, through the CDC 1308, and through the second CM 1309 and into the cathode chamber 1310 where they may be removed from the apparatus by the waste liquid stream that removes ions from the cathode chamber 1310. The anions will be attracted to the anode by the applied electric field. Some of the anions may be retained by the anion ion exchange material used as a dopant and may be allowed to pass through the second AM 1304, through the ADC 1303, through the first AM 1302 and into the anode chamber 1301 where they may be removed from the apparatus by the waste liquid stream that removes ions from the anode chamber 1301.

The liquid is passed through the doped anion exchange material layer 1305 of the dual layer depletion. The doped anion exchange material layer 1305 may remove remaining anions from the liquid. Anions are attracted to the anode by the applied electric field. The anions may pass through the second AM 1304, through the ADC 1303, and through the first AM 1302 and into the anode chamber 1301 where they may be removed from the apparatus by the waste liquid stream that removes ions from the anode chamber 1301. The cations will be attracted to the cathode by the applied electric field. Some of the cations may be retained by the cation ion exchange material used as a dopant and may be allowed to pass through the first CM 1307, through the CDC 1308, through the second CM 1309 and into the cathode chamber 1310 where they may be removed from the apparatus by the waste liquid stream that removes ions from the cathode chamber 1310.

Another additional method (not shown) for performing electrodeionization utilizing the apparatus as illustrated in FIG. 13 makes use of an alternate flow pattern. The liquid may be initially directed through the ADC 1303. The ADC 1303 may remove most of the anions from the liquid. The anions are attracted to the anode by the applied electric field. The anions may pass through the first AM 1302 and into the anode chamber 1301 where they may be removed from the apparatus by the waste liquid stream that removes ions from the anode chamber 1301. Remaining cations will be attracted to the cathode. The cations will be retained in the liquid because they will not pass through the second AM 1304 that forms the cathode side of the ADC 1304.

Following passage through 1303, the liquid may then flow through the CDC 1308. The CDC 1308 may remove most of the cations from the liquid. The cations are attracted to the cathode by the applied electric field. The cations may pass through the second CM 1309 and into the cathode chamber 1310 where they may be removed from the apparatus by the waste liquid stream that removes ions from the cathode chamber 1310. Anions will be attracted to the anode. The anions will be retained in the liquid because they will not pass through the first CM 1307 that forms the anode side of the CDC 1308.

Following passage through 1308, the liquid may then pass through the dual layer depletion chamber. The liquid is then passed through the doped cation exchange material layer 1306 of the dual layer depletion chamber. The doped cation exchange material layer 1306 may remove remaining cations from the liquid. Cations are attracted to the cathode by the applied electric field. The cations may pass through the first CM 1307, through the CDC 1308, and through the second CM 1309 and into the cathode chamber 1310 where they may be removed from the apparatus by the waste liquid stream that removes ions from the cathode chamber 1310. The anions will be attracted to the anode by the applied electric field. Some of the anions may be retained by the anion ion exchange material used as a dopant and may be allowed to pass through the second AM 1304, through the ADC 1303, through the first AM 1302 and into the anode chamber 1301 where they may be removed from the apparatus by the waste liquid stream that removes ions from the anode chamber 1301.

Following passage through 1306, the liquid is passed through the doped anion exchange material layer 1305 of the dual layer depletion chamber. The doped anion exchange material layer 1305 may remove remaining anions from the liquid. Anions are attracted to the anode by the applied electric field. The anions may pass through the second AM 1304, through the ADC 1303, and through the first AM 1302 and into the anode chamber 1301 where they may be removed from the apparatus by the waste liquid stream that removes ions from the anode chamber 1301. The cations will be attracted to the cathode by the applied electric field. Some of the cations may be retained by the cation ion exchange material used as a dopant and may be allowed to pass through the first CM 1307, through the CDC 1308, through the second CM 1309 and into the cathode chamber 1310 where they may be removed from the apparatus by the waste liquid stream that removes ions from the cathode chamber 1310.

FIG. 14 illustrates an EDI apparatus comprising three ion depletion chambers, an anode chamber, and a cathode chamber. The two electrode chambers have a flow of waste stream liquid used to flush the contaminant ions from the chambers and not depicted in FIG. 14. The apparatus illustrated in FIG. 14 comprises an anode chamber 1401 including an anode therein. An ADC 1403 may be placed on the cathode side of the anode chamber. The ADC 1403 and the anode chamber 1401 may be separated by a first AM 1402. The ADC 1403 typically includes therein a homogeneous volume of anion exchange material. A dual layer depletion chamber may be placed on the cathode side of the ADC 1403. The dual layer depletion chamber and the ADC 1403 may be separated by a second AM 1404. The dual layer depletion chamber may be comprised of a doped anion exchange material layer 1405 on the inlet portion of the dual layer chamber and a composite anion-cation exchange material layer 1406 on the outlet portion of the dual layer chamber. This is an example of a LDC. The interface between the doped anion exchange material layer 1405 and the composite anion-cation exchange material layer 1406 may be parallel to the applied electric field. The doped anion exchange material layer 1405 may include therein a composite of anion and cation exchange materials wherein the anion exchange material is responsible for at least about 60% of the total ion exchange capacity and the remainder of the total ion exchange capacity is contributed by the cation exchange material. The composite anion-cation exchange material layer 1406 may include therein a mixed ion exchange material, or a doped anion exchange material, or a doped cation exchange material. A CDC 1408 may be placed on the cathode side of the dual layer depletion chamber. The dual layer depletion chamber and the CDC 1408 may be separated by a first CM 1407. The CDC 1408 typically includes therein a homogeneous volume of cation exchange material. The CDC 1408 may be separated from the cathode chamber 1410 by a second CM 1409. The cathode chamber 1410 includes a cathode therein. The apparatus as illustrated in FIG. 14 may be operated in continuous mode or in intermittent mode.

A method for performing electrodeionization utilizing the apparatus is illustrated in FIG. 14. The liquid may be initially directed through the CDC 1408. The CDC 1408 may remove most of the cations from the liquid. The cations are attracted to the cathode by the applied electric field. The cations may pass through the second CM 1409 and into the cathode chamber 1410 where they may be removed from the apparatus by the waste liquid stream that removes ions from the cathode chamber 1410. Anions will be attracted to the anode. The anions will be retained in the liquid because they will not pass through the first CM 1407 that forms the anode side of the CDC 1408.

Following passage through 1408, the liquid may then flow through the ADC 1403. The ADC 1403 may remove most of the anions from the liquid. The anions are attracted to the anode by the applied electric field. The anions may pass through the first AM 1402 and into the anode chamber 1401 where they may be removed from the apparatus by the waste liquid stream that removes ions from the anode chamber 1401. Remaining cations will be attracted to the cathode. The cations will be retained in the liquid because they will not pass through the second AM 1404 that forms the cathode side of the ADC 1403.

Following passage through 1403, the liquid may then pass through the dual layer depletion chamber. The liquid is passed through the doped anion exchange material layer 1405 of the dual layer depletion chamber by placing the inlet portion of the chamber above the doped anion exchange material layer 1405. The doped anion exchange material layer 1405 may remove remaining anions from the liquid. Anions are attracted to the anode by the applied electric field. The anions may pass through the second AM 1404, through the ADC 1403, and through the first AM 1402 and into the anode chamber 1401 where they may be removed from the apparatus by the waste liquid stream that removes ions from the anode chamber 1401. The cations will be attracted to the cathode by the applied electric field. Some of the cations may be retained by the cation ion exchange material used as a dopant and may be allowed to pass through the first CM 1407, through the CDC 1408, through the second CM 1409 and into the cathode chamber 1410 where they may be removed from the apparatus by the waste liquid stream that removes ions from the cathode chamber 1410.

Following passage through 1405, the liquid is then passed through the composite anion-cation exchange material layer 1406 of the dual layer depletion chamber by placing the outlet portion of the chamber below the composite anion-cation exchange material layer 1406. The composite anion-cation exchange material layer 1406 may be effective at removing both remaining anions and cations. The remaining cations are attracted to the cathode by the applied electric field. The cations may pass through the first CM 1407, through the CDC 1408, and through the second CM 1409 and into the cathode chamber 1410 where they may be removed from the apparatus by the waste liquid stream that removes ions from the cathode chamber 1410. The remaining anions are attracted to the anode by the applied electric field. The anions may be allowed to pass through the second AM 1404, through the ADC 1403, through the first AM 1402 and into the anode chamber 1401 where they may be removed from the apparatus by the waste liquid stream that removes ions from the anode chamber 1401.

Another method (not shown) for performing electrodeionization utilizing the apparatus as illustrated in FIG. 14 comprises a mirror-image flow pattern. The liquid may be initially directed through the ADC 1403. The ADC 1403 may remove most of the anions from the liquid. The anions are attracted to the anode by the applied electric field. The anions may pass through the first AM 1402 and into the anode chamber 1401 where they may be removed from the apparatus by the waste liquid stream that removes ions from the anode chamber 1401. Remaining cations will be attracted to the cathode. The cations will be retained in the liquid because they will not pass through the second AM 1404 that forms the cathode side of the ADC 1403.

Following passage through 1403, the liquid may then flow through the CDC 1408. The CDC 1408 may remove most of the cations from the liquid. The cations are attracted to the cathode by the applied electric field. The cations may pass through the second CM 1409 and into the cathode chamber 1410 where they may be removed from the apparatus by the waste liquid stream that removes ions from the cathode chamber 1410. Anions will be attracted to the anode. The anions will be retained in the liquid because they will not pass through the first CM 1407 that forms the anode side of the CDC 1408.

Following passage through 1408, the liquid may then pass through the dual layer depletion chamber. The liquid is passed through the doped anion exchange material layer 1405 of the dual layer depletion chamber by placing the inlet portion of the chamber above the doped anion exchange material layer 1405. The doped anion exchange material layer 1405 may remove remaining anions from the liquid. Anions are attracted to the anode by the applied electric field. The anions may pass through the second AM 1404, through the ADC 1403, and through the first AM 1402 and into the anode chamber 1401 where they may be removed from the apparatus by the waste liquid stream that removes ions from the anode chamber 1401. The cations will be attracted to the cathode by the applied electric field. Some of the cations may be retained by the cation ion exchange material used as a dopant and may be allowed to pass through the first CM 1407, through the CDC 1408, through the second CM 1409 and into the cathode chamber 1410 where they may be removed from the apparatus by the waste liquid stream that removes ions from the cathode chamber 1410.

Following passage through 1405, the liquid is then passed through the composite anion-cation exchange material layer 1406 of the dual layer depletion chamber by placing the outlet portion of the chamber below the composite anion-cation exchange material layer 1406. The composite anion-cation exchange material layer 1406 may be effective at removing both remaining anions and cations. The remaining cations are attracted to the cathode by the applied electric field. The cations may pass through the first CM 1407, through the CDC 1408, and through the second CM 1409 and into the cathode chamber 1410 where they may be removed from the apparatus by the waste liquid stream that removes ions from the cathode chamber 1410. The remaining anions are attracted to the anode by the applied electric field. The anions may be allowed to pass through the second AM 1404, through the ADC 1403, through the first AM 1402 and into the anode chamber 1401 where they may be removed from the apparatus by the waste liquid stream that removes ions from the anode chamber 1401.

Two additional methods for performing electrodeionization (not shown) on the apparatus as illustrated in FIG. 14 may be realized by switching the inlet and outlet of the dual layer depletion chamber. In one additional method, the liquid may be initially directed through the CDC 1408. The CDC 1408 may remove most of the cations from the liquid. The cations are attracted to the cathode by the applied electric field. The cations may pass through the second CM 1409 and into the cathode chamber 1410 where they may be removed from the apparatus by the waste liquid stream that removes ions from the cathode chamber 1410. Anions will be attracted to the anode. The anions will be retained in the liquid because they will not pass through the first CM 1407 that forms the anode side of the CDC 1408.

Following passage through 1408, the liquid may then flow through the ADC 1403. The ADC 1403 may remove most of the anions from the liquid. The anions are attracted to the anode by the applied electric field. The anions may pass through the first AM 1402 and into the anode chamber 1401 where they may be removed from the apparatus by the waste liquid stream that removes ions from the anode chamber 1401. Remaining cations will be attracted to the cathode. The cations will be retained in the liquid because they will not pass through the second AM 1404 that forms the cathode side of the ADC 1403.

Following passage through 1403, the liquid is then passed through the composite anion-cation exchange material layer 1406 of the dual layer depletion. The composite anion-cation exchange material layer 1406 may be effective at removing both remaining anions and cations. The remaining cations are attracted to the cathode by the applied electric field. The cations may pass through the first CM 1407, through the CDC 1408, and through the second CM 1409 and into the cathode chamber 1410 where they may be removed from the apparatus by the waste liquid stream that removes ions from the cathode chamber 1410. The remaining anions are attracted to the anode by the applied electric field. The anions may be allowed to pass through the second AM 1404, through the ADC 1403, through the first AM 1402 and into the anode chamber 1401 where they may be removed from the apparatus by the waste liquid stream that removes ions from the anode chamber 1401.

Following passage through 1406, the liquid may then pass through the dual layer depletion chamber. The liquid is passed through the doped anion exchange material layer 1405 of the dual layer depletion chamber. The doped anion exchange material layer 1405 may remove remaining anions from the liquid. Anions are attracted to the anode by the applied electric field. The anions may pass, through the second AM 1404, through the ADC 1403, and through the first AM 1402 and into the anode chamber 1401 where they may be removed from the apparatus by the waste liquid stream that removes ions from the anode chamber 1401. The cations will be attracted to the cathode by the applied electric field. Some of the cations may be retained by the cation ion exchange material used as a dopant and may be allowed to pass through the first CM 1407, through the CDC 1408, through the second CM 1409 and into the cathode chamber 1410 where they may be removed from the apparatus by the waste liquid stream that removes ions from the cathode chamber 1410.

Another additional method (not shown) for performing electrodeionization utilizing the apparatus as illustrated in FIG. 14 comprises an alternate flow pattern. The liquid may be initially directed through the ADC 1403. The ADC 1403 may remove most of the anions from the liquid. The anions are attracted to the anode by the applied electric field. The anions may pass through the first AM 1402 and into the anode chamber 1401 where they may be removed from the apparatus by the waste liquid stream that removes ions from the anode chamber 1401. Remaining cations will be attracted to the cathode. The cations will be retained in the liquid because they will not pass through the second AM 1404 that forms the cathode side of the ADC 1403.

Following passage through 1403, the liquid may then flow through the CDC 1408. The CDC 1408 may remove most of the cations from the liquid. The cations are attracted to the cathode by the applied electric field. The cations may pass through the second CM 1409 and into the cathode chamber 1410 where they may be removed from the apparatus by the waste liquid stream that removes ions from the cathode chamber 1410. Anions will be attracted to the anode. The anions will be retained in the liquid because they will not pass through the first CM 1407 that forms the anode side of the CDC 1408.

Following passage through 1408, the liquid is then passed through the composite anion-cation exchange material layer 1406 of the dual layer depletion. The composite anion-cation exchange material layer 1406 may be effective at removing both remaining anions and cations. The remaining cations are attracted to the cathode by the applied electric field. The cations may pass through the first CM 1407, through the CDC 1408, and through the second CM 1409 and into the cathode chamber 1410 where they may be removed from the apparatus by the waste liquid stream that removes ions from the cathode chamber 1410. The remaining anions are attracted to the anode by the applied electric field. The anions may be allowed to pass through the second AM 1404, through the ADC 1403, through the first AM 1402 and into the anode chamber 1401 where they may be removed from the apparatus by the waste liquid stream that removes ions from the anode chamber 1401.

Following passage through 1406, the liquid may then pass through the dual layer depletion chamber. The liquid is passed through the doped anion exchange material layer 1405 of the dual layer depletion chamber. The doped anion exchange material layer 1405 may remove remaining anions from the liquid. Anions are attracted to the anode by the applied electric field. The anions may pass through the second AM 1404, through the ADC 1403, and through the first AM 1402 and into the anode chamber 1401 where they may be removed from the apparatus by the waste liquid stream that removes ions from the anode chamber 1401. The cations will be attracted to the cathode by the applied electric field. Some of the cations may be retained by the cation ion exchange material used as a dopant and may be allowed to pass through the first CM 1407, through the CDC 1408, through the second CM 1409 and into the cathode chamber 1410 where they may be removed from the apparatus by the waste liquid stream that removes ions from the cathode chamber 1410.

FIG. 15 illustrates an EDI apparatus comprising three ion depletion chambers, an anode chamber, and a cathode chamber. The two electrode chambers have a flow of waste stream liquid used to flush the contaminant ions from the chambers but not depicted in FIG. 15. The apparatus illustrated in FIG. 15 comprises an anode chamber 1501 including an anode therein. An ADC 1503 may be placed on the cathode side of the anode chamber 1501. The ADC 1503 and the anode chamber 1501 may be separated by a first AM 1502. The ADC 1503 typically includes therein a homogeneous volume of anion exchange material. A dual layer depletion chamber may be placed on the cathode side of the ADC 1503. The dual layer depletion chamber and the ADC 1503 may be separated by a second AM 1504. The dual layer depletion chamber may be comprised of a doped cation exchange material layer 1505 on the inlet portion of the dual layer chamber and a composite anion-cation exchange material layer 1506 on the outlet portion of the dual layer chamber. This is an example of a LDC. The interface between the doped cation exchange material layer 1505 and the composite anion-cation exchange material layer 1506 may be parallel to the applied electric field. The doped cation exchange material layer 1505 may include therein a composite of anion and cation exchange materials wherein the cation exchange material is responsible for at least about 60% of the total ion exchange capacity and the remainder of the total ion exchange capacity is contributed by anion exchange material. The composite anion-cation exchange material layer 1506 may include therein a mixed ion exchange material, or a doped anion exchange material, or a doped cation exchange material. A CDC 1508 may be placed on the cathode side of the dual layer depletion chamber. The dual layer depletion chamber and the CDC 1508 may be separated by a first CM 1507. The CDC 1508 typically includes therein a homogeneous volume of cation exchange material. The CDC 1508 may be separated from the cathode chamber 1510 by a second CM 1509. The cathode chamber 1510 includes a cathode therein. The apparatus as illustrated in FIG. 15 may be operated in continuous mode or in intermittent mode.

A method for performing electrodeionization utilizing the apparatus is illustrated in FIG. 15. The liquid may be initially directed through the CDC 1508. The CDC 1508 may remove most of the cations from the liquid. The cations are attracted to the cathode by the applied electric field. The cations may pass through the second CM 1509 and into the cathode chamber 1510 where they may be removed from the apparatus by the waste liquid stream that removes ions from the cathode chamber 1510. Anions will be attracted to the anode. The anions will be retained in the liquid because they will not pass through the first CM 1507 that forms the anode side of the CDC 1508.

Following passage through 1508, the liquid may then flow through the ADC 1503. The ADC 1503 may remove most of the anions from the liquid. The anions are attracted to the anode by the applied electric field. The anions may pass through the first AM 1502 and into the anode chamber 1501 where they may be removed from the apparatus by the waste liquid stream that removes ions from the anode chamber 1501. Remaining cations will be attracted to the cathode. The cations will be retained in the liquid because they will not pass through the second AM 1504 that forms the cathode side of the ADC 1503.

Following passage through 1503, the liquid may then pass through the dual layer depletion chamber. The liquid is passed through the doped cation exchange material layer 1505 of the dual layer depletion chamber by placing the inlet portion of the chamber above the doped cation exchange material layer 1505. The doped cation exchange material layer 1505 may remove remaining cations from the liquid. Cations are attracted to the cathode by the applied electric field. The cations may pass through the first CM 1507, through the CDC 1508, and through the second CM 1509 and into the cathode chamber 1510 where they may be removed from the apparatus by the waste liquid stream that removes ions from the cathode chamber 1510. The anions will be attracted to the anode by the applied electric field. Some of the anions may be retained by the anion ion exchange material used as a dopant and may be allowed to pass through the second AM 1504, through the ADC 1503, through the first AM 1502 and into the anode chamber 1501 where they may be removed from the apparatus by the waste liquid stream that removes ions from the anode chamber 1501.

Following passage through 1505, the liquid is then passed through the composite anion-cation exchange material layer 1506 of the dual layer depletion chamber by placing the outlet portion of the chamber below the composite anion-cation exchange material layer 1506. The composite anion-cation exchange material layer 1506 may be effective at removing both remaining anions and cations. The remaining cations are attracted to the cathode by the applied electric field. The cations may pass through the first CM 1507, through the CDC 1508, and through the second CM 1509 and into the cathode chamber 1510 where they may be removed from the apparatus by the waste liquid stream that removes ions from the cathode chamber 1510. The remaining anions are attracted to the anode by the applied electric field. The anions may be allowed to pass through the second AM 1504, through the ADC 1503, through the first AM 1502 and into the anode chamber 1501 where they may be removed from the apparatus by the waste liquid stream that removes ions from the anode chamber 1501.

Another method (not shown) for performing electrodeionization utilizing the apparatus as illustrated in FIG. 15 comprises a flow pattern essentially the mirror image of that depicted in FIG. 15. The liquid may be initially directed through the ADC 1503. The ADC 1503 may remove most of the anions from the liquid. The anions are attracted to the anode by the applied electric field. The anions may pass through the first AM 1502 and into the anode chamber 1501 where they may be removed from the apparatus by the waste liquid stream that removes ions from the anode chamber 1501. Remaining cations will be attracted to the cathode. The cations will be retained in the liquid because they will not pass through the second AM 1504 that forms the cathode side of the ADC 1503.

Following passage through 1503, the liquid may then flow through the CDC 1508. The CDC 1508 may remove most of the cations from the liquid. The cations are attracted to the cathode by the applied electric field. The cations may pass through the second CM 1509 and into the cathode chamber 1510 where they may be removed from the apparatus by the waste liquid stream that removes ions from the cathode chamber 1510. Anions will be attracted to the anode. The anions will be retained in the liquid because they will not pass through the first CM 1507 that forms the anode side of the CDC 1508.

Following passage through 1508, the liquid may then pass through the dual layer depletion chamber. The liquid is passed through the doped cation exchange material layer 1505 of the dual layer depletion chamber by placing the inlet portion of the chamber above the doped cation exchange material layer 1505. The doped cation exchange material layer 1505 may remove remaining cations from the liquid. Cations are attracted to the cathode by the applied electric field. The cations may pass through the first CM 1507, through the CDC 1508, and through the second CM 1509 and into the cathode chamber 1510 where they may be removed from the apparatus by the waste liquid stream that removes ions from the cathode chamber 1510. The anions will be attracted to the anode by the applied electric field. Some of the anions may be retained by the anion ion exchange material used as a dopant and may be allowed to pass through the second AM 1504, through the ADC 1503, through the first AM 1502 and into the anode chamber 1501 where they may be removed from the apparatus by the waste liquid stream that removes ions from the anode chamber 1501.

Following passage through 1505, the liquid is then passed through the composite anion-cation exchange material layer 1506 of the dual layer depletion chamber by placing the outlet portion of the chamber below the composite anion-cation exchange material layer 1506. The composite anion-cation exchange material layer 1506 may be effective at removing both remaining anions and cations. The remaining cations are attracted to the cathode by the applied electric field. The cations may pass through the first CM 1507, through the CDC 1508, and through the second CM 1509 and into the cathode chamber 1510 where they may be removed from the apparatus by the waste liquid stream that removes ions from the cathode chamber 1510. The remaining anions are attracted to the anode by the applied electric field. The anions may be allowed to pass through the second AM 1504, through the ADC 1503, through the first AM 1502 and into the anode chamber 1501 where they may be removed from the apparatus by the waste liquid stream that removes ions from the anode chamber 1501.

Two additional methods for performing electrodeionization (not shown) on the apparatus as illustrated in FIG. 15 may be realized by switching the inlet and outlet of the dual layer depletion chamber. In one additional method, the liquid may be initially directed through the CDC 1508. The CDC 1508 may remove most of the cations from the liquid. The cations are attracted to the cathode by the applied electric field. The cations may pass through the second CM 1509 and into the cathode chamber 1510 where they may be removed from the apparatus by the waste liquid stream that removes ions from the cathode chamber 1510. Anions will be attracted to the anode. The anions will be retained in the liquid because they will not pass through the first CM 1507 that forms the anode side of the CDC 1508.

Following passage through 1508, the liquid may then flow through the ADC 1503. The ADC 1503 may remove most of the anions from the liquid. The anions are attracted to the anode by the applied electric field. The anions may pass through the first AM 1502 and into the anode chamber 1501 where they may be removed from the apparatus by the waste liquid stream that removes ions from the anode chamber 1501. Remaining cations will be attracted to the cathode. The cations will be retained in the liquid because they will not pass through the second AM 1504 that forms the cathode side of the ADC 1503.

Following passage through 1503, the liquid is then passed through the composite anion-cation exchange material layer 1506 of the dual layer depletion chamber. The composite anion-cation exchange material layer 1506 may be effective at removing both remaining anions and cations. The remaining cations are attracted to the cathode by the applied electric field. The cations may pass through the first CM 1507, through the CDC 1508, and through the second CM 1509 and into the cathode chamber 1510 where they may be removed from the apparatus by the waste liquid stream that removes ions from the cathode chamber 1510. The remaining anions are attracted to the anode by the applied electric field. The anions may be allowed to pass through the second AM 1504, through the ADC 1503, through the first AM 1502 and into the anode chamber 1501 where they may be removed from the apparatus by the waste liquid stream that removes ions from the anode chamber 1501.

Following passage through 1506, the liquid may then pass through the doped cation exchange material layer 1505 of the dual layer depletion. The doped cation exchange material layer 1505 may remove remaining cations from the liquid. Cations are attracted to the cathode by the applied electric field. The cations may pass through the first CM 1507, through the CDC 1508, and through the second CM 1509 and into the cathode chamber 1510 where they may be removed from the apparatus by the waste liquid stream that removes ions from the cathode chamber 1510. The anions will be attracted to the anode by the applied electric field. Some of the anions may be retained by the anion ion exchange material used as a dopant and may be allowed to pass through the second AM 1504, through the ADC 1503, through the first AM 1502 and into the anode chamber 1501 where they may be removed from the apparatus by the waste liquid stream that removes ions from the anode chamber 1501.

Another additional method (not shown) for performing electrodeionization utilizing the apparatus as illustrated in FIG. 15 comprises an alternative flow pattern. The liquid may be initially directed through the ADC 1503. The ADC 1503 may remove most of the anions from the liquid. The anions are attracted to the anode by the applied electric field. The anions may pass through the first AM 1502 and into the anode chamber 1501 where they may be removed from the apparatus by the waste liquid stream that removes ions from the anode chamber 1501. Remaining cations will be attracted to the cathode. The cations will be retained in the liquid because they will not pass through the second AM 1504 that forms the cathode side of the ADC 1503.

Following passage through 1503, the liquid may then flow through the CDC 1508. The CDC 1508 may remove most of the cations from the liquid. The cations are attracted to the cathode by the applied electric field. The cations may pass through the second CM 1509 and into the cathode chamber 1510 where they may be removed from the apparatus by the waste liquid stream that removes ions from the cathode chamber 1510. Anions will be attracted to the anode. The anions will be retained in the liquid because they will not pass through the first CM 1507 that forms the anode side of the CDC 1508.

Following passage through 1508, the liquid is then passed through the composite anion-cation exchange material layer 1506 of the dual layer depletion chamber. The composite anion-cation exchange material layer 1506 may be effective at removing both remaining anions and cations. The remaining cations are attracted to the cathode by the applied electric field. The cations may pass through the first CM 1507, through the CDC 1508, and through the second CM 1509 and into the cathode chamber 1510 where they may be removed from the apparatus by the waste liquid stream that removes ions from the cathode chamber 1510. The remaining anions are attracted to the anode by the applied electric field. The anions may be allowed to pass through the second AM 1504, through the ADC 1503, through the first AM 1502 and into the anode chamber 1501 where they may be removed from the apparatus by the waste liquid stream that removes ions from the anode chamber 1501.

Following passage through 1506, the liquid may then pass through the doped cation exchange material layer 1505 of the dual layer depletion. The doped cation exchange material layer 1505 may remove remaining cations from the liquid. Cations are attracted to the cathode by the applied electric field. The cations may pass through the first CM 1507, through the CDC 1508, and through the second CM 1509 and into the cathode chamber 1510 where they may be removed from the apparatus by the waste liquid stream that removes ions from the cathode chamber 1510. The anions will be attracted to the anode by the applied electric field. Some of the anions may be retained by the anion ion exchange material used as a dopant and may be allowed to pass through the second AM 1504, through the ADC 1503, through the first AM 1502 and into the anode chamber 1501 where they may be removed from the apparatus by the waste liquid stream that removes ions from the anode chamber 1501.

FIG. 16 illustrates an EDI apparatus comprising three ion depletion chambers, an anode chamber, and a cathode chamber. The two electrode chambers have a flow of waste stream liquid used to flush the contaminant ions from the chambers not shown in FIG. 16. The apparatus illustrated in FIG. 16 comprises an anode chamber 1601 including an anode therein. An ADC 1603 may be placed on the cathode side of the anode chamber 1601. The ADC 1603 and the anode chamber 1601 may be separated by a first AM 1602. The ADC 1603 typically includes therein a homogeneous volume of anion exchange material. A triple layer depletion chamber may be placed on the cathode side of the ADC 1603. The layers may be in contiguous contact without an ion exchange membrane separating them. This is an example of a LDC. The triple layer depletion chamber and the ADC 1603 may be separated by a second AM 1604. The triple layer depletion chamber may be comprised of a doped anion exchange material layer 1605 on the inlet portion of the dual layer chamber, a doped cation exchange material layer 1606 in the center portion, and a composite anion-cation exchange material layer 1607 on the outlet portion of the triple layer chamber. The interface between the doped anion exchange material layer 1605 and the doped cation exchange material layer 1606 may be parallel to the applied electric field. The interface between the doped cation exchange material layer 1606 and the composite anion-cation exchange material layer 1607 may be parallel to the applied electric field. The doped anion exchange material layer 1605 may include therein a composite of anion and cation exchange materials wherein the anion exchange material is responsible for at least about 60% of the total ion exchange capacity and the remainder of the total ion exchange capacity is contributed by the cation exchange material. The doped cation exchange material layer 1606 may include therein a composite of anion and cation exchange materials wherein the cation exchange material is responsible for at least about 60% of the total ion exchange capacity and the remainder of the total ion exchange capacity is contributed by anion exchange material. The composite anion-cation exchange material layer 1607 may include therein a mixed ion exchange material, or a doped anion exchange material, or a doped cation exchange material. A CDC 1609 may be placed on the cathode side of the triple layer depletion chamber. The triple layer depletion chamber and the CDC 1609 may be separated by a first CM 1608. The CDC 1609 typically includes therein a homogeneous volume of cation exchange material. The CDC 1609 may be separated from the cathode chamber 1611 by a second CM 1610. The cathode chamber 1611 includes a cathode therein. The apparatus as illustrated in FIG. 16 may be operated in continuous mode or in intermittent mode.

A method for performing electrodeionization utilizing the apparatus is illustrated in FIG. 16. The liquid may be initially directed through the CDC 1609. The CDC 1609 may remove most of the cations from the liquid. The cations are attracted to the cathode by the applied electric field. The cations may pass through the second CM 1610 and into the cathode chamber 1611 where they may be removed from the apparatus by the waste liquid stream that removes ions from the cathode chamber 1611. Anions will be attracted to the anode. The anions will be retained in the liquid because they will not pass through the first CM 1608 that forms the anode side of the CDC 1609.

Following passage through 1609, the liquid may then flow through the ADC 1603. The ADC 1603 may remove most of the anions from the liquid. The anions are attracted to the anode by the applied electric field. The anions may pass through the first AM 1602 and into the anode chamber 1601 where they may be removed from the apparatus by the waste liquid stream that removes ions from the anode chamber 1601. Remaining cations will be attracted to the cathode. The cations will be retained in the liquid because they will not pass through the second AM 1604 that forms the cathode side of the ADC 1603.

Following passage through 1603, the liquid may then pass through the triple layer depletion chamber. The liquid is passed through the doped anion exchange material layer 1605 of the triple layer depletion chamber by placing the inlet portion of the chamber above the doped anion exchange material layer 1605. The doped anion exchange material layer 1605 may remove remaining anions from the liquid. Anions are attracted to the anode by the applied electric field. The anions may pass through the second AM 1604, through the ADC 1603, and through the first AM 1602 and into the anode chamber 1601 where they may be removed from the apparatus by the waste liquid stream that removes ions from the anode chamber 1601. The cations will be attracted to the cathode by the applied electric field. Some of the cations may be retained by the cation ion exchange material used as a dopant and may be allowed to pass through the first CM 1608, through the CDC 1609, through the second CM 1610 and into the cathode chamber 1611 where they may be removed from the apparatus by the waste liquid stream that removes ions from the cathode chamber 1611.

Following passage through 1605, the liquid is then passed through the doped cation exchange material layer 1606 of the triple layer depletion chamber. The doped cation exchange material layer 1606 may remove remaining cations from the liquid. Cations are attracted to the cathode by the applied electric field. The cations may pass through the first CM 1608, through the CDC 1609, and through the second CM 1610 and into the cathode chamber 1611 where they may be removed from the apparatus by the waste liquid stream that removes ions from the cathode chamber 1611. The anions will be attracted to the anode by the applied electric field. Some of the anions may be retained by the anion ion exchange material used as a dopant and may be allowed to pass through the second AM 1604, through the ADC 1603, through the first AM 1602 and into the anode chamber 1601 where they may be removed from the apparatus by the waste liquid stream that removes ions from the anode chamber 1601.

Following passage through 1606, the liquid is then passed through the composite anion-cation exchange material layer 1607 of the triple layer depletion chamber by placing the outlet portion of the chamber below the composite anion-cation exchange material layer 1607. The composite anion-cation exchange material layer 1607 may be effective at removing both remaining anions and cations. The remaining cations are attracted to the cathode by the applied electric field. The cations may pass through the first CM 1608, through the CDC 1609, and through the second CM 1610 and into the cathode chamber 1611 where they may be removed from the apparatus by the waste liquid stream that removes ions from the cathode chamber 1611. The remaining anions are attracted to the anode by the applied electric field. The anions may be allowed to pass through the second AM 1604, through the ADC 1603, through the first AM 1602 and into the anode chamber 1601 where they may be removed from the apparatus by the waste liquid stream that removes ions from the anode chamber 1601.

Example 7

An EDI device as shown in FIG. 16 was constructed using machined high density polyethylene hardware to retain the electrodes, membranes and resin. The internal flow dimensions of the ADC were 1.27 cm in diameter and 3.81 cm in length. The internal flow dimensions of the LDC were 1.27 cm in diameter and 1.27 cm in length. The internal flow dimensions of the CDC were 1.27 cm in diameter and 3.81 cm in length.

The anode chamber 1601 contained platinum gauze electrodes (Unique Wire Weaving Inc, Hillside, N.J.). In contact with the anode and separating the anode chamber 1601 from the ADC 1603 was an AM 1602 (AMI-7001, a product of Membranes International, Glen Rock, N.J.). The ADC 1603 was filled with an anion exchange resin (DOWEX™ 1x4 (200 mesh), a product of The Dow Chemical Company, Midland, Mich.) in the hydroxide form. An AM 1604 (AMI-7001, a product of Membranes International, Glen Rock, N.J.) separated the ADC 1603 from the LDC. The LDC contained a 0.4 cm doped anion exchange resin layer 1605 comprising an anion exchange resin (DOWEX™ 1x4 (200 mesh), a product of The Dow Chemical Company, Midland, Mich.) doped with a cation exchange resin (DOWEX™ 50Wx4 (200 mesh), a product of The Dow Chemical Company, Midland, Mich.), a 0.4 cm doped cation exchange layer 1606 comprising a cation exchange resin (DOWEX™ 50Wx4 (200 mesh), a product of The Dow Chemical Company, Midland, Mich.) doped with an anion exchange resin (DOWEX™ 1x4 (200 mesh), a product of The Dow Chemical Company, Midland, Mich.) and a 0.5 cm (approximate) composite bed ion exchange layer 1607 comprising a mixture of anion exchange resin (DOWEX™ 1x4 (200 mesh), a product of The Dow Chemical Company, Midland, Mich.) and cation exchange resin (DOWEX™ 50Wx4 (200 mesh), a product of The Dow Chemical Company, Midland, Mich.). The doped anion exchange resin layer 1605 had an equivalence ratio of 4:1, anion to cation. The doped cation resin layer 1606 had an equivalence ratio of 4:1, cation to anion. The composite bed ion exchange layer 1607 contained a composite with an equivalence ratio of 1:1 anion to cation resin. The cation and anion exchange resins were in the hydronium and hydroxide forms, respectively. Separating the CDC 1609 from the LDC was a CM 1608 (CMI-7000, a product of Membranes International, Glen Rock, N.J.). The CDC 1609 was filled with a cation exchange resin (DOWEX™ 50Wx4 (200 mesh), a product of The Dow Chemical Company, Midland, Mich.). The CDC 1609 was separated from the cathode chamber 1611 by a CM 1610 (CMI-7000, a product of Membranes International, Glen Rock, N.J.). The cathode chamber 1611 contained platinum gauze electrodes (Unique Wire Weaving Inc, Hillside, N.J.). The cathode is in direct contact with the CM 1610 separating the CDC 1609 and cathode chamber 1611. A pump (GP40, a product of Dionex, Sunnyvale, Calif.) was used to deliver RO quality water (specific conductance 12.3 µS/cm) at a flow rate of 2.0 mL/min to the EDI device shown in FIG. 16. A conductivity detector (CD20, a product of Dionex, Sunnyvale, Calif.) with a flow cell was used for the conductivity measurements. From the pump, the RO water flow was directed to the CDC 1609, then the ADC 1603, to the doped anion layer 1605 inlet of the LDC, through the doped cation layer 1606 of the LDC, and finally through the composite bed layer 1607 outlet and then to the flow through conductivity cell. A peristaltic pump (MASTERFLEX LS, a product of the Cole-Parmer company, Vernon Hills, Ill.) was used to deliver deionized water at a flow rate of 2.0 mL/min to the anode chamber 1601 and then to the cathode chamber 1611 and then to waste.

Initially, the conductance of the water exiting the EDI device was 2.9 µS/cm. Using a laboratory power supply, (E3612A, a product of Agilent, Santa Clara, Calif.) a constant current of 40 mA was applied and the initial voltage was 52V. Gas evolution was observed immediately from the anode and cathode chambers. The initial background conductivity of the product water increased to 32 µS/cm and over a 1 hour period the conductivity decreased to 0.63 µS/cm. The EDI device was allowed to operate continuously for 7 days. The data in Table 10 shows results for the device of FIG. 16.

TABLE 10

Conductance Measurements vs. Time

| Hours | Voltage | Conductivity (µS/cm) |
|---|---|---|
| 0.0 | 0.0 | 2.9 |
| 1 | 45 | 0.66 |
| 2 | 42 | 0.35 |
| 10 | 40 | 0.12 |
| 24 | 32 | 0.074 |
| 48 | 26 | 0.057 |
| 72 | 24 | 0.055 |
| 96 | 25 | 0.056 |
| 120 | 25 | 0.055 |
| 144 | 27 | 0.056 |
| 168 | 29 | 0.055 |

Another method (not shown) for performing electrodeionization utilizing the apparatus as illustrated in FIG. 16 comprises directing the flow through the apparatus in essentially a mirror image flow pattern. The liquid may be initially directed through the ADC 1603. The ADC 1603 may remove most of the anions from the liquid. The anions are attracted to the anode by the applied electric field. The anions may pass through the first AM 1602 and into the anode chamber 1601 where they may be removed from the apparatus by the waste liquid stream that removes ions from the anode chamber 1601. Remaining cations will be attracted to the cathode. The cations will be retained in the liquid because they will not pass through the second AM 1604 that forms the cathode side of the ADC 1603.

Following passage through 1603, the liquid may then flow through the CDC 1609. The CDC 1609 may remove most of the cations from the liquid. The cations are attracted to the cathode by the applied electric field. The cations may pass through the second CM 1610 and into the cathode chamber 1611 where they may be removed from the apparatus by the waste liquid stream that removes ions from the cathode chamber 1611. Anions will be attracted to the anode. The anions will be retained in the liquid because they will not pass through the first CM 1608 that forms the anode side of the CDC 1609.

Following passage through 1609, the liquid may then pass through the triple layer depletion chamber. The liquid is passed through the doped anion exchange material layer 1605 of the triple layer depletion chamber by placing the inlet portion of the chamber above the doped anion exchange material layer 1605. The doped anion exchange material layer may remove remaining anions from the liquid. Anions are attracted to the anode by the applied electric field. The anions may pass through the second AM 1604, through the ADC 1603, and through the first AM 1602 and into the anode chamber 1601 where they may be removed from the apparatus by the waste liquid stream that removes ions from the anode chamber 1601. The cations will be attracted to the cathode by the applied electric field. Some of the cations may be retained by the cation ion exchange material used as a dopant and may be allowed to pass through the first CM 1608, through the CDC 1609, through the second CM 1610 and into the cathode chamber 1611 where they may be removed from the apparatus by the waste liquid stream that removes ions from the cathode chamber 1611.

Following passage through 1605, the liquid is then passed through the doped cation exchange material layer 1606 of the triple layer depletion chamber. The doped cation exchange material layer 1606 may remove remaining cations from the liquid. Cations are attracted to the cathode by the applied electric field. The cations may pass through the first CM 1608, through the CDC 1609, and through the second CM 1610 and into the cathode chamber 1611 where they may be removed from the apparatus by the waste liquid stream that removes ions from the cathode chamber 1611. The anions will be attracted to the anode by the applied electric field. Some of the anions may be retained by the anion ion exchange material used as a dopant and may be allowed to pass through the second AM 1604, through the ADC 1603, through the first AM 1602 and into the anode chamber 1601 where they may be removed from the apparatus by the waste liquid stream that removes ions from the anode chamber 1601.

Following passage through 1606, the liquid is then passed through the composite anion-cation exchange material layer 1607 of the triple layer depletion chamber by placing the outlet portion of the chamber below the composite anion-cation exchange material layer 1607. The composite anion-cation exchange material layer 1607 may be effective at removing both remaining anions and cations. The remaining cations are attracted to the cathode by the applied electric field. The cations may pass through the first CM 1608, through the CDC 1609, and through the second CM 1610 and into the cathode chamber 1611 where they may be removed from the apparatus by the waste liquid stream that removes ions from the cathode chamber 1611. The remaining anions are attracted to the anode by the applied electric field. The anions may be allowed to pass through the second AM 1604, through the ADC 1603, through the first AM 1602 and into the anode chamber 1601 where they may be removed from the apparatus by the waste liquid stream that removes ions from the anode chamber 1601.

Two additional methods for performing electrodeionization (not shown) on the apparatus as illustrated in FIG. 16 may be realized by switching the inlet and outlet of the triple layer depletion chamber. In one additional method, the liquid may be initially directed through the CDC 1609. The CDC 1609 may remove most of the cations from the liquid. The cations are attracted to the cathode by the applied electric field. The cations may pass through the second CM 1610 and into the cathode chamber 1611 where they may be removed from the apparatus by the waste liquid stream that removes ions from the cathode chamber 1611. Anions will be attracted to the anode. The anions will be retained in the liquid because they will not pass through the first CM 1608 that forms the anode side of the CDC 1609.

Following passage through 1609, the liquid may then flow through the ADC 1603. The ADC 1603 may remove most of the anions from the liquid. The anions are attracted to the anode by the applied electric field. The anions may pass through the first AM 1602 and into the anode chamber 1601 where they may be removed from the apparatus by the waste liquid stream that removes ions from the anode chamber 1601. Remaining cations will be attracted to the cathode. The cations will be retained in the liquid because they will not pass through the second AM 1604 that forms the cathode side of the ADC 1603.

Following passage through 1603, the liquid is then passed through the composite anion-cation exchange material layer 1607 of the triple layer depletion. The composite anion-cation exchange material layer 1607 may be effective at removing both remaining anions and cations. The remaining cations are attracted to the cathode by the applied electric field. The cations may pass through the first CM 1608, through the CDC 1609, and through the second CM 1610 and into the cathode chamber 1611 where they may be removed from the apparatus by the waste liquid stream that removes ions from the cathode chamber 1611. The remaining anions are attracted to the anode by the applied electric field. The anions may be allowed to pass through the second AM 1604, through the ADC 1603, through the first AM 1602 and into the anode chamber 1601 where they may be removed from the apparatus by the waste liquid stream that removes ions from the anode chamber 1601.

Following passage through 1607, the liquid is then passed through the doped cation exchange material layer 1606 of the triple layer depletion chamber. The doped cation exchange material layer 1606 may remove remaining cations from the liquid. Cations are attracted to the cathode by the applied electric field. The cations may pass through the first CM 1608, through the CDC 1609, and through the second CM 1610 and into the cathode chamber 1611 where they may be removed from the apparatus by the waste liquid stream that removes ions from the cathode chamber 1611. The anions will be attracted to the anode by the applied electric field. Some of the anions may be retained by the anion ion exchange material used as a dopant and may be allowed to pass through the second AM 1604, through the ADC 1603, through the first AM 1602 and into the anode chamber 1601 where they may be removed from the apparatus by the waste liquid stream that removes ions from the anode chamber 1601.

Following passage through 1606, the liquid may then pass through the doped anion exchange material layer 1605 of the triple layer depletion chamber. The doped anion exchange material layer may remove remaining anions from the liquid. Anions are attracted to the anode by the applied electric field. The anions may pass through the second AM 1604, through the ADC 1603, and through the first AM 1602 and into the anode chamber 1601 where they may be removed from the apparatus by the waste liquid stream that removes ions from the anode chamber 1601. The cations will be attracted to the cathode by the applied electric field. Some of the cations may be retained by the cation ion exchange material used as a dopant and may be allowed to pass through the first CM 1608, through the CDC 1609, through the second CM 1610 and into the cathode chamber 1611 where they may be removed from the apparatus by the waste liquid stream that removes ions from the cathode chamber 1611.

Another additional method (not shown) for performing electrodeionization utilizing the apparatus as illustrated in FIG. 16 comprises directing the flow through the apparatus in an alternate flow pattern. The liquid may be initially directed through the ADC 1603. The ADC 1603 may remove most of the anions from the liquid. The anions are attracted to the anode by the applied electric field. The anions may pass through the first AM 1602 and into the anode chamber 1601 where they may be removed from the apparatus by the waste liquid stream that removes ions from the anode chamber 1601. Remaining cations will be attracted to the cathode. The cations will be retained in the liquid because they will not pass through the second AM 1604 that forms the cathode side of the ADC 1603.

Following passage through 1603, the liquid may then flow through the CDC 1609. The CDC 1609 may remove most of the cations from the liquid. The cations are attracted to the cathode by the applied electric field. The cations may pass through the second CM 1610 and into the cathode chamber 1611 where they may be removed from the apparatus by the waste liquid stream that removes ions from the cathode chamber 1611. Anions will be attracted to the anode. The anions will be retained in the liquid because they will not pass through the first CM 1608 that forms the anode side of the CDC 1609.

Following passage through 1609, the liquid is then passed through the composite anion-cation exchange material layer 1607 of the triple layer depletion. The composite anion-cation exchange material layer 1607 may be effective at removing both remaining anions and cations. The remaining cations are attracted to the cathode by the applied electric field. The cations may pass through the first CM 1608, through the CDC 1609, and through the second CM 1610 and into the cathode chamber 1611 where they may be removed from the apparatus by the waste liquid stream that removes ions from the cathode chamber 1611. The remaining anions are attracted to the anode by the applied electric field. The anions may be allowed to pass through the second AM 1604, through the ADC 1603, through the first AM 1602 and into the anode chamber 1601 where they may be removed from the apparatus by the waste liquid stream that removes ions from the anode chamber 1601.

Following passage through 1607, the liquid is then passed through the doped cation exchange material layer 1606 of the triple layer depletion chamber. The doped cation exchange material layer 1606 may remove remaining cations from the liquid. Cations are attracted to the cathode by the applied electric field. The cations may pass through the first CM 1608, through the CDC 1609, and through the second CM 1610 and into the cathode chamber 1611 where they may be removed from the apparatus by the waste liquid stream that removes ions from the cathode chamber 1611. The anions will be attracted to the anode by the applied electric field. Some of the anions may be retained by the anion ion exchange material used as a dopant and may be allowed to pass through the second AM 1604, through the ADC 1603, through the first AM 1602 and into the anode chamber 1601 where they may be removed from the apparatus by the waste liquid stream that removes ions from the anode chamber 1601.

Following passage through 1606, the liquid may then pass through the doped anion exchange material layer 1605 of the triple layer depletion chamber. The doped anion exchange material layer may remove remaining anions from the liquid. Anions are attracted to the anode by the applied electric field. The anions may pass through the second AM 1604, through the ADC 1603, and through the first AM 1602 and into the anode chamber 1601 where they may be removed from the apparatus by the waste liquid stream that removes ions from the anode chamber 1601. The cations will be attracted to the cathode by the applied electric field. Some of the cations may be retained by the cation ion exchange material used as a dopant and may be allowed to pass through the first CM 1608, through the CDC 1609, through the second CM 1610 and into the cathode chamber 1611 where they may be removed from the apparatus by the waste liquid stream that removes ions from the cathode chamber 1611.

The foregoing descriptions of exemplary embodiments of the present invention have been presented for the purpose of illustration and description. They are not intended to be exhaustive or to limit the present invention to the precise forms disclosed, and obviously many modifications, embodiments, and variations are possible in light of the above teaching.

What is claimed is:

1. An electrodeionization apparatus comprising:
   a. an anode chamber 201, including an anode therein;
   b. a cathode chamber 206, including a cathode therein, wherein an electric field is formed as a result of a voltage applied between the anode and the cathode;
   c. an anion membrane 202 contiguous with the anode chamber 201;
   d. a dual layer depletion chamber comprising;
      i. an anion exchange material layer 203 contiguous with the anion membrane 202, the anion exchange material layer including therein anion exchange materials;
      ii. a composite anion-cation exchange material layer 204 contiguous with the anion exchange material layer 203, the composite anion-cation exchange material layer including therein one of a mixed ion exchange material, or a doped anion exchange material, or a doped cation exchange material;
      iii. wherein an interface between the anion exchange material layer 203 and the composite anion-cation exchange material layer 204 is substantially transverse to the applied electric field, and a fluid flow inlet and outlet are positioned so that a direction of fluid flow through the apparatus is parallel to the applied electric field; and
   e. a cation membrane 205 contiguous with the composite anion-cation exchange material layer 204 of the dual layer depletion chamber and contiguous with the cathode chamber 206.

2. An electrodeionization apparatus in accordance with claim 1, wherein said anion exchange material layer is a homogeneous volume of anion exchange material.

3. An electrodeionization apparatus in accordance with claim 1, wherein said composite anion-cation exchange material layer is a mixed ion exchange material.

4. An electrodeionization apparatus in accordance with claim 1, wherein said composite anion-cation exchange material layer is a doped anion exchange material.

5. An electrodeionization apparatus in accordance with claim 1, wherein said composite anion-cation exchange material layer is a doped cation exchange material.

6. An electrodeionization apparatus in accordance with claim 1, wherein an input port on the apparatus is placed at a location such that feed enters into said anion bed 203 at a location in close proximity to anode membrane 202.

7. An electrodeionization apparatus in accordance with claim 1, wherein an output port on the apparatus is placed at a location such that exiting product exits said mixed ion exchange material, or doped anion exchange material, or doped cation exchange material at a location in close proximity to cathode membrane 205.

8. An electrodeionization apparatus in accordance with claim 1, wherein the total ion exchange material volume within the chamber comprises from about 50 volume % to about 90 volume % anion exchange material.

* * * * *